US012574590B2

(12) United States Patent
Coburn, IV et al.

(10) Patent No.: US 12,574,590 B2
(45) Date of Patent: Mar. 10, 2026

(54) SYSTEMS AND METHODS FOR NETWORKED MUSIC PLAYBACK

(71) Applicant: Sonos, Inc., Santa Barbara, CA (US)

(72) Inventors: Arthur Coburn, IV, Lexington, MA (US); Joni Rafalski Hoadley, Santa Barbara, CA (US)

(73) Assignee: Sonos, Inc., Goleta, CA (US)

( * ) Notice: Subject to any disclaimer, the term of this patent is extended or adjusted under 35 U.S.C. 154(b) by 0 days.

(21) Appl. No.: 17/145,268

(22) Filed: Jan. 8, 2021

(65) Prior Publication Data

US 2021/0136445 A1 May 6, 2021

Related U.S. Application Data

(63) Continuation of application No. 17/019,174, filed on Sep. 11, 2020, now Pat. No. 10,945,027, which is a
(Continued)

(51) Int. Cl.
*H04N 21/436* (2011.01)
*G06F 3/0481* (2022.01)
(Continued)

(52) U.S. Cl.
CPC ..... *H04N 21/43615* (2013.01); *G06F 3/0481* (2013.01); *G06F 3/04842* (2013.01);
(Continued)

(58) Field of Classification Search
CPC ....... H04N 21/43615; H04N 21/47202; H04N 21/4852; H04N 21/8113; H04N 21/6581;
(Continued)

(56) References Cited

U.S. PATENT DOCUMENTS

| | | | |
|---|---|---|---|
| 5,406,634 | A | 4/1995 | Anderson et al. |
| 5,440,644 | A | 8/1995 | Farinelli et al. |

(Continued)

FOREIGN PATENT DOCUMENTS

| | | | |
|---|---|---|---|
| AU | 2012247286 | B2 | 11/2015 |
| CA | 2842342 | A1 | 2/2005 |

(Continued)

OTHER PUBLICATIONS

Final Office Action dated Feb. 8, 2019, issued in connection with U.S. Appl. No. 13/904,909, filed May 29, 2013, 16 pages.
(Continued)

*Primary Examiner* — Oschta I Montoya

(57) ABSTRACT

An example system is configured to (i) cause a client station to operate in a first mode in which the client station is configured for playback of a remote playback queue provided by a cloud-based computing system associated with a cloud-based media service, (ii) cause a zone player to take over playback responsibility for the remote playback queue, (iii) cause the zone player to (a) communicate with the cloud-based computing system to obtain data identifying a next one or more media items in the remote playback queue, (b) use the obtained data to retrieve at least one media item in the remote playback queue from the cloud-based media service, and (c) play back the retrieved at least one media item, and (iv) cause the client station to transition from the first mode to a second mode in which the client station is configured to control the zone player's playback of the remote playback queue.

30 Claims, 11 Drawing Sheets

Related U.S. Application Data continuation of application No. 16/389,906, filed on Apr. 19, 2019, now Pat. No. 10,779,033, which is a continuation of application No. 15/872,500, filed on Jan. 16, 2018, now Pat. No. 10,567,831, which is a continuation of application No. 14/520,578, filed on Oct. 22, 2014, now Pat. No. 9,883,234, which is a continuation of application No. 13/341,237, filed on Dec. 30, 2011, now Pat. No. 9,654,821.

(51) Int. Cl.

| | |
|---|---|
| *G06F 3/04842* | (2022.01) |
| *G06F 3/04847* | (2022.01) |
| *G06F 3/16* | (2006.01) |
| *G11B 19/02* | (2006.01) |
| *H04L 65/612* | (2022.01) |
| *H04N 21/43* | (2011.01) |
| *H04N 21/433* | (2011.01) |
| *H04N 21/439* | (2011.01) |
| *H04N 21/472* | (2011.01) |
| *H04N 21/485* | (2011.01) |
| *H04N 21/61* | (2011.01) |
| *H04N 21/643* | (2011.01) |
| *H04N 21/658* | (2011.01) |
| *H04N 21/6587* | (2011.01) |
| *H04N 21/81* | (2011.01) |
| *H04N 21/858* | (2011.01) |
| *H04R 3/12* | (2006.01) |
| *G06F 3/04817* | (2022.01) |

(52) U.S. Cl.
CPC .......... *G06F 3/04847* (2013.01); *G06F 3/165* (2013.01); *G11B 19/025* (2013.01); *H04L 65/612* (2022.05); *H04N 21/4307* (2013.01); *H04N 21/43076* (2020.08); *H04N 21/4333* (2013.01); *H04N 21/439* (2013.01); *H04N 21/47202* (2013.01); *H04N 21/4852* (2013.01); *H04N 21/6125* (2013.01); *H04N 21/64322* (2013.01); *H04N 21/6581* (2013.01); *H04N 21/6587* (2013.01); *H04N 21/8113* (2013.01); *H04N 21/8586* (2013.01); *H04R 3/12* (2013.01); *G06F 3/04817* (2013.01); *H04R 2227/005* (2013.01); *H04R 2420/07* (2013.01)

(58) Field of Classification Search
CPC ............. H04N 21/439; H04N 21/6125; H04N 21/64322; H04N 21/6587; H04N 21/4307; H04N 21/4333; H04N 21/8586; G06F 3/0481; G06F 3/04842; G06F 3/04847; G06F 3/165; G06F 3/04817; G11B 19/025; H04L 29/06027; H04L 65/4084; H04R 3/12; H04R 2227/005; H04R 2420/07
See application file for complete search history.

(56) References Cited

U.S. PATENT DOCUMENTS

| | | | |
|---|---|---|---|
| 5,616,876 | A | 4/1997 | Cluts |
| 5,642,171 | A | 6/1997 | Baumgartner et al. |
| 5,668,788 | A | 9/1997 | Allison |
| 5,761,320 | A | 6/1998 | Farinelli et al. |
| 5,856,827 | A | 1/1999 | Sudo |
| 5,864,868 | A | 1/1999 | Contois |
| 5,923,902 | A | 7/1999 | Inagaki |
| 6,002,862 | A | 12/1999 | Takaike |
| 6,032,202 | A | 2/2000 | Lea et al. |
| 6,119,239 | A | 9/2000 | Fujii |
| 6,122,749 | A | 9/2000 | Gulick |
| 6,181,316 | B1 | 1/2001 | Little et al. |
| 6,199,076 | B1 | 3/2001 | Logan et al. |
| 6,255,961 | B1 | 7/2001 | Van Ryzin et al. |
| 6,256,554 | B1 | 7/2001 | Dilorenzo |
| 6,404,811 | B1 | 6/2002 | Cvetko et al. |
| 6,446,080 | B1 | 9/2002 | Van Ryzin et al. |
| 6,449,118 | B1 | 9/2002 | Choi et al. |
| 6,469,633 | B1 | 10/2002 | Wachter et al. |
| 6,522,886 | B1 | 2/2003 | Youngs et al. |
| 6,587,127 | B1 | 7/2003 | Leeke et al. |
| 6,611,537 | B1 | 8/2003 | Edens et al. |
| 6,631,410 | B1 | 10/2003 | Kowalski et al. |
| 6,703,940 | B1 | 3/2004 | Allen et al. |
| 6,721,489 | B1 | 4/2004 | Benyamin et al. |
| 6,728,531 | B1 | 4/2004 | Lee et al. |
| 6,731,760 | B2 | 5/2004 | Pedersen |
| 6,732,155 | B2 | 5/2004 | Meek |
| 6,757,517 | B2 | 6/2004 | Chang |
| 6,778,869 | B2 | 8/2004 | Champion |
| 6,826,283 | B1 | 11/2004 | Wheeler et al. |
| 6,832,293 | B1 | 12/2004 | Tagawa et al. |
| 6,910,078 | B1 | 6/2005 | Raman et al. |
| 6,976,087 | B1 | 12/2005 | Westfall et al. |
| 6,985,694 | B1 | 1/2006 | De Bonet et al. |
| 7,017,118 | B1 | 3/2006 | Carroll |
| 7,020,048 | B2 | 3/2006 | McComas |
| 7,020,704 | B1 | 3/2006 | Lipscomb et al. |
| 7,113,833 | B1 | 9/2006 | Brown et al. |
| 7,117,451 | B2 | 10/2006 | Sielken |
| 7,130,608 | B2 | 10/2006 | Hollstrom et al. |
| 7,130,616 | B2 | 10/2006 | Janik |
| 7,143,939 | B2 | 12/2006 | Henzerling |
| 7,178,106 | B2 | 2/2007 | Lamkin et al. |
| 7,187,947 | B1 | 3/2007 | White et al. |
| 7,236,773 | B2 | 6/2007 | Thomas |
| 7,269,338 | B2 | 9/2007 | Janevski |
| 7,295,548 | B2 | 11/2007 | Blank et al. |
| 7,308,489 | B2 | 12/2007 | Weast |
| 7,312,785 | B2 | 12/2007 | Tsuk et al. |
| 7,313,384 | B1 | 12/2007 | Meenan et al. |
| 7,358,960 | B2 | 4/2008 | Mak |
| 7,391,791 | B2 | 6/2008 | Balassanian et al. |
| 7,430,181 | B1 | 9/2008 | Hong |
| 7,454,511 | B2 | 11/2008 | Weast |
| 7,483,538 | B2 | 1/2009 | McCarty et al. |
| 7,509,181 | B2 | 3/2009 | Champion |
| 7,571,014 | B1 | 8/2009 | Lambourne et al. |
| 7,571,244 | B2 | 8/2009 | Costanzo et al. |
| 7,583,886 | B2 | 9/2009 | Komi et al. |
| 7,617,278 | B1 | 11/2009 | Edelman et al. |
| 7,630,501 | B2 | 12/2009 | Blank et al. |
| 7,631,119 | B2 | 12/2009 | Moore et al. |
| 7,643,894 | B2 | 1/2010 | Braithwaite et al. |
| 7,647,613 | B2 | 1/2010 | Drakoulis et al. |
| 7,657,910 | B1 | 2/2010 | McAulay et al. |
| 7,668,939 | B2 | 2/2010 | Encarnacion et al. |
| 7,668,964 | B2 | 2/2010 | Millington |
| 7,689,304 | B2 | 3/2010 | Sasaki |
| 7,702,279 | B2 | 4/2010 | Ko et al. |
| 7,716,699 | B2 | 5/2010 | Evans et al. |
| 7,720,686 | B2 | 5/2010 | Volk et al. |
| 7,725,533 | B2 | 5/2010 | Szeto et al. |
| 7,725,551 | B2 | 5/2010 | Szeto et al. |
| 7,742,740 | B2 | 6/2010 | Goldberg et al. |
| 7,765,315 | B2 | 7/2010 | Batson et al. |
| 7,770,314 | B2 | 8/2010 | Dean |
| 7,792,524 | B2 | 9/2010 | Struthers et al. |
| 7,792,920 | B2 | 9/2010 | Istvan et al. |
| 7,796,190 | B2 | 9/2010 | Basso et al. |
| 7,797,446 | B2 | 9/2010 | Heller et al. |
| 7,797,719 | B2 | 9/2010 | Drakoulis et al. |
| 7,805,682 | B1 | 9/2010 | Lambourne |
| 7,827,259 | B2 | 11/2010 | Heller et al. |
| 7,831,928 | B1* | 11/2010 | Rose .................... G06F 16/958 715/810 |
| 7,853,341 | B2 | 12/2010 | McCarty et al. |
| 7,895,633 | B2 | 2/2011 | Van Hoff et al. |
| 7,958,441 | B2 | 6/2011 | Heller et al. |

(56)        References Cited

U.S. PATENT DOCUMENTS

| | | | |
|---|---|---|---|
| 7,983,614 B2 | 7/2011 | Dunko et al. |
| 7,987,294 B2 | 7/2011 | Bryce et al. |
| 8,014,423 B2 | 9/2011 | Thaler et al. |
| 8,028,323 B2 | 9/2011 | Weel |
| 8,041,438 B2 | 10/2011 | Batson et al. |
| 8,045,952 B2 | 10/2011 | Qureshey et al. |
| 8,050,652 B2 | 11/2011 | Qureshey et al. |
| 8,055,364 B2 | 11/2011 | Champion |
| 8,060,225 B2 | 11/2011 | Hans et al. |
| 8,060,407 B1 | 11/2011 | Delker et al. |
| 8,072,905 B2 | 12/2011 | Haff et al. |
| 8,074,253 B1 | 12/2011 | Nathan |
| 8,099,313 B2 | 1/2012 | Messer et al. |
| 8,103,009 B2 | 1/2012 | McCarty et al. |
| 8,107,639 B2 | 1/2012 | Moeller et al. |
| 8,111,132 B2 | 2/2012 | Allen et al. |
| 8,131,390 B2 | 3/2012 | Braithwaite et al. |
| 8,140,974 B2 | 3/2012 | Hayter et al. |
| 8,148,622 B2 | 4/2012 | Rothkopf et al. |
| 8,156,236 B2 | 4/2012 | Costanzo et al. |
| 8,156,435 B2 | 4/2012 | Wohlert |
| 8,184,641 B2 | 5/2012 | Alt et al. |
| 8,204,890 B1 * | 6/2012 | Gogan ............... G06F 16/4387 |
| | | 707/748 |
| 8,214,740 B2 | 7/2012 | Johnson |
| 8,214,873 B2 | 7/2012 | Weel |
| 8,230,099 B2 | 7/2012 | Weel |
| 8,234,395 B2 | 7/2012 | Millington |
| 8,290,603 B1 | 10/2012 | Lambourne |
| 8,316,154 B2 | 11/2012 | Yoneda et al. |
| 8,341,037 B2 | 12/2012 | Bachman et al. |
| 8,364,296 B2 | 1/2013 | Wilhelm |
| 8,401,681 B2 | 3/2013 | Rosenblatt et al. |
| 8,407,623 B2 | 3/2013 | Kerr et al. |
| 8,423,893 B2 | 4/2013 | Ramsay et al. |
| 8,438,131 B2 | 5/2013 | Prorock et al. |
| 8,468,426 B2 | 6/2013 | Bims |
| 8,473,993 B2 | 6/2013 | Athias |
| 8,483,853 B1 | 7/2013 | Lambourne |
| 8,533,469 B2 | 9/2013 | Song et al. |
| 8,544,046 B2 | 9/2013 | Gran et al. |
| 8,588,949 B2 | 11/2013 | Lambourne et al. |
| 8,601,394 B2 | 12/2013 | Sheehan et al. |
| 8,611,317 B2 | 12/2013 | Banerjea et al. |
| 8,611,559 B2 | 12/2013 | Sanders |
| 8,681,822 B2 | 3/2014 | Bradley et al. |
| 8,688,431 B2 | 4/2014 | Lyons et al. |
| 8,688,991 B1 | 4/2014 | Sunil |
| 8,724,600 B2 | 5/2014 | Ramsay et al. |
| 8,750,677 B2 | 6/2014 | Brown et al. |
| 8,797,926 B2 | 8/2014 | Kearney, III et al. |
| 8,799,395 B2 | 8/2014 | Seidel et al. |
| 8,799,496 B2 | 8/2014 | Phillips et al. |
| 8,805,963 B2 | 8/2014 | Pantos et al. |
| 8,818,538 B2 | 8/2014 | Sakata |
| 8,843,586 B2 | 9/2014 | Pantos et al. |
| 8,850,481 B2 | 9/2014 | Shannon et al. |
| 8,856,847 B2 | 10/2014 | Soroushian |
| 8,880,648 B1 | 11/2014 | Arora et al. |
| 8,892,691 B2 | 11/2014 | Pantos et al. |
| 8,935,580 B2 | 1/2015 | Bims |
| 8,938,675 B2 | 1/2015 | Holladay et al. |
| 8,942,252 B2 | 1/2015 | Balassanian et al. |
| 8,954,177 B2 | 2/2015 | Sanders |
| 8,965,544 B2 | 2/2015 | Ramsay |
| 8,966,394 B2 | 2/2015 | Gates et al. |
| 8,971,914 B2 | 3/2015 | Ortiz |
| 8,972,860 B2 | 3/2015 | Corbett et al. |
| 9,084,089 B2 | 7/2015 | Ng et al. |
| 9,124,607 B2 | 9/2015 | Monteiro et al. |
| 9,137,602 B2 | 9/2015 | Mayman et al. |
| 9,141,616 B2 | 9/2015 | Britt, Jr. et al. |
| 9,154,185 B2 | 10/2015 | Warren et al. |
| 9,179,199 B2 | 11/2015 | Alsina et al. |
| 9,195,775 B2 | 11/2015 | Al-Shaykh et al. |
| 9,232,279 B2 | 1/2016 | Beeson et al. |
| 9,241,355 B2 | 1/2016 | Schulert et al. |
| 9,286,384 B2 | 3/2016 | Kuper et al. |
| 9,318,152 B2 | 4/2016 | Kretz et al. |
| 9,319,815 B2 | 4/2016 | Warren et al. |
| 9,338,206 B2 | 5/2016 | Keum et al. |
| 9,374,607 B2 | 6/2016 | Bates et al. |
| 9,380,414 B2 | 6/2016 | Ortiz |
| 9,386,063 B2 | 7/2016 | McMahon et al. |
| 9,397,627 B2 | 7/2016 | Qureshey et al. |
| 9,451,319 B2 | 9/2016 | Maitre et al. |
| 9,460,631 B2 | 10/2016 | Reilly et al. |
| 9,484,030 B1 | 11/2016 | Meaney et al. |
| 9,490,998 B1 | 11/2016 | Danciu et al. |
| 9,507,780 B2 | 11/2016 | Rothkopf et al. |
| 9,547,650 B2 | 1/2017 | Eyal et al. |
| 9,563,703 B2 | 2/2017 | Nijim et al. |
| 9,565,240 B2 | 2/2017 | Sparks |
| 9,609,448 B2 | 3/2017 | Bentley et al. |
| 9,626,363 B2 | 4/2017 | Rosenblatt et al. |
| 9,635,068 B2 | 4/2017 | Garmark et al. |
| 9,665,339 B2 | 5/2017 | Reimann et al. |
| 9,690,466 B2 | 6/2017 | Coburn et al. |
| 9,699,232 B2 | 7/2017 | Drapeau et al. |
| 9,735,978 B2 | 8/2017 | Kumar et al. |
| 9,788,048 B2 | 10/2017 | Collart et al. |
| 9,798,514 B2 | 10/2017 | Silva et al. |
| 9,819,717 B2 | 11/2017 | Oyman et al. |
| 9,826,306 B2 | 11/2017 | Lang |
| 9,846,767 B2 | 12/2017 | Britt, Jr. et al. |
| 9,882,995 B2 | 1/2018 | Van Erven et al. |
| 9,888,276 B2 | 2/2018 | Bolin |
| 9,967,615 B2 | 5/2018 | Coburn, IV et al. |
| 9,977,561 B2 | 5/2018 | Bates et al. |
| 10,175,932 B2 | 1/2019 | Millington |
| 10,191,980 B2 | 1/2019 | Kumar et al. |
| 10,191,981 B2 | 1/2019 | Kumar et al. |
| 10,270,612 B2 | 4/2019 | Reimann et al. |
| 10,313,754 B2 | 6/2019 | Mudd et al. |
| 10,469,897 B2 | 11/2019 | Reimann et al. |
| 10,484,806 B2 | 11/2019 | Warren et al. |
| 10,587,780 B2 | 3/2020 | Godfrey et al. |
| 10,683,352 B1 | 6/2020 | Kahvejian et al. |
| 10,687,161 B2 | 6/2020 | Proctor, Jr. et al. |
| 10,771,274 B2 | 9/2020 | Reimann et al. |
| 10,818,290 B2 | 10/2020 | Lambourne et al. |
| 11,132,170 B2 | 9/2021 | Lambourne et al. |
| 11,687,586 B2 | 6/2023 | Kumar et al. |
| 11,899,712 B2 | 2/2024 | Coburn, IV et al. |
| 2001/0042107 A1 | 11/2001 | Palm |
| 2002/0002039 A1 | 1/2002 | Qureshey et al. |
| 2002/0022453 A1 | 2/2002 | Balog et al. |
| 2002/0026442 A1 | 2/2002 | Lipscomb et al. |
| 2002/0059637 A1 | 5/2002 | Rakib |
| 2002/0124097 A1 | 9/2002 | Isely et al. |
| 2002/0165721 A1 | 11/2002 | Chang et al. |
| 2002/0165921 A1 | 11/2002 | Sapieyevski |
| 2002/0173273 A1 | 11/2002 | Spurgat et al. |
| 2002/0174243 A1 | 11/2002 | Spurgat et al. |
| 2002/0174269 A1 | 11/2002 | Spurgat et al. |
| 2002/0178191 A1 | 11/2002 | Sielken |
| 2002/0188461 A1 | 12/2002 | Matsumoto |
| 2002/0194309 A1 | 12/2002 | Carter et al. |
| 2003/0011635 A1 | 1/2003 | Hasha et al. |
| 2003/0023741 A1 | 1/2003 | Tomassetti et al. |
| 2003/0079038 A1 | 4/2003 | Robbin et al. |
| 2003/0126211 A1 | 7/2003 | Anttila et al. |
| 2003/0157951 A1 | 8/2003 | Hasty |
| 2003/0198257 A1 | 10/2003 | Sullivan et al. |
| 2003/0210796 A1 | 11/2003 | McCarty et al. |
| 2003/0221541 A1 | 12/2003 | Platt |
| 2003/0225834 A1 | 12/2003 | Lee et al. |
| 2004/0024478 A1 | 2/2004 | Hans et al. |
| 2004/0025185 A1 | 2/2004 | Goci et al. |
| 2004/0078383 A1 | 4/2004 | Mercer et al. |
| 2004/0078812 A1 | 4/2004 | Calvert |
| 2004/0114036 A1 | 6/2004 | Karaoguz et al. |
| 2004/0114579 A1 | 6/2004 | Karaoguz et al. |
| 2004/0117846 A1 | 6/2004 | Karaoguz et al. |

(56)         References Cited

U.S. PATENT DOCUMENTS

| | | |
|---|---|---|
| 2004/0138948 A1 | 7/2004 | Loomis |
| 2004/0193402 A1 | 9/2004 | Nolan et al. |
| 2004/0215611 A1 | 10/2004 | Jawa et al. |
| 2004/0261040 A1 | 12/2004 | Radcliffe et al. |
| 2005/0028225 A1 | 2/2005 | Dawson et al. |
| 2005/0108320 A1 | 5/2005 | Lord et al. |
| 2005/0138193 A1 | 6/2005 | Encarnacion et al. |
| 2005/0152557 A1 | 7/2005 | Sasaki et al. |
| 2005/0155072 A1 | 7/2005 | Kaczowka et al. |
| 2005/0166157 A1 | 7/2005 | Ollis et al. |
| 2005/0177624 A1 | 8/2005 | Oswald et al. |
| 2005/0215239 A1 | 9/2005 | Kopra et al. |
| 2005/0216855 A1 | 9/2005 | Kopra et al. |
| 2005/0235334 A1 | 10/2005 | Togashi et al. |
| 2005/0240494 A1 | 10/2005 | Cue et al. |
| 2005/0251566 A1 | 11/2005 | Weel |
| 2005/0251807 A1 | 11/2005 | Weel |
| 2005/0262204 A1 | 11/2005 | Szeto et al. |
| 2005/0262253 A1 | 11/2005 | Li et al. |
| 2005/0262254 A1 | 11/2005 | Sherwani |
| 2005/0273790 A1 | 12/2005 | Kearney, III et al. |
| 2006/0002681 A1 | 1/2006 | Spilo et al. |
| 2006/0008256 A1 | 1/2006 | Khedouri et al. |
| 2006/0041577 A1 | 2/2006 | Ellicott et al. |
| 2006/0041639 A1 | 2/2006 | Lamkin et al. |
| 2006/0062094 A1 | 3/2006 | Nathan et al. |
| 2006/0107237 A1 | 5/2006 | Kim |
| 2006/0153040 A1 | 7/2006 | Girish et al. |
| 2006/0156236 A1 | 7/2006 | Heller et al. |
| 2006/0159109 A1 | 7/2006 | Lamkin et al. |
| 2006/0168340 A1 | 7/2006 | Heller et al. |
| 2006/0195480 A1 | 8/2006 | Spiegelman et al. |
| 2006/0195521 A1 | 8/2006 | New et al. |
| 2006/0195864 A1 | 8/2006 | New et al. |
| 2006/0206340 A1 | 9/2006 | Silvera et al. |
| 2006/0218294 A1 | 9/2006 | Rosenberg |
| 2006/0242106 A1 | 10/2006 | Bank |
| 2006/0253782 A1 | 11/2006 | Stark et al. |
| 2006/0258289 A1 | 11/2006 | Dua |
| 2006/0263048 A1 | 11/2006 | Sato et al. |
| 2006/0265654 A1 | 11/2006 | Nakamura et al. |
| 2006/0294201 A1 | 12/2006 | Kito et al. |
| 2007/0015457 A1 | 1/2007 | Krampf et al. |
| 2007/0022207 A1 | 1/2007 | Millington |
| 2007/0038999 A1 | 2/2007 | Millington |
| 2007/0053514 A1 | 3/2007 | Imai et al. |
| 2007/0061725 A1 | 3/2007 | Isaac et al. |
| 2007/0067808 A1 | 3/2007 | DaCosta |
| 2007/0083897 A1 | 4/2007 | Brownell |
| 2007/0086724 A1 | 4/2007 | Grady et al. |
| 2007/0106672 A1 | 5/2007 | Sighart et al. |
| 2007/0106726 A1 | 5/2007 | Rosenberg |
| 2007/0116316 A1 | 5/2007 | Goldberg |
| 2007/0136488 A1 | 6/2007 | Cho et al. |
| 2007/0136778 A1 | 6/2007 | Birger et al. |
| 2007/0142944 A1 | 6/2007 | Goldberg et al. |
| 2007/0169087 A1 | 7/2007 | Fadell |
| 2007/0214182 A1 | 9/2007 | Rosenberg |
| 2007/0220150 A1 | 9/2007 | Garg |
| 2007/0250900 A1* | 10/2007 | Marcuvitz .......... H04N 7/17309 |
| | | 725/141 |
| 2007/0266065 A1 | 11/2007 | Rosenberg et al. |
| 2007/0271525 A1 | 11/2007 | Han et al. |
| 2007/0276928 A1 | 11/2007 | Rhoads et al. |
| 2007/0288470 A1 | 12/2007 | Kauniskangas et al. |
| 2008/0005179 A1 | 1/2008 | Friedman et al. |
| 2008/0005690 A1 | 1/2008 | Van Vugt |
| 2008/0010372 A1 | 1/2008 | Khedouri et al. |
| 2008/0016465 A1 | 1/2008 | Foxenland |
| 2008/0018625 A1 | 1/2008 | Ijichi et al. |
| 2008/0025535 A1 | 1/2008 | Rajapakse |
| 2008/0057922 A1 | 3/2008 | Kokes et al. |
| 2008/0059567 A1 | 3/2008 | Williams et al. |
| 2008/0065722 A1 | 3/2008 | Brodersen et al. |
| 2008/0085098 A1 | 4/2008 | Ullmann |
| 2008/0086379 A1 | 4/2008 | Dion et al. |
| 2008/0109852 A1 | 5/2008 | Kretz et al. |
| 2008/0109867 A1 | 5/2008 | Panabaker et al. |
| 2008/0120501 A1 | 5/2008 | Jannink et al. |
| 2008/0133715 A1 | 6/2008 | Yoneda et al. |
| 2008/0133763 A1 | 6/2008 | Clark et al. |
| 2008/0134256 A1 | 6/2008 | DaCosta |
| 2008/0157991 A1 | 7/2008 | Raghunath et al. |
| 2008/0162668 A1 | 7/2008 | Miller |
| 2008/0177822 A1 | 7/2008 | Yoneda |
| 2008/0178296 A1 | 7/2008 | Lemmers |
| 2008/0183840 A1 | 7/2008 | Khedouri et al. |
| 2008/0195239 A1 | 8/2008 | Rotholtz et al. |
| 2008/0209487 A1 | 8/2008 | Osann et al. |
| 2008/0215169 A1 | 9/2008 | Debettencourt et al. |
| 2008/0218409 A1 | 9/2008 | Moinzadeh et al. |
| 2008/0221715 A1 | 9/2008 | Krzyzanowski et al. |
| 2008/0242222 A1 | 10/2008 | Bryce et al. |
| 2008/0243278 A1 | 10/2008 | Dalton et al. |
| 2008/0254751 A1 | 10/2008 | Lazaridis |
| 2008/0291916 A1 | 11/2008 | Xiong et al. |
| 2008/0292120 A1 | 11/2008 | Wilson |
| 2008/0320543 A1 | 12/2008 | Wang et al. |
| 2009/0006542 A1 | 1/2009 | Feldman et al. |
| 2009/0006643 A1 | 1/2009 | Lee |
| 2009/0006968 A1 | 1/2009 | Trask |
| 2009/0030978 A1 | 1/2009 | Johnson et al. |
| 2009/0059512 A1 | 3/2009 | Lydon et al. |
| 2009/0061764 A1 | 3/2009 | Lockhart et al. |
| 2009/0063627 A1 | 3/2009 | Nowacek |
| 2009/0063975 A1 | 3/2009 | Bull et al. |
| 2009/0097818 A1 | 4/2009 | Hirata |
| 2009/0099919 A1 | 4/2009 | Schultheiss et al. |
| 2009/0113053 A1 | 4/2009 | Van Wie et al. |
| 2009/0113301 A1 | 4/2009 | Fisher et al. |
| 2009/0132712 A1 | 5/2009 | P et al. |
| 2009/0150491 A1 | 6/2009 | Yamamoto |
| 2009/0171487 A1 | 7/2009 | Wilhelm |
| 2009/0172542 A1 | 7/2009 | Girish et al. |
| 2009/0197524 A1 | 8/2009 | Haff et al. |
| 2009/0222392 A1 | 9/2009 | Martin et al. |
| 2009/0228123 A1 | 9/2009 | Fontijn |
| 2009/0228897 A1 | 9/2009 | Murray et al. |
| 2009/0228919 A1* | 9/2009 | Zott .................. H04N 7/17318 |
| | | 725/51 |
| 2009/0248702 A1 | 10/2009 | Schwartz et al. |
| 2009/0249222 A1 | 10/2009 | Schmidt et al. |
| 2009/0259765 A1 | 10/2009 | Karlsson et al. |
| 2009/0275285 A1 | 11/2009 | Maricevic et al. |
| 2009/0296702 A1 | 12/2009 | Stevens et al. |
| 2009/0323991 A1 | 12/2009 | Hudson et al. |
| 2010/0005496 A1 | 1/2010 | Ellis et al. |
| 2010/0009674 A1 | 1/2010 | Sapkota et al. |
| 2010/0023578 A1 | 1/2010 | Brant et al. |
| 2010/0027966 A1 | 2/2010 | Harrang et al. |
| 2010/0031366 A1 | 2/2010 | Knight et al. |
| 2010/0042235 A1 | 2/2010 | Basso et al. |
| 2010/0061197 A1 | 3/2010 | Yoshikawa et al. |
| 2010/0082567 A1 | 4/2010 | Rosenblatt et al. |
| 2010/0082725 A1 | 4/2010 | Onishi |
| 2010/0082731 A1 | 4/2010 | Haughay et al. |
| 2010/0082784 A1 | 4/2010 | Rosenblatt et al. |
| 2010/0087214 A1 | 4/2010 | Bournel et al. |
| 2010/0093393 A1 | 4/2010 | Graef |
| 2010/0094833 A1 | 4/2010 | Svendsen et al. |
| 2010/0095332 A1 | 4/2010 | Gran et al. |
| 2010/0110200 A1 | 5/2010 | Lau et al. |
| 2010/0114979 A1 | 5/2010 | Petersen |
| 2010/0121891 A1 | 5/2010 | Zampiello |
| 2010/0131567 A1 | 5/2010 | Dorogusker et al. |
| 2010/0131978 A1 | 5/2010 | Friedlander et al. |
| 2010/0138780 A1 | 6/2010 | Marano et al. |
| 2010/0142725 A1 | 6/2010 | Goldstein et al. |
| 2010/0162117 A1 | 6/2010 | Basso et al. |
| 2010/0162324 A1 | 6/2010 | Mehta et al. |
| 2010/0178873 A1 | 7/2010 | Lee et al. |
| 2010/0198767 A1 | 8/2010 | Farrelly |
| 2010/0198944 A1 | 8/2010 | Ho et al. |
| 2010/0206815 A1 | 8/2010 | Garusi et al. |

(56)                References Cited

U.S. PATENT DOCUMENTS

| | | |
|---|---|---|
| 2010/0211438 A1 | 8/2010 | Lutnick et al. |
| 2010/0211693 A1 | 8/2010 | Master et al. |
| 2010/0228740 A1 | 9/2010 | Cannistraro et al. |
| 2010/0250669 A1 | 9/2010 | Pan |
| 2010/0268360 A1 | 10/2010 | Ingrassia et al. |
| 2010/0284389 A1 | 11/2010 | Ramsay et al. |
| 2010/0299402 A1 | 11/2010 | Korman et al. |
| 2010/0299639 A1 | 11/2010 | Ramsay et al. |
| 2010/0303244 A1 | 12/2010 | Kim et al. |
| 2010/0306815 A1 | 12/2010 | Emerson et al. |
| 2010/0312817 A1 | 12/2010 | Steakley |
| 2010/0318917 A1 | 12/2010 | Holladay et al. |
| 2010/0332565 A1 | 12/2010 | Al-Shaykh et al. |
| 2011/0004330 A1 | 1/2011 | Rothkopf et al. |
| 2011/0014376 A1 | 1/2011 | Sisk et al. |
| 2011/0047574 A1 | 2/2011 | Tecot et al. |
| 2011/0054641 A1 | 3/2011 | Hur et al. |
| 2011/0055901 A1 | 3/2011 | Karaoguz et al. |
| 2011/0060994 A1 | 3/2011 | Maxwell et al. |
| 2011/0060998 A1 | 3/2011 | Schwartz et al. |
| 2011/0063317 A1 | 3/2011 | Gharaat et al. |
| 2011/0066943 A1 | 3/2011 | Brillon et al. |
| 2011/0074794 A1 | 3/2011 | Felt et al. |
| 2011/0107213 A1 | 5/2011 | Johnson et al. |
| 2011/0125809 A1 | 5/2011 | Woods et al. |
| 2011/0126104 A1 | 5/2011 | Woods et al. |
| 2011/0131272 A1 | 6/2011 | Littlejohn et al. |
| 2011/0131518 A1 | 6/2011 | Ohashi |
| 2011/0131520 A1 | 6/2011 | Al-Shaykh et al. |
| 2011/0143769 A1 | 6/2011 | Jones et al. |
| 2011/0161815 A1 | 6/2011 | Iwahara |
| 2011/0173666 A1 | 7/2011 | Yu et al. |
| 2011/0179455 A1 | 7/2011 | Thompson et al. |
| 2011/0202842 A1 | 8/2011 | Weatherly et al. |
| 2011/0218656 A1 | 9/2011 | Bishop et al. |
| 2011/0225496 A1 | 9/2011 | Jeffe et al. |
| 2011/0231660 A1 | 9/2011 | Kanungo |
| 2011/0247035 A1 | 10/2011 | Adimatyam et al. |
| 2011/0252118 A1 | 10/2011 | Pantos et al. |
| 2011/0264732 A1 | 10/2011 | Robbin et al. |
| 2011/0265003 A1 | 10/2011 | Schubert et al. |
| 2011/0265157 A1 | 10/2011 | Ryder |
| 2011/0270742 A1 | 11/2011 | Zmuda |
| 2011/0289135 A1 | 11/2011 | Soldan et al. |
| 2011/0295393 A1 | 12/2011 | Lindahl |
| 2011/0295974 A1 | 12/2011 | Kashef et al. |
| 2011/0314388 A1 | 12/2011 | Wheatley |
| 2012/0014233 A1 | 1/2012 | Lee et al. |
| 2012/0029672 A1 | 2/2012 | Hamilton et al. |
| 2012/0029694 A1 | 2/2012 | Muller |
| 2012/0038541 A1 | 2/2012 | Song et al. |
| 2012/0040720 A1 | 2/2012 | Zhang et al. |
| 2012/0050012 A1 | 3/2012 | Alsina et al. |
| 2012/0054808 A1 | 3/2012 | Nijim et al. |
| 2012/0057853 A1 | 3/2012 | Huber et al. |
| 2012/0079126 A1 | 3/2012 | Evans et al. |
| 2012/0088477 A1 | 4/2012 | Cassidy |
| 2012/0089910 A1 | 4/2012 | Cassidy |
| 2012/0096125 A1 | 4/2012 | Kallai et al. |
| 2012/0110126 A1 | 5/2012 | Sparks |
| 2012/0113964 A1 | 5/2012 | Petersen et al. |
| 2012/0116883 A1 | 5/2012 | Asam et al. |
| 2012/0117026 A1* | 5/2012 | Cassidy .............. G06F 16/4387 |
| | | 707/634 |
| 2012/0117193 A1 | 5/2012 | Phillips et al. |
| 2012/0117586 A1 | 5/2012 | McCoy et al. |
| 2012/0131125 A1 | 5/2012 | Seidel et al. |
| 2012/0147825 A1 | 6/2012 | Hassan et al. |
| 2012/0159372 A1 | 6/2012 | Stallings et al. |
| 2012/0174039 A1 | 7/2012 | Rhoads et al. |
| 2012/0174204 A1 | 7/2012 | Sturm et al. |
| 2012/0185770 A1 | 7/2012 | Hwang et al. |
| 2012/0190398 A1 | 7/2012 | Leukkunen |
| 2012/0192071 A1 | 7/2012 | Millington |
| 2012/0202485 A1 | 8/2012 | Mirbaha et al. |

| | | |
|---|---|---|
| 2012/0210205 A1 | 8/2012 | Sherwood et al. |
| 2012/0210225 A1 | 8/2012 | McCoy et al. |
| 2012/0210378 A1 | 8/2012 | McCoy et al. |
| 2012/0227076 A1 | 9/2012 | McCoy et al. |
| 2012/0233067 A1 | 9/2012 | Matthew et al. |
| 2012/0233639 A1 | 9/2012 | Zott et al. |
| 2012/0272062 A1 | 10/2012 | Lee et al. |
| 2012/0284423 A1 | 11/2012 | Weel et al. |
| 2012/0290653 A1 | 11/2012 | Sharkey |
| 2012/0296947 A1 | 11/2012 | Goto |
| 2012/0304233 A1 | 11/2012 | Roberts et al. |
| 2012/0311094 A1 | 12/2012 | Biderman et al. |
| 2012/0311280 A1* | 12/2012 | Schmidt .............. H04L 67/1014 |
| | | 711/162 |
| 2012/0311618 A1 | 12/2012 | Blaxland et al. |
| 2013/0014015 A1 | 1/2013 | Lambourne |
| 2013/0024018 A1 | 1/2013 | Chang et al. |
| 2013/0024880 A1* | 1/2013 | Moloney-Egnatios ...................... |
| | | H04L 65/00 |
| | | 725/14 |
| 2013/0028263 A1 | 1/2013 | Rajapakse et al. |
| 2013/0047084 A1 | 2/2013 | Sanders et al. |
| 2013/0054742 A1 | 2/2013 | Tsuji et al. |
| 2013/0054863 A1 | 2/2013 | Imes et al. |
| 2013/0067303 A1 | 3/2013 | Kantor et al. |
| 2013/0076651 A1* | 3/2013 | Reimann ............... G06F 3/0486 |
| | | 345/173 |
| 2013/0080955 A1* | 3/2013 | Reimann ............... G06F 3/0486 |
| | | 715/769 |
| 2013/0086003 A1 | 4/2013 | Alsina et al. |
| 2013/0086474 A1 | 4/2013 | Oliver et al. |
| 2013/0091558 A1 | 4/2013 | Kim et al. |
| 2013/0103873 A1* | 4/2013 | Reilly ...................... G06F 3/16 |
| | | 710/303 |
| 2013/0111529 A1 | 5/2013 | Yao et al. |
| 2013/0117299 A1 | 5/2013 | Kraatz et al. |
| 2013/0151728 A1 | 6/2013 | Currier et al. |
| 2013/0157566 A1 | 6/2013 | Oguchi et al. |
| 2013/0159858 A1 | 6/2013 | Joffray et al. |
| 2013/0165164 A1 | 6/2013 | Rowe et al. |
| 2013/0167029 A1 | 6/2013 | Friesen et al. |
| 2013/0191454 A1 | 7/2013 | Oliver et al. |
| 2013/0198264 A1 | 8/2013 | Hellman et al. |
| 2013/0254663 A1* | 9/2013 | Bates ..................... H04R 27/00 |
| | | 715/716 |
| 2013/0263192 A1 | 10/2013 | Woxblom et al. |
| 2013/0290419 A1 | 10/2013 | Spencer et al. |
| 2013/0300546 A1 | 11/2013 | Kim et al. |
| 2013/0326041 A1 | 12/2013 | Bellet et al. |
| 2013/0347117 A1 | 12/2013 | Parks et al. |
| 2014/0006483 A1 | 1/2014 | Garmark et al. |
| 2014/0006947 A1 | 1/2014 | Garmark et al. |
| 2014/0052770 A1 | 2/2014 | Gran et al. |
| 2014/0053182 A1 | 2/2014 | Jääger et al. |
| 2014/0074959 A1 | 3/2014 | Alsina et al. |
| 2014/0075308 A1 | 3/2014 | Sanders et al. |
| 2014/0075314 A1 | 3/2014 | Bachman et al. |
| 2014/0080479 A1 | 3/2014 | Vangala et al. |
| 2014/0096166 A1 | 4/2014 | Gordon et al. |
| 2014/0108929 A1 | 4/2014 | Garmark et al. |
| 2014/0115462 A1 | 4/2014 | Reznor et al. |
| 2014/0122589 A1 | 5/2014 | Fyke et al. |
| 2014/0122737 A1 | 5/2014 | Silberstein et al. |
| 2014/0123005 A1 | 5/2014 | Forstall et al. |
| 2014/0140530 A1 | 5/2014 | Gomes-Casseres et al. |
| 2014/0149544 A1 | 5/2014 | Le Nerriec et al. |
| 2014/0169569 A1 | 6/2014 | Toivanen et al. |
| 2014/0195587 A1 | 7/2014 | Sukoff et al. |
| 2014/0195925 A1 | 7/2014 | Wikander et al. |
| 2014/0201634 A1 | 7/2014 | Hill et al. |
| 2014/0215009 A1 | 7/2014 | Zhang et al. |
| 2014/0229959 A1 | 8/2014 | Beckhardt et al. |
| 2014/0277651 A1 | 9/2014 | Gomes-Casseres et al. |
| 2014/0282755 A1 | 9/2014 | Alsina et al. |
| 2014/0282882 A1 | 9/2014 | Tsui et al. |
| 2014/0347565 A1 | 11/2014 | Fullam et al. |
| 2014/0378056 A1 | 12/2014 | Liu et al. |
| 2015/0026613 A1 | 1/2015 | Kwon et al. |
| 2015/0074527 A1 | 3/2015 | Sevigny et al. |

(56) References Cited

U.S. PATENT DOCUMENTS

| | | |
|---|---|---|
| 2015/0074528 A1 | 3/2015 | Sakalowsky et al. |
| 2015/0256954 A1 | 9/2015 | Carlsson et al. |
| 2015/0286360 A1 | 10/2015 | Wachter |
| 2015/0296268 A1 | 10/2015 | Lee et al. |
| 2015/0304476 A1 | 10/2015 | Katada et al. |
| 2016/0048485 A1 | 2/2016 | Sherwood et al. |
| 2016/0066010 A1 | 3/2016 | Drope |
| 2016/0283192 A1 | 9/2016 | Friesen et al. |
| 2016/0292775 A1 | 10/2016 | Blass |
| 2017/0013066 A1 | 1/2017 | Toprani et al. |
| 2017/0068507 A1 | 3/2017 | Kim et al. |
| 2017/0133007 A1 | 5/2017 | Drewes |
| 2017/0147600 A1 | 5/2017 | Brand |
| 2017/0195266 A1 | 7/2017 | Moyers |
| 2017/0251214 A1 | 8/2017 | Chan et al. |
| 2017/0255698 A1 | 9/2017 | Zhang et al. |
| 2017/0262253 A1 | 9/2017 | Silva et al. |
| 2017/0311008 A1 | 10/2017 | Petersen |
| 2018/0088901 A1 | 3/2018 | Drinkwater et al. |
| 2018/0121158 A1 | 5/2018 | Hinokio et al. |
| 2018/0332341 A1 | 11/2018 | Moloney-Egnatios et al. |
| 2019/0005131 A1 | 1/2019 | Kumar et al. |
| 2019/0228034 A1 | 7/2019 | Kumar et al. |
| 2020/0026489 A1 | 1/2020 | Bromand et al. |
| 2021/0216587 A1 | 7/2021 | Kumar et al. |
| 2022/0075813 A1 | 3/2022 | Rothkopf et al. |

FOREIGN PATENT DOCUMENTS

| | | |
|---|---|---|
| CA | 2824732 A1 | 3/2011 |
| CA | 2832542 A1 | 10/2012 |
| CA | 2947275 A1 | 10/2012 |
| CN | 1363184 A | 8/2002 |
| CN | 1684423 A | 10/2005 |
| CN | 1906604 A | 1/2007 |
| CN | 101009127 A | 8/2007 |
| CN | 101212823 A | 7/2008 |
| CN | 101222493 A | 7/2008 |
| CN | 101268473 A | 9/2008 |
| CN | 101340541 A | 1/2009 |
| CN | 101410773 A | 4/2009 |
| CN | 101595711 A | 12/2009 |
| CN | 101627602 A | 1/2010 |
| CN | 101636727 A | 1/2010 |
| CN | 101689944 A | 3/2010 |
| CN | 102098538 A | 6/2011 |
| CN | 102171687 A | 8/2011 |
| CN | 102281294 A | 12/2011 |
| CN | 102740146 A | 10/2012 |
| CN | 102782669 A | 11/2012 |
| CN | 103093789 A | 5/2013 |
| EP | 1389853 A1 | 2/2004 |
| EP | 1427218 A2 | 6/2004 |
| EP | 1548741 A1 | 6/2005 |
| EP | 1809030 A2 | 7/2007 |
| EP | 2023578 A1 | 2/2009 |
| EP | 2080349 A1 | 7/2009 |
| EP | 2296365 A1 | 3/2011 |
| EP | 2456199 A2 | 5/2012 |
| EP | 2986034 B1 | 5/2017 |
| EP | 3146731 B1 | 12/2017 |
| EP | 2751955 B1 | 11/2019 |
| EP | 3554005 B1 | 11/2020 |
| JP | 2006054521 | 2/2006 |
| JP | 2007060123 A | 3/2007 |
| JP | 2007512718 | 5/2007 |
| JP | 2007512718 A | 5/2007 |
| JP | 2007199220 A | 8/2007 |
| JP | 2008027537 A | 2/2008 |
| JP | 2009044410 | 2/2009 |
| JP | 2010501907 A | 1/2010 |
| JP | 2010067097 A | 3/2010 |
| JP | 2010510696 | 4/2010 |
| JP | 2010530547 A | 9/2010 |
| JP | 4752793 B2 | 8/2011 |
| JP | 2012507052 | 3/2012 |
| JP | 4929520 B2 | 5/2012 |
| JP | 2012248199 A | 12/2012 |
| JP | 2013101631 A | 5/2013 |
| KR | 20090017795 | 2/2009 |
| KR | 20090017795 A | 2/2009 |
| KR | 20130005890 A | 1/2013 |
| TW | 200943962 A | 10/2009 |
| WO | 9709756 A2 | 3/1997 |
| WO | 9927681 A2 | 6/1999 |
| WO | 200147248 A2 | 6/2001 |
| WO | 200153994 | 7/2001 |
| WO | 2003093950 A2 | 11/2003 |
| WO | 2005013047 A2 | 2/2005 |
| WO | 2006068908 A2 | 6/2006 |
| WO | 2007081048 A1 | 7/2007 |
| WO | 2006101635 A3 | 12/2007 |
| WO | 2008047184 A1 | 4/2008 |
| WO | 2008112586 A1 | 9/2008 |
| WO | 2008120111 A1 | 10/2008 |
| WO | 2008133675 A1 | 11/2008 |
| WO | 2009086597 A1 | 7/2009 |
| WO | 2009086599 A1 | 7/2009 |
| WO | 2010053803 A1 | 5/2010 |
| WO | 2010065848 A2 | 6/2010 |
| WO | 2010107490 A1 | 9/2010 |
| WO | 2011020065 A1 | 2/2011 |
| WO | 2011049497 A1 | 4/2011 |
| WO | 2011078879 A1 | 6/2011 |
| WO | 2013049346 A1 | 4/2013 |
| WO | 2013055661 A1 | 4/2013 |
| WO | 2013101727 | 7/2013 |
| WO | 2014149533 A2 | 9/2014 |
| WO | 2014172462 A1 | 10/2014 |

OTHER PUBLICATIONS

First Action Interview Office Action dated Jun. 20, 2016, issued in connection with U.S. Appl. No. 14/520,578, filed Oct. 22, 2014, 5 pages.

International Bureau, International Preliminary Report on Patentability, dated Jul. 10, 2014, issued in connection with International Application No. PCT/US2012/071212, filed Dec. 21, 2012, 8 pages.

International Bureau, International Preliminary Report on Patentability dated Feb. 8, 2018, issued in connection with International Application No. PCT/US2016/043840, filed on Jul. 25, 2016, 10 pages.

International Bureau, International Preliminary Report on Patentability, dated Oct. 29, 2015, issued in connection with International Application No. PCT/US2014/034290, filed on Apr. 16, 2014, 7 pages.

International Bureau, International Preliminary Report on Patentability, dated Oct. 29, 2015, issued in connection with International Application No. PCT/US2014/034372, filed on Apr. 16, 2014, 8 pages.

International Bureau, International Preliminary Report on Patentibility, dated Oct. 29, 2015, issued in connection with International Application No. PCT/US2014/034292, filed on Apr. 16, 2014, 6 pages.

International Searching Authority, International Report on Patentability dated Dec. 10, 2015, issued in connection with International Application No. PCT/US2014/039669, filed on May 28, 2014, 6 pages.

International Searching Authority, International Search Report dated Aug. 14, 2014, issued in connection with International Application No. PCT/US2014/034292, 3 pages.

International Searching Authority, International Search Report dated Aug. 20, 2014, issued in connection with International Application No. PCT/US2014/034372, filed on Apr. 16, 2014,3 pages.

International Searching Authority, International Search Report dated Aug. 21, 2014, issued in connection with International Application No. PCT/US2014/034290, filed on Apr. 16, 2014, 3 pages.

International Searching Authority, International Search Report dated Sep. 22, 2014, issued in connection with International Application No. PCT/US2014/039669, filed on May 28, 2014, 3 pages.

(56)　　　　　　References Cited

OTHER PUBLICATIONS

International Searching Authority, Written Opinion dated Aug. 14, 2014, issued in connection with International Application No. PCT/US2014/034292, filed on Apr. 16, 2014, 4 pages.
International Searching Authority, Written Opinion dated Aug. 20, 2014, issued in connection with International Application No. PCT/US2014/034372, filed on Apr. 16, 2014, 6 pages.
International Searching Authority, Written Opinion dated Aug. 21, 2014, issued in connection with International Application No. PCT/US2014/034290, filed on Apr. 16, 2014, 5 pages.
International Searching Authority, Written Opinion dated Sep. 22, 2014, issued in connection with International Application No. PCT/US2014/039669, filed on May 28, 2014, 5 pages.
Japanese Patent Office, Final Office Action dated Sep. 19, 2017, issued in connection with Japanese Patent Application No. 2016-509047, 1 page.
Japanese Patent Office, Japanese Office Action dated Jul. 12, 2016, issued in connection with Japanese Application No. 2014-550400, 10 pages.
Japanese Patent Office, Japanese Office Action dated Oct. 20, 2015, issued in connection with Japanese Application No. 2014-550400, 8 pages.
Japanese Patent Office, Non-Final Office Action dated Mar. 28, 2017, issued in connection with Japanese Patent Application No. 2016-516750, 5 pages.
Japanese Patent Office, Notice of Rejection dated Dec. 20, 2016, issued in connection with Japanese Application No. 2016-509069, 6 pages.
Japanese Patent Office, Office Action dated Jan. 10, 2017, issued in connection with Japanese Patent Application No. 2016-509046, 7 pages.
Japanese Patent Office, Office Action dated Feb. 14, 2017, issued in connection with Japanese Patent Application No. 2016-509047, 9 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Mate et al., "Movable-Multimedia: Session Mobility in Ubiquitous Computing Ecosystem", XP055019030, 2006, 6 pages.
Motorola, "Simplefi, Wireless Digital Audio Receiver, Installation and User Guide," Dec. 31, 2001, 111 pages.
Nexus. Nexus Q Guidebook. Edition 1.0. Copyright 2012. 27 pages [produced by Google in Hamburg Regional Court, Case No. 327 O 378/20 on Jan. 5, 2021].
Niles SVL-4 Speaker SelectionNolume Control System Installation & Operation Guide. Copyright 1999. Sourced from *Sonos, Inc.* v. *Lenbrook Industries Limited et al.*, Defendants' Answer to Plaintiff's Complaint—Exhibit C, filed Oct. 14, 2019, 16 pages.
Non-Final Office Action dated Feb. 23, 2017, issued in connection with U.S. Appl. No. 13/904,923, filed May 29, 2013, 21 pages.
Non-Final Office Action dated Feb. 2, 2016, issued in connection with U.S. Appl. No. 13/904,936, filed May 29, 2013, 14 pages.
Non-Final Office Action dated Mar. 2, 2015, issued in connection with U.S. Appl. No. 13/904,896, filed May 29, 2013, 15 pages.
Non-Final Office Action dated Dec. 6, 2019, issued in connection with U.S. Appl. No. 16/389,906, filed Apr. 19, 2019, 16 pages.
Non-Final Office Action dated Feb. 7, 2017, issued in connection with U.S. Appl. No. 14/520,578, filed Oct. 22, 2014, 5 pages.
Non-Final Office Action dated Oct. 8, 2014, issued in connection with U.S. Appl. No. 13/341,237, filed Dec. 30, 2011, 12 pages.
Non-Final Office Action dated Mar. 9, 2017, issued in connection with U.S. Appl. No. 13/904,936, filed May 29, 2013, 20 pages.

Non-Final Office Action dated May 9, 2017, issued in connection with U.S. Appl. No. 14/628,952, filed Feb. 23, 2015, 12 pages.
Non-Final Office Action dated Mar. 10, 2015, issued in connection with U.S. Appl. No. 13/864,081, filed Apr. 16, 2013, 13 pages.
Non-Final Office Action dated Aug. 12, 2016, issued in connection with U.S. Appl. No. 13/904,909, filed May 29, 2013, 21 pages.
Non-Final Office Action dated Feb. 13, 2015, issued in connection with U.S. Appl. No. 13/904,936, filed May 29, 2013, 10 pages.
Non-Final Office Action dated Mar. 13, 2015, issued in connection with U.S. Appl. No. 13/904,949, filed May 29, 2013, 20 pages.
Non-Final Office Action dated Dec. 14, 2016, issued in connection with U.S. Appl. No. 13/341,237, filed Dec. 30, 2011, 5 pages.
Non-Final Office Action dated Jun. 16, 2016, issued in connection with U.S. Appl. No. 13/904,932, filed May 29, 2013, 15 pages.
Non-Final Office Action dated Oct. 16, 2018, issued in connection with U.S. Appl. No. 15/263,628, filed Sep. 13, 2016, 7 pages.
Non-Final Office Action dated Apr. 17, 2018, issued in connection with U.S. Appl. No. 14/956,640, filed Dec. 2, 2015, 15 pages.
Non-Final Office Action dated Mar. 17, 2016, issued in connection with U.S. Appl. No. 13/904,923, filed May 29, 2013, 15 pages.
Non-Final Office Action dated Oct. 17, 2018, issued in connection with U.S. Appl. No. 15/135,423, filed Apr. 21, 2016, 13 pages.
Non-Final Office Action dated Nov. 18, 2015, issued in connection with U.S. Appl. No. 13/904,896, filed May 29, 2013, 18 pages.
Non-Final Office Action dated Nov. 18, 2015, issued in connection with U.S. Appl. No. 13/904,932, filed May 29, 2013, 12 pages.
Non-Final Office Action dated Aug. 19, 2015, issued in connection with U.S. Appl. No. 13/864,075, filed Apr. 16, 2013, 18 pages.
Non-Final Office Action dated Jan. 19, 2016, issued in connection with U.S. Appl. No. 13/341,237, filed Dec. 30, 2011, 10 pages.
Non-Final Office Action dated Apr. 20, 2018, issued in connection with U.S. Appl. No. 15/872,500, filed Jan. 16, 2018, 7 pages.
Non-Final Office Action dated Feb. 22, 2017, issued in connection with U.S. Appl. No. 14/520,566, filed Oct. 22, 2014, 14 pages.
Non-Final Office Action dated Apr. 23, 2015, issued in connection with U.S. Appl. No. 13/904,944, filed May 29, 2013, 12 pages.
Non-Final Office Action dated Jun. 24, 2020, issued in connection with U.S. Appl. No. 16/672,798, filed Nov. 4, 2019, 10 pages.
Non-Final Office Action dated Mar. 24, 2015, issued in connection with U.S. Appl. No. 13/864,086, filed Apr. 16, 2013, 14 pages.
Non-Final Office Action dated Jan. 25, 2013, issued in connection with U.S. Appl. No. 13/341,237, filed Dec. 30, 2011, 9 pages.
Non-Final Office Action dated Jul. 25, 2016, issued in connection with U.S. Appl. No. 14/628,952, filed Feb. 23, 2015, 12 pages.
Non-Final Office Action dated Mar. 25, 2016, issued in connection with U.S. Appl. No. 13/904,949, filed May 29, 2013, 13 pages.
Non-Final Office Action dated Dec. 26, 2019, issued in connection with U.S. Appl. No. 16/550,148, filed Aug. 23, 2019, 20 pages.
Non-Final Office Action dated Jul. 26, 2017, issued in connection with U.S. Appl. No. 14/520,578, filed Oct. 22, 2014, 10 pages.
Non-Final Office Action dated Nov. 26, 2013, issued in connection with U.S. Appl. No. 13/341,237, filed Dec. 30, 2011, 15 pages.
Non-Final Office Action dated Dec. 28, 2015, issued in connection with U.S. Appl. No. 14/520,566, filed Oct. 22, 2014, 10 pages.
Non-Final Office Action dated May 28, 2015, issued in connection with U.S. Appl. No. 14/628,952, filed Feb. 23, 2015, 9 pages.
Non-Final Office Action dated Apr. 29, 2020, issued in connection with U.S. Appl. No. 16/372,054, filed Apr. 1, 2019, 34 pages.
Non-Final Office Action dated Jun. 29, 2018, issued in connection with U.S. Appl. No. 13/904,909, filed May 29, 2013, 18 pages.
Non-Final Office Action dated Jun. 3, 2019, issued in connection with U.S. Appl. No. 13/904,909, filed May 29, 2013, 16 pages.
Non-Final Office Action dated Dec. 30, 2014, issued in connection with U.S. Appl. No. 14/520,566, filed Oct. 22, 2014, 10 pages.
Non-Final Office Action dated Oct. 30, 2018, issued in connection with U.S. Appl. No. 14/956,640, filed Dec. 2, 2015, 11 pages.
Non-Final Office Action dated Mar. 7, 2019, issued in connection with U.S. Appl. No. 15/872,500, filed Jan. 16, 2018, 12 pages.
Non-Final Office Action dated Jul. 8, 2019, issued in connection with U.S. Appl. No. 16/389,906, filed Apr. 19, 2019, 14 pages.
Notice of Allowance dated Oct. 9, 2015, issued in connection with U.S. Appl. No. 13/864,086, filed Apr. 16, 2013, 14 pages.

(56) References Cited

OTHER PUBLICATIONS

Notice of Allowance dated Apr. 4, 2017, issued in connection with U.S. Appl. No. 13/904,932, filed May 29, 2013, 5 pages.
Notice of Allowance dated Jun. 6, 2016, issued in connection with U.S. Appl. No. 13/904,944, filed May 29, 2013, 5 pages.
Notice of Allowance dated Nov. 7, 2016, issued in connection with U.S. Appl. No. 14/520,578, filed Oct. 22, 2014, 14 pages.
Notice of Allowance dated Mar. 9, 2017, issued in connection with U.S. Appl. No. 13/904,949, filed May 29, 2013, 13 pages.
Notice of Allowance dated Aug. 10, 2020, issued in connection with U.S. Appl. No. 16/389,906, filed Apr. 19, 2019, 7 pages.
Notice of Allowance dated Jul. 13, 2020, issued in connection with U.S. Appl. No. 16/550,148, filed Aug. 23, 2019, 7 pages.
Notice of Allowance dated Jun. 13, 2016, issued in connection with U.S. Appl. No. 13/864,075, filed Apr. 16, 2013, 11 pages.
Notice of Allowance dated Dec. 16, 2019, issued in connection with U.S. Appl. No. 15/872,500, filed Jan. 16, 2018, 7 pages.
Notice of Allowance dated May 16, 2018, issued in connection with U.S. Appl. No. 15/263,069, filed Sep. 12, 2016, 5 pages.
Notice of Allowance dated Nov. 16, 2018, issued in connection with U.S. Appl. No. 15/626,793, filed Jun. 19, 2017, 13 pages.
Notice of Allowance dated Aug. 17, 2017, issued in connection with U.S. Appl. No. 13/904,923, filed May 29, 2013, 23 pages.
Notice of Allowance dated Nov. 17, 2016, issued in connection with U.S. Appl. No. 13/904,949, filed May 29, 2013, 12 pages.
Notice of Allowance dated Oct. 17, 2017, issued in connection with U.S. Appl. No. 14/520,578, filed Oct. 22, 2014, 8 pages.
Notice of Allowance dated Nov. 18, 2020, issued in connection with U.S. Appl. No. 16/459,854, filed Jul. 2, 2019, 9 pages.
Notice of Allowance dated Sep. 20, 2016, issued in connection with U.S. Appl. No. 13/904,949, filed May 29, 2013, 12 pages.
Notice of Allowance dated Sep. 20, 2019, issued in connection with U.S. Appl. No. 15/872,500, filed Jan. 16, 2018, 7 pages.
Notice of Allowance dated Aug. 21, 2017, issued in connection with U.S. Appl. No. 14/520,566, filed Oct. 22, 2014, 7 pages.
Notice of Allowance dated May 21, 2020, issued in connection with U.S. Appl. No. 16/550,148, filed Aug. 23, 2019, 7 pages.
Notice of Allowance dated Nov. 21, 2018, issued in connection with U.S. Appl. No. 16/107,025, filed Aug. 21, 2018, 14 pages.
Notice of Allowance dated Dec. 22, 2017, issued in connection with U.S. Appl. No. 13/904,936, filed May 29, 2013, 10 pages.
Notice of Allowance dated Jul. 22, 2020, issued in connection with U.S. Appl. No. 16/459,854, filed Jul. 2, 2019, 11 pages.
Notice of Allowance dated Nov. 23, 2016, issued in connection with U.S. Appl. No. 13/904,896, filed May 29, 2013, 18 pages.
Notice of Allowance dated Nov. 23, 2016, issued in connection with U.S. Appl. No. 13/904,932, filed May 29, 2013, 5 pages.
Notice of Allowance dated Jan. 25, 2017, issued in connection with U.S. Appl. No. 13/341,237, filed Dec. 30, 2011, 7 pages.
Notice of Allowance dated Feb. 26, 2016, issued in connection with U.S. Appl. No. 13/864,081, filed Apr. 16, 2013, 13 pages.
Notice of Allowance dated Feb. 26, 2019, issued in connection with U.S. Appl. No. 15/263,628, filed Sep. 13, 2016, 11 pages.
Notice of Allowance dated Jun. 28, 2017, issued in connection with U.S. Appl. No. 13/904,896, filed May 29, 2013, 17 pages.
Advisory Action dated Dec. 2, 2015, issued in connection with U.S. Appl. No. 13/904,936, filed May 29, 2013, 4 pages.
Advisory Action dated Dec. 5, 2016, issued in connection with U.S. Appl. No. 13/904,923, filed May 29, 2013, 5 pages.
Advisory Action dated May 1, 2019, issued in connection with U.S. Appl. No. 13/904,909, filed May 29, 2013, 3 pages.
Advisory Action dated Mar. 13, 2018, issued in connection with U.S. Appl. No. 13/904,909, filed May 29, 2013, 3 pages.
Advisory Action dated Apr. 14, 2017, issued in connection with U.S. Appl. No. 14/628,952, filed Feb. 23, 2015, 3 pages.
Advisory Action dated Dec. 16, 2015, issued in connection with U.S. Appl. No. 13/904,949, filed May 29, 2013, 11 pages.
Advisory Action dated Jun. 16, 2016, issued in connection with U.S. Appl. No. 13/904,896, filed May 29, 2013, 5 pages.

Advisory Action dated Oct. 16, 2013, issued in connection with U.S. Appl. No. 13/341,237, filed Dec. 30, 2011, 3 pages.
Advisory Action dated Sep. 17, 2015, issued in connection with U.S. Appl. No. 14/520,566, filed Oct. 22, 2014, 4 pages.
Advisory Action dated Feb. 25, 2016, issued in connection with U.S. Appl. No. 13/904,944, filed May 29, 2013, 4 pages.
Advisory Action dated Apr. 29, 2016, issued in connection with U.S. Appl. No. 13/864,075, filed Apr. 16, 2013, 3 pages.
Advisory Action dated Oct. 29, 2015, issued in connection with U.S. Appl. No. 13/864,081, filed Apr. 16, 2013, 3 pages.
Anonymous, "Sonos Controller for Mac or PC Product Guide", Retrieved from the Internet, XP055254086, 2013, 108 pages.
Apple. Screenshots of Apple AirPlay. 7 pages [produced by Google in Hamburg Regional Court, Case No. 327 O 378/20 on Jan. 5, 2021].
AudioTron Quick Start Guide, Version 1.0, Mar. 2001, 24 pages.
AudioTron Reference Manual, Version 3.0, May 2002, 70 pages.
AudioTron Setup Guide, Version 3.0, May 2002, 38 pages.
Australian Intellectual Property Office, Patent Examination Report No. 1 dated Jan. 16, 2015, Issued in connection with Australian Patent Application No. 2012362573, 3 pages.
Australian Patent Office, Australian Examination Report Action dated Jul. 3, 2019, issued in connection with Australian Application No. 2018203185, 3 pages.
Australian Patent Office, Australian Examination Report Action dated Jan. 31, 2020, issued in connection with Australian Application No. 2018203185, 4 pages.
Australian Patent Office, Australian Office Action dated Jun. 10, 2020, issued in connection with Australian Application No. 2018203185, 3 pages.
Australian Patent Office, Examination Report dated Mar. 22, 2017, issued in connection with Australian Application No. 2016202175, 3 pages.
Barix Download Exstreamer Software. Accessed via WayBack Machine, Apr. 6, 2003. http://www.barix.com/estreamer/software.download.html. 2 pages.
Barix. Exstreamer Datasheet. Accessed via WayBack Machine, Apr. 2, 2003. http://www.barix.com/exstreamer/, 1 page.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Canadian Patent Office, Canadian Office Action dated Nov. 3, 2016, issued in connection with Canadian Application No. 2,861,790, 4 pages.
Canadian Patent Office, Canadian Office Action dated Dec. 10, 2019, issued in connection with Canadian Application No. 2861790, 5 pages.
Canadian Patent Office, Canadian Office Action dated Nov. 12, 2015, issued in connection with Canadian Application No. 2,861,790, 3 pages.
Canadian Patent Office, Canadian Office Action dated Nov. 22, 2017, issued in connection with CA Application No. 2861790, 4 pages.
Canadian Patent Office, Office Action dated Sep. 13, 2018, issued in connection with Canadian Application No. 2861790, 4 pages.
Chen et al., "What a Juke! A Collaborative Music Sharing System," World of Wireless, Mobile and Multimedia Networks (WOWMOM), 2012 IEEE International Symposium, 2012, 6 pages.
Chinese Patent Office, Chinese Office Action dated Jan. 5, 2017, issued in connection with Chinese Application No. 201280069674.6, 14 pages.
Chinese Patent Office, Chinese Office Action dated Nov. 27, 2020, issued in connection with Chinese Application No. 201910421328.3, 15 pages.
Chinese Patent Office, First Office Action and Translation dated Nov. 25, 2019, issued in connection with Chinese Application No. 201810042292.3, 13 pages.
Chinese Patent Office, First Office Action dated Mar. 5, 2018, issued in connection with Chinese Application No. 2014800424721, 10 pages.

(56) References Cited

OTHER PUBLICATIONS

Chinese Patent Office, First Office Action dated Feb. 2, 2018, issued in connection with Chinese Application No. 2014800340980, 11 pages.

Chinese Patent Office, First Office Action dated Jan. 2, 2018, issued in connection with Chinese Application No. 201480033788.4, 16 pages.

Chinese Patent Office, First Office Action dated Jan. 4, 2018, issued in connection with Chinese Application No. 201480034088.7, 15 pages.

Chinese Patent Office, Second Office Action dated Nov. 13, 2018, issued in connection with Chinese Application No. 201480042472.1, 7 pages.

Chinese Patent Office, Second Office Action dated Oct. 18, 2018, issued in connection with Chinese Application No. 201480034098.0, 7 pages.

Chinese Patent Office, Second Office Action dated Nov. 28, 2018, issued in connection with Chinese Application No. 201480033788.4, 8 pages.

Chinese Patent Office, Second Office Action dated Nov. 28, 2018, issued in connection with Chinese Application No. 201480034088.7, 9 pages.

Chinese Patent Office, Third Office Action dated Mar. 12, 2019, issued in connection with Chinese Application No. 201480034088.7, 7 pages.

Connected, distributed audio solution for your home by barix and Stand-alone, distributed audio solution for your home by barix. Copyright Sep. 2003. Sourced from *Sonos, Inc.* v. *Lenbrook Industries Limited et al.*—Defendants' Answer to Plaintiff's Complaint—Exhibit A filed Oct. 14, 2019, 3 pages.

Corrected Notice of Allowance dated Oct. 6, 2016, issued in connection with U.S. Appl. No. 13/904,949, filed May 29, 2013, 9 pages.

Dell, Inc. "Dell Digital Audio Receiver: Reference Guide," Jun. 2000, 70 pages.

Dell, Inc. "Start Here," Jun. 2000, 2 pages.

"Denon 2003-2004 Product Catalog," Denon, 2003-2004, 44 pages.

European Patent Office, Decision to Refuse European Patent Application dated Dec. 20, 2019, issued in connection with European Application No. 14785247.9, 25 pages.

Twonky Makes Sharing Media at Home Looks Easy, but is it? https://www.nbcbayarea.com/news/local/twonky-makes-sharing-media-at-home-look-easy-but-is-it/2089201/, Nov. 17, 2010, 5 pages. [produced by Google in WDTX Case No. 6:20-cv-00881 on Mar. 5, 2021].

Twonky Mobile App—Quick Review. https://www.youtube.com/watch?v=L9V_al-bubE. Oct. 16, 2010, 3 pages. [produced by Google in WDTX Case No. 6:20-cv-00881 on Mar. 5, 2021].

Twonky Mobile App. https://www.youtube.com/watch?v=PJwwd7LHUHE. Oct. 15, 2010, 3 pages. [produced by Google in WDTX Case No. 6:20-cv-00881 on Mar. 5, 2021].

Twonky Server 6.0 UI Configuration User Guide, 2010, 13 pages. [produced by Google in WDTX Case No. 6:20-cv-00881 on Mar. 5, 2021].

Twonky Wayback Machine. https://web.archive.org/web/20111222005722/http://www.twonky.com/, Dec. 22, 2011, 1 page. [produced by Google in WDTX Case No. 6:20-cv-00881 on Mar. 5, 2021].

TwonkyBeam for Firefox. https://www.youtube.com/watch?v=8H8LyR6QZtQ. Jun. 24, 2011, 3 pages. [produced by Google in WDTX Case No. 6:20-cv-00881 on Mar. 5, 2021].

Universal Plug and Play ("UPnP") AV Architecture:1 for UPnP, Version 1.0, (Jun. 25, 2002) (D+M_0298151-72) (22 pages).

Unofficial Airplay Protocol Specification (https://nto.github.io/AirPlay.html#audio-metadata) 34 pages. [produced by Google in WDTX Case No. 6:20-cv-00881 on Mar. 5, 2021].

Update: Spotify now available on Sonos with software 3.3 upgrade. What Hi-Fi?, (available at https://www.whathiti.com/us/news/update-spotifynow-available-sonos-software-33-upgrade), published Sep. 29, 2010, 9 pages. [produced by Google in WDTX Case No. 6:20-cv-00881 on Mar. 5, 2021].

UPnP Design by Example, A Software Developers Guide to Universal Plug and Play Michael Jeronimo and JackWeast, Intel Press (D+M_0401307-818) (Apr. 2003) (511 pages).

UPnP Forum. UPnP Certified Technology—Your Simple Solution for Home, Office and Small Business Interoperability, Sep. 2010, 21 pages. [produced by Google in WDTX Case No. 6:20-cv-00881 on Mar. 5, 2021].

VideoLAN Wiki. Documentation: Advanced Use of VLC. Last modified Dec. 9, 2014, 13 pages. [produced by Google in WDTX Case No. 6:20-cv-00881 on Mar. 5, 2021].

VLC configure help. VideoLAN Wiki. Last modified Nov. 10, 2016, 9 pages. [produced by Google in WDTX Case No. 6:20-cv-00881 on Mar. 5, 2021].

WDTV Live Set Up Video, YouTube. Dec. 3, 2010, https://www.youtube.com/watch?v=8x1adtpWlaM, 3 pages. [produced by Google in WDTX Case No. 6:20-cv-00881 on Mar. 5, 2021].

Welcome to HP Customer Support. HP TouchSmart 300-1330 Desktop PC Product Specifications, Product No. BT613AA, Aug. 27, 2010, 14 pages. [produced by Google in WDTX Case No. 6:20-cv-00881 on Mar. 5, 2021].

Yong, Kuan. Control YouTube on the desktop, or the TV . . . wit. https://youtube.googleblog.com/2010/11/control-youtube-on-desktop-or-tv-with.html, Nov. 9, 2010, 8 pages. [produced by Google in Wdtx Case No. 6:20-cv-00881 on Mar. 5, 2021].

YouTube Lounge. A compelling YouTube experience in your living room. 10 pages. [produced by Google in WDTX Case No. 6:20-cv-00881 on Mar. 5, 2021].

YouTube Remote—Android Market. https://web.archive.org/web/20111014181427/https://market.android.com/details?id=com.google.android.ytremote, 2 pages. [produced by Google in WDTX Case No. 6:20-cv-00881 on Mar. 5, 2021].

YouTube Remote. YouTube. Nov. 9, 2010, https://www.youtube.com/watch?v=txIPVu6yngQ, 3 pages. [produced by Google in WDTX Case No. 6:20-cv-00881 on Mar. 5, 2021].

*Google Germany GmbH* v. *Sonos, Inc.* Opposition against EP Application No. 191781511 dated Jan. 5, 2021, 39 pages.

Nexus Q User Guide, May 2012, 28 pages.

Notice of Allowance dated Jan. 25, 2021, issued in connection with U.S. Appl. No. 16/372,054, filed Apr. 1, 2019, 11 pages.

Notice of Allowance dated Mar. 3, 2021, issued in connection with U.S. Appl. No. 16/459,854, filed Jul. 2, 2019, 9 pages.

*Sonos, Inc.* v. *Google Germany GmbH*, Google's Submission Case No. 327 O 378/20, Feb. 1, 2021, 20 pages.

*Sonos, Inc.* v. *Google Germany GmbH*, Google's Submission Case No. 327 O 378/20, Jan. 27, 2021, 6 pages.

*Sonos, Inc.* v. *Google Germany GmbH*, Sonos's Submission Case No. 327 O 378/20 Feb. 2, 2021, 17 pages.

*Sonos, Inc.* v. *Google Germany GmbH*, Sonos's Submission Case No. 327 O 378/20, Jan. 20, 2021, 40 pages.

*Sonos, Inc.* v. *Google Germany GmbH*, Sonos's Submission Case No. 327 O 378/20, Jan. 27, 2021, 33 pages.

*Sonos, Inc.* v. *Google LLC*, WDTX Case No. 6:20-cv-00881, Google's Answer and Counterclaims; dated Jan. 8, 2021, 39 pages.

European Patent Office, European Extended Search Report dated Aug. 16, 2017, issued in connection with EP Application No. 16160758.5, 9 pages.

European Patent Office, European Extended Search Report dated May 7, 2020, issued in connection with European Application No. 20159841.4, 16 pages.

European Patent Office, European Office Action dated Aug. 10, 2018, issued in connection with European Application No. 16160758.5, 4 pages.

European Patent Office, European Office Action dated Nov. 14, 2017, issued in connection with EP Application No. 14803651.0, 4 pages.

European Patent Office, European Office Action dated May 25, 2020, issued in connection with European Application No. 19178151.7, 4 pages.

European Patent Office, European Office Action dated Oct. 6, 2017, issued in connection with EP Application No. 14784965.7, 5 pages.

(56) References Cited

OTHER PUBLICATIONS

European Patent Office, European Search Report dated Jul. 22, 2019, issued in connection with European Application No. 19178151.7, 7 pages.

European Patent Office, Exam Report dated Apr. 28, 2016, issued in connection with European Patent Application No. 12861517.6, 6 pages.

European Patent Office, Extended European Search Report dated Aug. 1, 2016, issued in connection with European patent application No. 16160758.5, 11 pages.

European Patent Office, Extended European Search Report dated Jun. 7, 2016, issued in connection with European patent application No. 14803651.0, 10 pages.

European Patent Office, Extended European Search Report dated Jun. 9, 2015, issued in connection with European patent application No. 12861517.6, 11 pages.

European Patent Office, Extended European Search Report dated Sep. 9, 2016, issued in connection with European patent application No. 14785247.9, 10 pages.

European Patent Office, Extended European Search Report dated Oct. 18, 2016, issued in connection with European patent application No. 14785806.2, 9 pages.

European Patent Office, Extended European Search Report dated Nov. 21, 2016, issued in connection with European Application No. 147849651-1870, 6 pages.

European Patent Office, Office Action dated Apr. 7, 2017, issued in connection with European Application No. 14803651.0, 4 pages.

European Patent Office, Office Action dated May 11, 2017, issued in connection with European Application 14785247.9, 9 pages.

European Patent Office, Summons to Attend Oral Proceedings mailed on Dec. 1, 2016, issued in connection with European Application No. 12861517.6-1905, 11 pages.

European Patent Office, Summons to Attend Oral Proceedings mailed on Jul. 12, 2019, issued in connection with European Application No. 14785247.9, 12 pages.

European Patent Office, Summons to Attend Oral Proceedings mailed on Jun. 23, 2020, issued in connection with European Application No. 16160758.5, 10 pages.

Exstreamer—The Exstreamer Instruction Manual Version 1.5. Barix Think Further. Sourced from *Sonos, Inc.* v. *Lenbrook Industries Limited et al.*, Defendants' Answer to Plaintiff's Complaint—Exhibit E, filed Oct. 14, 2019, 21 pages.

Exstreamer—The Exstreamer Technical Description Version 1.5. Barix Think Further. Sourced from *Sonos, Inc.* v. *Lenbrook Industries Limited et al.*, Defendants' Answer to Plaintiff's Complaint—Exhibit D, filed Oct. 14, 2019, 36 pages.

Exstreamer. Network MP3 player for digital audio streaming in a consumer, home installation and commercial applications. Barix Think Further. Sep. 2002, 2 pages.

Exstreamer. The Exstreamer Instruction Manual. Barix Think Further. Version 1.5 , Oct. 2002, 21 pages.

Exstreamer. The Exstreamer Technical Description: Version 1.5. Barix Think Further. Oct. 2002, 36 pages.

Final Office Action dated Jun. 2, 2016, issued in connection with U.S. Appl. No. 14/520,566, filed Oct. 22, 2014, 12 pages.

Final Office Action dated Aug. 6, 2013, issued in connection with U.S. Appl. No. 13/341,237, filed Dec. 30, 2011, 14 pages.

Final Office Action dated Dec. 7, 2015, issued in connection with U.S. Appl. No. 13/864,075, filed Apr. 16, 2013, 16 pages.

Final Office Action dated Feb. 7, 2017, issued in connection with U.S. Appl. No. 14/628,952, filed Feb. 23, 2015, 15 pages.

Final Office Action dated Jul. 8, 2015, issued in connection with U.S. Appl. No. 14/520,566, filed Oct. 22, 2014, 8 pages.

Final Office Action dated Mar. 10, 2016, issued in connection with U.S. Appl. No. 13/904,932, filed May 29, 2013, 16 pages.

Final Office Action dated Dec. 12, 2019, issued in connection with U.S. Appl. No. 13/904,909, filed May 29, 2013, 21 pages.

Final Office Action dated Sep. 13, 2019, issued in connection with U.S. Appl. No. 16/389,906, filed Apr. 19, 2019, 11 pages.

Final Office Action dated Apr. 14, 2014, issued in connection with U.S. Appl. No. 13/341,237, filed Dec. 30, 2011, 12 pages.

Final Office Action dated Dec. 15, 2017, issued in connection with U.S. Appl. No. 13/904,909, filed May 29, 2013, 12 pages.

Final Office Action dated May 15, 2017, issued in connection with U.S. Appl. No. 14/520,566, filed Oct. 22, 2014, 12 pages.

Final Office Action dated Mar. 18, 2019, issued in connection with U.S. Appl. No. 14/956,640, filed Dec. 2, 2015, 12 pages.

Final Office Action dated May 19, 2016, issued in connection with U.S. Appl. No. 14/520,578, filed Oct. 22, 2014, 12 pages.

Final Office Action dated Jan. 20, 2016, issued in connection with U.S. Appl. No. 14/628,952, filed Feb. 23, 2015, 10 pages.

Final Office Action dated Sep. 20, 2017, issued in connection with U.S. Appl. No. 13/904,936, filed May 29, 2013, 22 pages.

Final Office Action dated Mar. 21, 2016, issued in connection with U.S. Appl. No. 13/904,896, filed May 29, 2013, 19 pages.

Final Office Action dated Sep. 21, 2016, issued in connection with U.S. Appl. No. 13/904,923, filed May 29, 2013, 19 pages.

Final Office Action dated Apr. 22, 2015, issued in connection with U.S. Appl. No. 13/341,237, filed Dec. 30, 2011, 11 pages.

Final Office Action dated Jun. 23, 2015, issued in connection with U.S. Appl. No. 13/904,896, filed May 29, 2013, 16 pages.

Final Office Action dated Oct. 23, 2015, issued in connection with U.S. Appl. No. 13/904,944, filed May 29, 2013, 13 pages.

Final Office Action dated Aug. 24, 2016, issued in connection with U.S. Appl. No. 13/341,237, filed Dec. 30, 2011, 12 pages.

Final Office Action dated Aug. 25, 2015, issued in connection with U.S. Appl. No. 13/864,081, filed Apr. 16, 2013, 15 pages.

Final Office Action dated Sep. 25, 2015, issued in connection with U.S. Appl. No. 13/904,949, filed May 29, 2013, 14 pages.

Final Office Action dated Aug. 28, 2015, issued in connection with U.S. Appl. No. 13/904,936, filed May 29, 2013, 10 pages.

Final Office Action dated Aug. 29, 2016, issued in connection with U.S. Appl. No. 13/904,936, filed May 29, 2013, 21 pages.

Final Office Action dated Jan. 7, 2019, issued in connection with U.S. Appl. No. 15/872,500, filed Jan. 16, 2018, 7 pages.

AirPlay vs Sonos: choose the best audio streaming for your studio. Creative Blog. (available athttps://web.archive.org/web/20121207090525/http://www.creativebloq.com/hardware/airplay-vs-sonos-12121441), published Dec. 5, 2012, 15 pages. [produced by Google in WDTX Case No. 6:20-cv-00881 on Mar. 5, 2021].

Apple Launches iPad—Apple. Press Release (available at https://www.apple.com/newsroom/2010/01/27Apple-Launches-iPad/), published Jan. 27, 2010, 4 pages. [produced by Google in WDTX Case No. 6:20-cv-00881 on Mar. 5, 2021].

Bassoli et al. TunA: Local music sharing with handheld Wi-Fi devices. In Proc of 5th Wireless World Conference 2004, 23 pages. [produced by Google in WDTX Case No. 6:20-cv-00881 on Mar. 5, 2021].

Breen, Christopher. Sonos Play:3. Capsule Review. Macworld, published Jul. 25, 2011, 8 pages. [produced by Google in WDTX Case No. 6:20-cv-00881 on Mar. 5, 2021].

Broida, Rick. Turn an Extra PC Into a Second Monitor. CBS News. Nov. 19, 2009, 6 pages. [produced by Google in WDTX Case No. 6:20-cv-00881 on Mar. 5, 2021].

Carnoy et al. Apple AirPlay: 10 things you need to know. Wondering what Apple's AirPlay wireless streaming feature is all about? Here's a little primer to get you started. Apr. 4, 2011, 10 pages.[produced by Google in WDTX Case No. 5:20-cv-00881 on Mar. 5, 2021].

Chandra, Surendar. Lean back with YouTube and Android. FXPAL, Nov. 11, 2010, 2 pages. [produced by Google in WDTX Case No. 6:20-cv-00881 on Mar. 5, 2021].

Chen et al. Session Mobility of SIP Over Multiple Devices. InProceedings of the 4th International Conference on Testbeds and research infrastructures for the development of networks & communities. Mar. 18, 2008, 9 pages. [produced by Google in WDTX Case No. 6:20-cv-00881 on Mar. 5, 2021].

Chen et al. "SSIP: Split a SIP session over multiple devices." Computer Standards & Interfaces 29.5, Jan. 17, 2007: 531-545. https://www.sciencedirect.com/science/article/abs/pii/S0920548906001310, 15 pages. [produced by Google in WDTX Case No. 6:20-cv-00881 on Mar. 5, 2021].

(56)　　　　　References Cited

OTHER PUBLICATIONS

Chinese Patent Office, First Office Action and Translation dated Apr. 6, 2021, issued in connection with Chinese Application No. 201911256710.X, 12 pages.

Clementine is a Modern Music Player and Library Organizer. About and Features Clementine 1.0, Jul. 17, 2010 3 pages. [produced by Google in WDTX Case No. 6:20-cv-00881 on Mar. 5, 2021].

ContentDirectory:1 Service Template Version 1.01 for UPnP, Version 1.0 (Jun. 25, 2002) (89 pages).

Copy for Nexus Q Accessories on Play Store, 8 pages. [produced by Google in WDTX Case No. 6:20-cv-00881 on Mar. 5, 2021].

DLNA. Digital Living Network Alliance. Overview and Vision Whitepaper 2007, 23 pages. [produced by Google in WDTX Case No. 6:20-cv-00881 on Mar. 5, 2021].

Documentation:Streaming HowTo-VideoLAN Wiki, last modified Nov. 29, 2010, 2 pages. [produced by Google in WDTX Case No. 6:20-cv-00881 on Mar. 5, 2021].

Documentation:Streaming HowTo/Advanced Streaming Using the Command Line—VideoLAN Wiki, last modified No. 9, 2014, 16 pages. [produced by Google in WDTX Case No. 6:20-cv-00881 on Mar. 5, 2021].

Documentation:Streaming HowTo/Command Line Examples—VideoLAN Wiki, last modified Nov. 9, 2014, 6 pages. [produced by Google in WDTX Case No. 6:20-cv-00881 on Mar. 5, 2021].

Documentation:Streaming HowTo/Easy Streaming—VideoLAN Wiki, last modified Feb. 3, 2017, 5 pages. [produced by Google in WDTX Case No. 6:20-cv-00881 on Mar. 5, 2021].

Documentation:Streaming HowTo/Receive and Save a Stream—VideoLAN Wiki, last modified Nov. 10, 2014, 3 pages. [produced by Google in WDTX Case No. 6:20-cv-00881 on Mar. 5, 2021].

Documentation:Streaming HowTo/Stream from Encoding Cards and Other Capture Devices—VideoLAN Wiki (Last modified Jan. 1, 2012), 5 pages. [produced by Google in WDTX Case No. 6:20-cv-00881 on Mar. 5, 2021].

Documentation:Streaming HowTo/Streaming, Muxers and Codecs—VideoLAN Wiki, last modified Feb. 9, 2015, 3 pages. [produced by Google in WDTX Case No. 6:20-cv-00881 on Mar. 5, 2021].

European Patent Office, European Extended Search Report dated Apr. 29, 2021, issued in connection with European Application No. 20204548.0, 8 pages.

G. Shultz. SolutionBase: Add multiple monitors without additional video cards using MaxiVista—TechRepublic (Jun. 4, 2004), 11 pages. [produced by Google in WDTX Case No. 6:20-cv-00881 on Mar. 5, 2021].

Getting to know Logitech Squeezebox Touch Wi-Fi Music Player. Features Guide, 2010, 31 pages. [produced by Google in WDTX Case No. 6:20-cv-00881 on Mar. 5, 2021].

Google announces Nexus Q, streaming-media ball—CNET News. YouTube. Jun. 27, 2012, https://www.youtube.com/watch?v=LrDVQBGZUbY, 4 pages. [produced by Google in WDTX Case No. 6:20-cv-00881 on Mar. 5, 2021].

Google I/O 2011: Keynote Day One. YouTube. May 10, 2011, https://youtu.be/OxzucwjFEEs?t=2808, 4 pages. [produced by Google in WDTX Case No. 6:20-cv-00881 on Mar. 5, 2021].

Google Music beta demo from Google I/O 2011 Video. YouTube. May 10, 2011, https://www.youtube.com/watch?v=9ZIgcuG3sZc, 3 pages. [produced by Google in WDTX Case No. 6:20-cv-00881 on Mar. 5, 2021].

Google Nexus Q: Unboxing & Review Video, YouTube. Aug. 30, 2012, https://www.youtube.com/watch?v=3NlloeUXWTI&list=PLkDBJgq9S5BD9dfS-JEiUC-kdi7K3y5fU&index=26, 4 pages. [produced by Google in WDTX Case No. 6:20-cv-00881 on Mar. 5, 2021].

Gralla, Preston. MaxiVista Turns Other PCs Into Multiple Monitors. PCWorld. Dec. 17, 2009, 2 pages. [produced by Google in WDTX Case No. 6:20-cv-00881 on Mar. 5, 2021].

Home Networking with Universal Plug and Play, IEEE Communications Magazine, vol. 39 No. 12 (Dec. 2001) (D+M_0402025-40) (16 pages).

How to control Google TV or YouTube Leanback with YouTube Remote. YouTube. Nov. 14, 2010, https://www.youtube.com/watch?v=EGdsOsIqG2s, 3 pages. [produced by Google in WDTX Case No. 6:20-cv-00881 on Mar. 5, 2021].

IFA 2010: Spotify for Sonos multi-room music systems demoed. YouTube. Sep. 4, 2010, https://www.youtube.com/watch?v=3UcmwoCRnbw, 3 pages. [produced by Google in WDTX Case No. 6:20-cv-00881 on Mar. 5, 2021].

IHome Air Series. iW1 User Manual: AirPlay wireless speaker system with rechargeable battery, Copyright 2011, 20 pages. [produced by Google in WDTX Case No. 6:20-cv-00881 on Mar. 5, 2021].

IHome iW1 Airplay Series Set-up Guide. YouTube. Nov. 9, 2011, https://www.youtube.com/watch?v=OfSsWnRnkFw, 3 pages. [produced by Google in WDTX Case No. 6:20-cv-00881 on Mar. 5, 2021].

IHome iW1 AirPlay Wireless Speaker Overview | Crutchfield Video. YouTube. Sep. 14, 2011, https://www.youtube.com/watch?v=aL273y_rq0M, 3 pages. [produced by Google in WDTX Case No. 6:20-cv-00881 on Mar. 5, 2021].

IHome iW1 Quick Start Guide (https://cdn.ihomeaudio.com/media/product/files/iW1_Quick_Start_Guide_1.pdf), 2 pages. [produced by Google in WDTX Case No. 6:20-cv-00881 on Mar. 5, 2021].

It's a Sphere! The Inside Story of Nexus Q, Google's Music Hardware Gamble https://www.wired.com/2012/06/google-nexus-q-revealed/, Jun. 2012, 19 pages.[produced by Google in WDTX Case No. 6:20-cv-00881 on Mar. 5, 2021].

UBL on Air Wireless Airplay Speaker Dock, copyright 2010, 21 pages. [produced by Google in WDTX Case No. 6:20-cv-00881 on Mar. 5, 2021].

Johnson, Steve. Microsoft Windows 7 on Demand. Perspection Inc. 2010, 576 pages. [produced by Google in WDTX Case No. 6:20-cv-00881 on Mar. 5, 2021].

K.S. Bhogal. Expanding Your Screen Real Estate with MaxiVista (https://www.informit.com/articles/printerfriendly/484551) (Jul. 7, 2006), 4 pages. [produced by Google in WDTX Case No. 6:20-cv-00881 on Mar. 5, 2021].

Lawler, R. YouTube Remote app released, controls Leanback on GTV or PC from your Android phone. Engadget. Nov. 9, 2010, 4 pages. [produced by Google in WDTX Case No. 6:20-cv-00881 on Mar. 5, 2021].

Logitech. Squeezebox Boom. All-in-one network music player. User Guide, copyright 2008, 22 pages. [produced by Google in WDTX Case No. 6:20-cv-00881 on Mar. 5, 2021].

Logitech. Squeezebox Radio. Wi-Fi Internet Radio Feature Guide, copyright 2009, 31 pages. [produced by Google in WDTX Case No. 6:20-cv-00881 on Mar. 5, 2021].

MaxiVista. User Manual, 2004, 12 pages. [produced by Google in WDTX Case No. 6:20-cv-00881 on Mar. 5, 2021].

MaxiVista v2. User's Manual, 2005, 22 pages. [produced by Google in WDTX Case No. 6:20-cv-00881 on Mar. 5, 2021].

Milian, Mark. CNN. Review: Wireless speaker system keeps rooms in sync (available athttps://web.archive.org/web/20110817023534/http://edition.cnn.com/2011/TECH/gaming.gadgets/08/16/sonos.play3.review/index.html), published Aug. 16, 2011, 2 pages. [produced by Google in WDTX Case No. 6:20-cv-00881 on Mar. 5, 2021].

Moran, Joseph. Bartels Media MaxiVista Pro. PracticallyNetworked. com, Jul. 31, 2008, 3 pages. [produced by Google in WDTX Case No. 6:20-cv-00881 on Mar. 5, 2021].

Moran, Joseph. Extend Your PC Display Over the Network with MaxiVista 4. Practically Networked, Aug. 1, 2017, 2 pages. [produced by Google in WDTX Case No. 6:20-cv-00881 on Mar. 5, 2021].

Murph, Darren. IOGEAR's Wireless USB to VGA kit extends your monitor sans wires, Aug. 25, 2008, 4 pages. [produced by Google in WDTX Case No. 6:20-cv-00881 on Mar. 5, 2021].

Music Beta by Google. Android Market. https://web.archive.org/web/20111012055456/https://market.android.com/details?id=com.google.android.music, Oct. 12, 2011, 2 pages. [produced by Google in WDTX Case No. 6:20-cv-00881 on Mar. 5, 2021].

(56) References Cited

OTHER PUBLICATIONS

Music by Google—Beta—Google I/O Apr. 2011. YouTube. May 11, 2011, https://www.youtube.com/watch?v=FC90GqKNGd8, 3 pages. [produced by Google in WDTX Case No. 6:20-cv-00881 on Mar. 5, 2021].

Nemerovski, John. iW1 AirPlay Wireless Audio System Review. mymac.com. Nov. 28, 2011, 6 pages. [produced by Google in WDTX Case No. 6:20-cv-00881 on Mar. 5, 2021].

New Twonky App Beams Videos from Your Tablet to TV, 4 pages. [produced by Google in WDTX Case No. 6:20-cv-00881 on Mar. 5, 2021].

NewsRoom.Slim Devices Introduces Squeezebox. PR Newswire. Nov. 18, 2003, 2 pages.

Notice of Allowance dated Apr. 28, 2021, issued in connection with U.S. Appl. No. 16/448,896, filed Jun. 21, 2019, 20 pages.

Notice of Allowance dated May 5, 2021, issued in connection with U.S. Appl. No. 16/672,798, filed Nov. 4, 2019, 5 pages.

Onkyo AV Receiver TX-SR876 TX-NR906, 2008, 150 pages. [produced by Google in WDTX Case No. 6:20-cv-00881 on Mar. 5, 2021].

Panasonic. Toughbook 29. Specification Sheet, Jul. 2006, 2 pages. [produced by Google in WDTX Case No. 6:20-cv-00881 on Mar. 5, 2021].

Principled Technologies. A performance comparison of current and previous generation Dell Latitude notebook systems. Oct. 2009, 51 pages. [produced by Google in WDTX Case No. 6:20-cv-00881 on Mar. 5, 2021].

Reisinger, Don, "Make Your House Rock from Any Room," PCWorld: TechHive, Jul. 19, 2011, 5 pages. [produced by Google in WDTX Case No. 6:20-cv-00881 on Mar. 5, 2021].

Salvator, Dave. Intel Pushes Plug and Play Into Homes. Extremetech. com. Sep. 10, 2002, 10 pages. [produced by Google in WDTX Case No. 6:20-cv-00881 on Mar. 5, 2021].

Screen parameters—The VideoLAN Forums. Last post Jan. 10, 2009, 3 pages. [produced by Google in WDTX Case No. 6:20-cv-00881 on Mar. 5, 2021].

Seta et al. ALL-SIP Mobility: Session Continuity on Handover in Heterogeneous Access Environment. In 2007 IEEE 65th Vehicular Technology Conference—VTC2007—Spring Apr. 22, 2007 Apr. 22, pp. 1121-1126. [produced by Google in WDTX Case No. 6:20-cv-00881 on Mar. 5, 2021].

Sinofsky, Steven. Media Streaming with Windows 7—Engineering Windows 7, May 12, 2009, 13 pages. [produced by Google in WDTX Case No. 6:20-cv-00881 on Mar. 5, 2021].

Sonos Digital Music System User Guide, Jun. 2007, 193 pages. [produced by Google in WDTX Case No. 6:20-cv-00881 on Mar. 5, 2021].

Sonos, Inc. v. Google Germany GmbH, Google's Submission for alleged patent infringement of EP3554005 Case No. 327 O 378/20. Feb. 2, 2021, 10 pages.

Sonos, Inc. v. Google Germany GmbH, Google's Supplementary Statement for alleged patent infringement of EP3554005 Case No. 327 O 378/20. Apr. 15, 2021, 82 pages.

Sonos, Inc. v. Google Germany GmbH, Grounds for Appeal Case No. 327 O 378/20. Apr. 26, 2021, 31 pages.

Sonos, Inc. v. Google Germany GmbH, Judgment for alleged patent infringement of EP3554005 Case No. 327 O 378/20. Feb. 25, 2021, 22 pages.

Sonos, Inc. v. Google Germany GmbH, Oral Hearing Transcript for alleged patent infringement of EP3554005 Case No. 327 O 378/20. Jan. 28, 2021, 8 pages.

Sonos, Inc v. Google Ireland Limited, Google's Comments on the Hearing Case No. 327 O 36/21. Apr. 29, 2021, 4 pages.

Sonos, Inc v. Google Ireland Limited, Google's Exhibit A3 in Reply to Preliminary Injunction Submission for alleged patent infringement EP3554005 Case No. 327 O 36/21. Feb. 22, 2021, 414 pages.

Sonos, Inc v. Google Ireland Limited, Google's Exhibit A7 in Reply to Preliminary Injunction Submission for alleged patent infringement EP3554005 Case No. 327 O 36/21. Feb. 22, 2021, 1 page.

Sonos, Inc v. Google Ireland Limited, Google's Exhibit D1 in Reply to Preliminary Injunction Submission for alleged patent infringement EP3554005 Case No. 327 O 36/21. Feb. 22, 2021, 2 pages.

Sonos, Inc v. Google Ireland Limited, Google's Exhibit D3 in Reply to Preliminary Injunction Submission for alleged patent infringement EP3554005 Case No. 327 O 36/21. Feb. 22, 2021, 3 pages.

Sonos, Inc v. Google Ireland Limited, Google's Exhibit D3a in Reply to Preliminary Injunction Submission for alleged patent infringement EP3554005 Case No. 327 O 36/21. Feb. 22, 2021, 7 pages.

Sonos, Inc v. Google Ireland Limited, Google's Exhibit D3b in Reply to Preliminary Injunction Submission for alleged patent infringement EP3554005 Case No. 327 O 36/21. Feb. 22, 2021, 6 pages.

Sonos, Inc v. Google Ireland Limited, Google's Exhibit D3c in Reply to Preliminary Injunction Submission for alleged patent infringement EP3554005 Case No. 327 O 36/21. Feb. 22, 2021, 4 pages.

Sonos, Inc v. Google Ireland Limited, Google's Statement and Supplemental Response to their Reply of Feb. 22, 2021. Case No. 327 O 36/21. Apr. 15, 2021, 37 pages.

Sonos, Inc v. Google Ireland Limited, Google's Summary of Arguments of D4. Exhibit submitted with Comments on the Hearing Case No. 327 O 36/21. Apr. 29, 2021, 2 pages.

Sonos, Inc v. Google Ireland Limited. Judgment. Case No. 327 O 36/21. Apr. 29, 2021, 28 pages.

Sonos, Inc v. Google Ireland Limited, Minutes of Preliminary Injunction Hearing. Case No. 327 O 36/21. Apr. 29, 2021, 3 pages.

Sonos, Inc v. Google Ireland Limited, Reply to Preliminary Injunction Submission for alleged patent infringement EP3554005 Case No. 327 O 36121. Feb. 22, 2021, 131 pages.

Sonos, Inc v. Google Ireland Limited, Sonos's Reply to Respondents Brief dated Apr. 15, 2021. Case No. 327 O 36/21. Apr. 26, 2021. 6 pages.

Sonos, Inc v. Google Ireland Limited, Sonos's Reply to Respondents Response dated Feb. 22, 2021. Case No. 327 O 36/21. Apr. 18, 2021. 64 pages.

Sonos, "Sonos Play: 5 (Formerly S5) Product Guide," 2004-2011, 14 pages.

Sonos Play:5 (available at https://youtu.be/XG1_L_214G0), Jul. 14, 2011, 2 pages.[produced by Google in WDTX Case No. 6:20-cv-00881 on Mar. 5, 2021].

Sonos ZonePlayer S5. Press Release. Sonos Multi-Room Music System, Nov. 3, 2009, 2 pages. [produced by Google in WDTX Case No. 6:20-cv-00881 on Mar. 5, 2021].

Sonos. ZonePlayer S5. Product Guide Version:091101, copyright 2004-2009, 180 pages. [produced by Google in WDTX Case No. 6:20-cv-00881 on Mar. 5, 2021].

Sonos ZonePlayer S5. Specification Sheet, 2009, 2 pages. [produced by Google in WDTX Case No. 6:20-cv-00881 on Mar. 5, 2021].

Squeezebox by Logitech. Owner's Guide, 2007, 32 pages.

Squeezebox Network Music Player. Owner's Manual, Slim Devices, 2003, 22 pages.

Stähle et al. "Real-Time Multimedia Session Splitting and Seamless Mobility in Session Initiation Protocol Environments." MMEDIA 2011: 136-141 https://www.iaria.org/conferences2011/MMEDIA11.htm1, 6 pages. [produced by Google in WDTX Case No. 6:20-cv-00881 on Mar. 5, 2021].

Thurrott et al. Windows 7 Secrets. Wiley Publishing, Inc., 2009, 1083 pages. [produced by Google in WDTX Case No. 5:20-cv-00881 on Mar. 5, 2021].

Twonky Beam for Android. https://www.youtube.com/watch?t=18&v=1X-RNTRvymw (Android version) Sep. 29, 2011, 3 pages. [produced by Google in WDTX Case No. 6:20-cv-00881 on Mar. 5, 2021].

Twonky Beam for iOS. https://www.youtube.com/watch?v=IMambsaOAHw (iOS version) Sep. 29, 2011, 3 pages. [produced by Google in WDTX Case No. 6:20-cv-00881 on Mar. 5, 2021].

Twonky for Mobile. Twonky Mobile Apps. Twonky Suite Media Manager. https://web.archive.org/web/20111129152735/http://www.twonky.com/products/twonkym, 2 pages. [produced by Google in WDTX Case No. 6:20-cv-00881 on Mar. 5, 2021].

(56) References Cited

OTHER PUBLICATIONS

Notice of Allowance dated Jun. 28, 2019, issued in connection with U.S. Appl. No. 14/956,640, filed Dec. 2, 2015, 8 pages.
Notice of Allowance dated Oct. 28, 2019, issued in connection with U.S. Appl. No. 16/551,070, filed Aug. 26, 2019, 8 pages.
Notice of Allowance dated Apr. 3, 2019, issued in connection with U.S. Appl. No. 15/135,423, filed Apr. 21, 2016, 9 pages.
Notice of Allowance dated Mar. 3, 2020, issued in connection with U.S. Appl. No. 13/904,909, filed May 29, 2013, 11 pages.
Notice of Allowance dated Oct. 3, 2018, issued in connection with U.S. Appl. No. 16/107,053, filed Aug. 21, 2018, 17 pages.
Notice of Allowance dated Dec. 30, 2020, issued in connection with U.S. Appl. No. 16/672,798, filed Nov. 4, 2019, 5 pages.
Notice of Allowance dated Oct. 30, 2017, issued in connection with U.S. Appl. No. 14/628,952, filed Feb. 23, 2015, 8 pages.
Notice of Allowance dated Aug. 31, 2016, issued in connection with U.S. Appl. No. 14/520,566, filed Oct. 22, 2014, 7 pages.
Notice of Allowance dated Dec. 4, 2020, issued in connection with U.S. Appl. No. 17/019,174, filed Sep. 11, 2020, 8 pages.
Notice of Allowance dated Nov. 5, 2020, issued in connection with U.S. Appl. No. 16/372,054, filed Apr. 1, 2019, 22 pages.
Notice of Allowance dated Jan. 7, 2019, issued in connection with U.S. Appl. No. 16/107,092, filed Aug. 21, 2018, 13 pages.
Notice of Allowance dated Apr. 9, 2020, issued in connection with U.S. Appl. No. 16/389,906, filed Apr. 19, 2019, 7 pages.
Notification of Reopening of Prosecution Due to Consideration of an Information Disclosure Statement Filed After Mailing of a Notice of Allowance dated Jan. 20, 2017, issued in connection with U.S. Appl. No. 14/520,556, filed Oct. 22, 2014, 2 pages.
"Sonos Multi-Room Music System User Guide," Version 090401, Sonos, Inc. Apr. 1, 2009, 256 pages.
"Sonos Wireless Dock Product Guide," Version 100101, Sonos, Inc. Oct. 10, 2001, 196 pages.
"SonosTM Digital Music System User Guide", Version: 070101, Sonos, Inc., Jan. 2007, 179 pages.
OSXDaily. Stream Music from iPhone & iPod to a Computer or Apple TV with Airplay. Mar. 3, 2013. 6 pages [produced by Google in Hamburg Regional Court, Case No. 327 O 378/20 on Jan. 5, 2021].
OSXDaily. Stream Music from iPhone & iPod to a Computer or Apple TV with Airplay. WaybackMachine. Mar. 3, 2013. 4 pages [produced by Google in Hamburg Regional Court, Case No. 327 O 378/20 on Jan. 5, 2021].
Palm, Inc., "Handbook for the Palm VII Handheld," May 2000, 311 pages.
Pre-Interview First Office Action dated Dec. 22, 2015, issued in connection with U.S. Appl. No. 14/520,578, filed Oct. 22, 2014, 9 pages.
Presentations at WinHEC 2000, May 2000, 138 pages.
PRISMIQ, Inc., "PRISMIQ Media Player User Guide," 2003, 44 pages.
Ritchie et al., "UPnP AV Architecture:2 for UPnP Version 1.0", 2010, XP055032201, retrieved from the internet: URL:http://upnp.org/specs/av/UPnP-av_AVArchitecture-v2_pdf, 35 pages.
*Sonos, Inc.* v. *Google Germany GmbH*. Reply. Case No. 327 O 378/20 dated Jan. 5, 2021, 53 pages.
*Sonos, Inc.* v. *Implicit, LLC*: Declaration of Roman Chertov in Support of the Inter Partes Review of U.S. Pat. No. 7,391,791 dated Mar. 9, 2018, 92 pages.
*Sonos, Inc.* v. *Implicit, LLC*: Declaration of Roman Chertov in Support of the Inter Partes Review of U.S. Pat. No. 3,942,252 dated Mar. 9, 2018, 81 pages.
*Sonos, Inc.* v. *Lenbrook Industries Limited et al.*, Defendants' Answer to Plaintiff's Complaint, filed Oct. 14, 2019, 66 pages.
*Sonos, Inc.* v. *Lenbrook Industries Limited et al.*, Defendants' First Amended Answer and Counterclaims to Plaintiffs Complaint, filed Nov. 14, 2019, 66 pages.
Supplemental Notice of Allowability dated Nov. 4, 2015, issued in connection with U.S. Appl. No. 13/864,086, filed Apr. 16, 2013, 2 pages.

Supplemental Notice of Allowance dated Dec. 21, 2016, issued in connection with U.S. Appl. No. 13/904,949, filed May 29, 2013, 2 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
"Welcome. You're watching Apple TV." Apple TV 1st Generation Setup Guide, Apr. 8, 2008 http://manuals.info.apple.com/MANUALS/0/MA403/en_US/AppleTV_SetupGuide.pdf Retrieved Oct. 14, 2014, 40 pages.
"Welcome. You're watching Apple TV." Apple TV 2nd Generation Setup Guide, Mar. 10, 2011 Retrieved Oct. 16, 2014, 36 pages.
"Welcome. You're watching Apple TV." Apple TV 3rd Generation Setup Guide, Mar. 16, 2012 Retrieved Oct. 16, 2014, 36 pages.
Yahoo Groups. Exstreamer. Barix Exstreamer. Access via Wayback Machine http://groups.yahoo.com/group/exstreamer/ Dec. 22, 2013, 1 page.
Yamaha DME 64 Owner's Manual; copyright 2004, 80 pages.
Yamaha DME Designer 3.0 Owner's Manual; Copyright 2008, 501 pages.
Yamaha DME Designer 3.5 setup manual guide; copyright 2004, 16 pages.
Yamaha DME Designer 3.5 User Manual; Copyright 2004, 507 pages.
European Patent Office, European Extended Search Report dated Jun. 23, 2021, issued in connection with European Application No. 20206300.4, 8 pages.
European Patent Office, Summons to Attend Oral Proceedings dated Jun. 11, 2021, issued in connection with European Application No. 12861517.6, 3 pages.
*Sonos, Inc.* v. *Google LLC*, Plaintiff Sonos, Inc.'s Reply Claim Construction Brief filed in Western District of Texas Waco Division Case No. 6:20-cv-881-ADA, dated Jun. 15, 2021, 22 pages.
*Sonos, Inc.* v. *Google LLC*, Plaintiff Sonos, Inc.'s Opening Claim Construction Brief filed in Western District of Texas Waco Division Case No. 6:20-cv-881-ADA, dated Apr. 27, 2021, 38 pages.
Non-Final Office Action dated May 26, 2021, issued in connection with U.S. Appl. No. 17/127,989, filed Dec. 18, 2020, 8 pages.
*Sonos, Inc.* v. *Google LLC*, Declaration of Douglas C. Schmidt filed in Western District of Texas Waco Division Case No.: 6:20-cv-881-ADA, dated Apr. 27, 2021, 40 pages.
*Sonos, Inc.* v. *Google LLC*, Declaration of Kevin C. Almeroth filed in Western District of Texas Waco Division Case No.: 6:20-cv-881-ADA, dated Apr. 27, 2021, 29 pages.
*Sonos, Inc.* v. *Google LLC*, Defendant Google LLC's Response Claim Construction Brief filed in Western District of Texas Waco Division Case No.: 6:20-cv-881-ADA, dated Jun. 1, 2021, 35 pages.
*Sonos, Inc.* v. *Google LLC*, Defendant Google LLC's Sur-Reply Claim Construction Brief filed in Western District of Texas Waco Division Case No. 6:20-cv-881-ADA, dated Jun. 29, 2021, 20 pages.
*Sonos, Inc.* v. *Google LLC*, Dr. Kyriakakis' Declaration in Support of Google LLC's Responsive Claim Construction Brief filed in Western District of Texas Waco Division Case No.: 6:20-cv-881-ADA, dated Jun. 1, 2021, 233 pages.
*Sonos, Inc.* v. *Google LLC*, Exhibit 26: Rebuttal Declaration of Kevin C. Almeroth filed in Western District of Texas Waco Division Case No.: 6:20-cv-881-ADA, dated Jun. 15, 2021, 258 pages.
*Sonos, Inc.* v. *Google LLC*, Exhibit 27: Reply Declaration Douglas C. Schmidt filed in Western District of Texas Waco Division Case No.: 6:20-cv-881-ADA, dated Jun. 15, 2021, 162 pages.
*Sonos, Inc.* vs. *Google LLC*, Markman Hearing Transcript, Civil Action No. W-20-CV-881, Aug. 10, 2021, 86 pages.
Non-Final Office Action mailed Jul. 22, 2021, issued in connection with U.S. Appl. No. 16/672,798, filed Nov. 4, 2019, 12 pages.
Notice of Allowance mailed Jul. 26, 2021, issued in connection with U.S. Appl. No. 17/127,989, filed Dec. 18, 2020, 10 pages.

(56)    References Cited

OTHER PUBLICATIONS

Notice of Allowance mailed Jul. 28, 2021, issued in connection with U.S. Appl. No. 16/448,896, filed Jun. 21, 2019, 11 pages.

Notice of Allowance mailed Aug. 3, 2021, issued in connection with U.S. Appl. No. 16/372,054, filed Apr. 1, 2019, 11 pages.

European Patent Office, Letter from Opponent and Translation mailed on Aug. 12, 2021, issued in connection with Opposition to European Application No. 19178151.7, 69 pages.

Google LLC v. Sonos, Inc., Nothern District of California Case No. 3:20-cv-06754, Google's Invalidity Contentions; dated Dec. 6, 2021, 94 pages.

Google v. Sonos. Plantiffs' Invalidity Claim Charts for U.S. Pat. No. 10,779,033, Exhibits 4-13, dated Dec. 6, 2021, 444 pages.

Google v. Sonos. Plantiffs' Invalidity Claim Charts for U.S. Pat. No. 9,967,615, Exhibits 4-13, dated Dec. 6, 2021, 574 pages.

Google v. Sonos. Plantiffs' Invalidity Contention Riders I-K for Patents '033 and '615, dated Dec. 6, 2021, 96 pages.

Sonos' Reply to Notice of Opposition in connection with Opposition of European Application No. 19178151.7, filed on Dec. 2, 2021, 18 pages.

Australian Patent Office, Australian Examination Report Action mailed on Oct. 14, 2021, issued in connection with Australian Application No. 2020239784, 3 pages.

Canadian Patent Office, Canadian Examination Report mailed on Jun. 7, 2021, issued in connection with Canadian Application No. 3077786, 4 pages.

DLNA. DLNA Networked Device Interoperability Guidelines. Mar. 2006, 618 pages. [produced by Google in WDTX Case No. 6:20-cv-00881 on Sep. 10, 2021].

Google LLC v. Sonos, Inc., Petition for IPR of U.S. Pat. No. 9,967,615 and Exhibits 1001-1024, IPR2021-01563, Sep. 28, 2021, Parts 1-6, 3604 pages.

Google LLC v. Sonos, Inc., Petition for IPR of U.S. Pat. No. 9,967,615 and Exhibits 1001-1024, IPR2021-01563, Sep. 28, 2021, Parts 7-13, 3604 pages.

International Bureau, International Search Report and Written Opinion mailed on Apr. 19, 2013, issued in connection with International Application No. PCT/US2012/071212, filed on Dec. 21, 2012, 9 pages.

Sonos, Inc. v. Google LLC, WDTX Case No. 6:20-cv-00881, Google's Final Invalidity Contentions; dated Sep. 10, 2021, 90 pages.

Sonos, Inc. v. Google LLC, WDTX Case No. 6:20-cv-00881, Google's Preliminary Invalidity Contentions dated Mar. 5, 2021, 93 pages.

Sonos v. Google. Respondents' Final Invalidity Claim Charts for U.S. Pat. No. 10,779,033, Exhibits 4-13, dated Sep. 10, 2021, 531 pages.

Sonos v. Google. Respondents' Final Invalidity Claim Charts for U.S. Pat. No. 9,967,615, Exhibits 4-13, dated Sep. 10, 2021, 565 pages.

Sonos v. Google. Respondents' Final Invalidity Contention Riders I-K for Patents '033 and '615, dated Sep. 10, 2021, 92 pages.

Sonos v. Google. Respondents' Preliminary Invalidity Claim Charts for U.S. Pat. No. 10,779,033, Exhibits 4-12, dated Mar. 5, 2021, 473 pages.

Sonos v. Google. Respondents' Preliminary Invalidity Claim Charts for U.S. Pat. No. 9,967,615, Exhibits 4-12, dated Mar. 5, 2021, 519 pages.

Sonos v. Google. Respondents' Preliminary Invalidity Contention Riders I-K for Patents '033 and '615, dated Mar. 5, 2021, 93 pages.

Cable et al., "The complete guide to AirPlay", http://www.techradar.com/:, May 1, 2011, 7 pages.

European Patent Office, European Preliminary Opinion on the Board of Appeal mailed on Dec. 16, 2021, issued in connection with European Application No. 12861517.6, 61 pages.

Komiya et al. Use Cases for Session Mobility in Multimedia Applications. Matsushita Electric (Panasonic). Retrieved online at URLhttps://www.ietf.org/proceedings/65/slides/mmusic-9.pdf submitted in Grounds of Appeal for EP No. 12861517.6 on Nov. 23, 2017, 7 pages.

Notice of Allowance mailed on Dec. 22, 2021, issued in connection with U.S. Appl. No. 16/672798, filed Nov. 4, 2019, 14 pages.

R. Shacham et al., "Session Initiation Protocol (SIP) Session Mobility", IETF draft-shachamsipping-session-mobility-02, Feb. 2006.

European Patent Office, European EPC Article 94.3 mailed on Feb. 4, 2022, issued in connection with European Application No. 20204548.0, 5 pages.

European Patent Office, Summons to Attend Oral Proceedings mailed on Feb. 17, 2022, issued in connection with European Application No. 19178151.7, 21 pages.

Google LLC v. Sonos, Inc. Decision Granting Institution of IPR of U.S. Pat. No. 9,967,615, Case IPR2021-01563, dated Apr. 12, 2022, 43 pages.

Google LLC v. Sonos, IncDr. Kyriakakis' Declaration in Support of Google LLC's Opening Claim Construction Brief and Exhibits A-J, Case No. 3:20-cv-06754, Feb. 11, 2022, 1329pgs.

Google LLC v. Sonos, Inc. Expert Report of Douglas C. Schmidt on Claim Construction Case Nos. 3:20-cv-06754 and 3:21-cv-07559, Feb. 11, 2022, 183 pages.

Google LLC v. Sonos, Inc., Google LLC's Responsive Claim Construction Brief: Exhibit 13: Windows Vista The Missing Manual by David Pogue [produced by Google in Nothern District of California Case No. 3:20-cv-06754, dated Apr. 4, 2022], 1117 pages.

Google LLC v. Sonos, Inc., Google LLC's Responsive Claim Construction Brief: Exhibit 14: Sony Play Queue Screen (smartphone) [produced by Google in Nothern District of California Case No. 3:20-cv-06754, dated Apr. 4, 2022], 3 pages.

Google LLC v. Sonos, Inc., Google LLC's Responsive Claim Construction Brief: Exhibit 15: McGraw-Hill Dictionary of Scientific and Technical Terms, 6th edition [produced by Google in Nothern District of California Case No. 3:20-cv-06754, dated Apr. 4, 2022], 8 pages.

Google LLC v. Sonos, Inc., Google LLC's Responsive Claim Construction Brief Nothern District of California Case No. 3:20-cv-06754, dated Apr. 4, 2022, 29 pages.

Google LLC v. Sonos, Inc., Opening Claims Construction Brief, Nothern District of California Case No. 3:20-cv-06754, dated Mar. 21, 2022, 29 pages.

Google LLC v. Sonos, Inc., Sonos, Inc.'s Reply Claim Construction Brief, Nothern District of California Case No. 3:20-cv-06754, dated Apr. 11, 2022, 20 pages.

Google LLC v. Sonos, Inc., Sonos, Inc's Third Supplemental Response and Objections to Google's First Set of Interrogatories [1-20], Nothern District of California Case No. 3:20-cv-06754, dated Mar. 21, 2022, 340 pages.

Google LLC v. Sonos, Inc., Sonos's Second Supplemental Responses and Objections to Google's First Set of Interrogatories and Attachment A, Case No. 3:20-cv-06754, Feb. 4, 2022, 590 pages.

Google LLC v. Sonos, Inc., Petitioner's Reply to Patent Owner's Preliminary Response for Inter Partes Review of U.S. Pat. No. 9,967,615, Case No. IPR2021-01563, dated Feb. 13, 2022, 9 pgs.

Google LLC v. Sonos, Inc., Petitioner's Updated Exhibit List and Exhibits 1025-1030 for IPR of U.S. Pat. No. 9,967,615, Case No. IPR2021-01563, dated Feb. 14, 2022, 170 pgs.

Notice of Allowance mailed on Feb. 15, 2022, issued in connection with U.S. Appl. No. 16/372,054, filed Apr. 1, 2019, 11 pages.

Notice of Allowance mailed on Jan. 25, 2022, issued in connection with U.S. Appl. No. 17/127,989, filed Dec. 18, 2020, 11 pages.

Sonos, Inc. vs. Google LLC, Patent Owner Sonos, Inc.'s Preliminary Response to Petition for Inter Partes Review os U.S. Pat. No. 9,967,615 with Exhibits 2001-2012, Case No. IPR2021-01563, dated. Jan. 25, 2022, 284 pgs.

Australian Patent Office, Australian Examination Report Action mailed on May 24, 2022, issued in connection with Australian Application No. 2020239784.0, 3 pages.

Non-Final Office Action mailed on Jun. 9, 2022, issued in connection with U.S. Appl. No. 17/710,425, filed Mar. 31, 2022, 14 pages.

(56)                References Cited

OTHER PUBLICATIONS

Sonos's Response to Summons to Attend Oral Proceedings before the European Patent Office filed on Jul. 5, 2022 in connection with European Application No. 19178151.7, 343 pages.

Canadian Patent Office, Canadian Examination Report mailed on Apr. 13, 2022, issued in connection with Canadian Application No. 3077786, 9 pages.

*Google LLC* v. *Sonos, Inc.*, Sonos, Inc.'s Opposition to Google's Motion for Summary Judgment Pursuant to the Court's Patent Showdown Procedure. Nothern District of California Case No. 3:20-cv-06754-WHA, May 5, 2022, 30 pages.

*Sonos, Inc.* v. *Google LLC.* Google's Motion for Summary Judgment Pursuant to the Court's Patent Showdown Procedure. Exhibit 12: The Hidden Secrets of Apple's Airplay, Nothern District of California Case No. 3:20-cv-06754-WHA, Apr. 14, 2022, 2 pages.

*Sonos, Inc.* v. *Google LLC.* Google's Motion for Summary Judgment Pursuant to the Court's Patent Showdown Procedure. Exhibit 9: Declaration of Ramona Bobohalma, Nothern District of California Case No. 3:20-cv-06754-WHA, Apr. 14, 2022, 3 pages.

*Sonos, Inc.* v. *Google LLC.* Google's Motion for Summary Judgment Pursuant to the Court's Patent Showdown Procedure. Nothern District of California Case No. 3:20-cv-06754-WHA, Apr. 14, 2022, 33 pages.

*Sonos, Inc.* v. *Google LLC.* Google's Opposition to Sonos's Motion for Summary Judgment Pursuant to the Court's Patent Showdown Procedure. Nothern District of California Case No. 3:20-cv-06754-WHA, May 5, 2022, 33pages.

*Sonos, Inc.* v. *Google LLC.* Google's Reply in Support of Google's Motion for Summary Judgment Pursuant to the Court's Patent Showdown Procedure. Exhibit 1: Declaration of Samrat Bhattacharjee, Nothern District of California Case No. 3:20-cv-06754-WHA, May 19, 2022, 5 pages.

*Sonos, Inc.* v. *Google LLC.* Google's Reply in Support of Google's Motion for Summary Judgment Pursuant to the Court's Patent Showdown Procedure. Nothern District of California Case No. 3:20-cv-06754-WHA, May 19, 2022, 24 pages.

*Google LLC* v. *Sonos, Inc.* Order Granting Motions for Partial Summary Judgment as to '615 Patent. Nothern District of California Case No. C 20-06754-WHA, Aug. 2, 2022, 17 pages.

*Google LLC* v. *Sonos, Inc.* Patent Owner Response to Petition for Inter Partes Review and Exhibits 2018-2026 for U.S. Pat. No. 9,967,615, Case IPR2021-01563, Jul. 11, 2022, 697 pages.

Opponent's Reply to the brief of the patent proprietor regarding EP19178151.7/EP3554005, *Sonos, Inc.* v. *Google Germany GmbH* filed on Aug. 4, 2022, 79 pages Opponent's Reply to the preliminary opinion of the Opposition Division regarding EP19178151.7/EP3554005, *Sonos, Inc.* v. *Google Germany GmbH* filed on Jul. 5, 2022, 67 pages.

Sonos's Response to Submissions submitted by Google Germany GmbH filed Aug. 4, 2022 in connection with European Application No. 19178151.7, 111 pages.

Advisory Action mailed on Jun. 13, 2022, issued in connection with U.S. Appl. No. 16/565,105, filed Sep. 9, 2019, 4 pages.

Advisory Action mailed on Mar. 15, 2017, issued in connection with U.S. Appl. No. 13/533,785, filed Jun. 26, 2012, 6 pages.

Advisory Action mailed on Jun. 23, 2021, issued in connection with U.S. Appl. No. 16/565,105, filed Sep. 9, 2019, 4 pages.

Advisory Action mailed on Aug. 9, 2019, issued in connection with U.S. Appl. No. 15/131,018, filed Apr. 17, 2016, 3 pages.

Anonymous, "Shazam (service)—Wikipedia, the free encyclopedia", 2011, 5 pages, XP055197950.

Canadian Patent Office, Canadian Examination Report mailed on May 13, 2024, issued in connection with Canadian Application No. 3138602, 4 pages.

Canadian Patent Office, Canadian Examination Report mailed on Oct. 23, 2023, issued in connection with Canadian Application No. 3138602, 3 pages.

Chinese Patent Office, Office Action mailed on Dec. 28, 2016, issued in connection with Chinese Application No. 201380040746. 9, 20 pages.

Chinese Patent Office, Second Office Action mailed on Feb. 5, 2018, issued in connection with Chinese Application No. 201380040746. 9, 16 pages.

European Patent Office, Communication Pursuant to Rule 114(2) EPC mailed on Aug. 16, 2022, issued in connection with European Application No. 20204548.0, 5 pages.

European Patent Office, Decision Revoking the European Patent mailed on Dec. 20, 2022, issued in connection with European Application No. 19178151.7, 21 pages.

European Patent Office, European EPC Article 94.3 mailed on Oct. 11, 2023, issued in connection with European Application No. 20206300.4, 4 pages.

European Patent Office, European EPC Article 94.3 mailed on Oct. 12, 2023, issued in connection with European Application No. 20159841.4, 6 pages.

European Patent Office, European EPC Article 94.3 mailed on Sep. 13, 2022, issued in connection with European Application No. 20204548.0, 5 pages.

European Patent Office, European EPC Article 94.3 mailed on Nov. 16, 2022, issued in connection with European Application No. 20204548.0, 5 pages.

European Patent Office, European EPC Article 94.3 mailed on Jul. 21, 2022, issued in connection with European Application No. 21209669.7, 4 pages.

European Patent Office, European Extended Search Report mailed on Oct. 11, 2022, issued in connection with European Application No. 22179261.7, 8 pages.

European Patent Office, European Extended Search Report mailed on Apr. 14, 2022, issued in connection with European Application No. 21209669.7, 9 pages.

European Patent Office, European Extended Search Report mailed on Sep. 15, 2022, issued in connection with European Application No. 22181265.4, 10 pages.

European Patent Office, European Extended Search Report mailed on Oct. 13, 2022, issued in connection with European Application No. 22179278.1, 8 pages.

European Patent Office, European Search Report mailed on Jul. 27, 2022, issued in connection with European Application No. 22167991. 3, 7 pages.

European Patent Office, European Search Report mailed on Oct. 30, 2015, issued in connection with European Application No. 13810685. 1, 8 pages.

European Patent Office, European Search Report mailed on Sep. 2, 2016, issued in connection with European Application No. 13810685. 1, 6 pages.

European Patent Office, Minutes of Oral Proceedings Before the Opposition Division on Dec. 20, 2022, issued in connection with European Application No. 19178151.7, 10 pages.

European Patent Office, Summons to Attend Oral Proceedings mailed on Jan. 3, 2017, issued in connection with European Patent Application No. 13810685.1, 7 pages.

European Patent Office, Summons to Attend Oral Proceedings mailed on Jul. 26, 2024, issued in connection with European Application No. 20159841.4, 13 pages.

Final Office Action mailed on Jan. 13, 2023, issued in connection with U.S. Appl. No. 17/710,425, filed Mar. 31, 2022, 13 pages.

Final Office Action mailed on Mar. 15, 2016, issued in connection with U.S. Appl. No. 13/533,785, filed Jun. 26, 2012, 18 pages.

Final Office Action mailed on Apr. 20, 2018, issued in connection with U.S. Appl. No. 15/131,018, filed Apr. 17, 2016, 15 pages.

Final Office Action mailed on Apr. 23, 2019, issued in connection with U.S. Appl. No. 15/131,018, filed Apr. 17, 2016, 19 pages.

Final Office Action mailed on Dec. 28, 2016, issued in connection with U.S. Appl. No. 13/533,785, filed Jun. 26, 2012, 17 pages.

Final Office Action mailed on Jun. 29, 2017, issued in connection with U.S. Appl. No. 15/131,016, filed Apr. 17, 2016, 13 pages.

Final Office Action mailed on Mar. 3, 2022, issued in connection with U.S. Appl. No. 16/565,105, filed Sep. 9, 2019, 22 pages.

Final Office Action mailed on Dec. 7, 2022, issued in connection with U.S. Appl. No. 16/565,105, filed Sep. 9, 2019, 19 pages.

Final Office Action mailed on Mar. 8, 2021, issued in connection with U.S. Appl. No. 16/565,105, filed Sep. 9, 2019, 18 pages.

(56)        References Cited

OTHER PUBLICATIONS

*Google LLC* v. *Sonos, Inc.*, and *Sonos, Inc.* v. *Google LLC*. Transcript of Proceedings. Nothern District of California Case No. 3:20-cv-06754-WHA and Case No. 3:21-cv-07559-WHA, Mar. 30, 2023, 111 pages.
*Google LLC* v. *Sonos, Inc.*, Google LLC's Response to the Court's Request for Information (DKT.556). Nothern District of California Case No. 3:20-cv-06754-WHA, Mar. 31, 2023, 6 pages.
*Google LLC* v. *Sonos, Inc.*, Google's Motion for Summary Judgment and Non-Confidential Exhibits. Nothern District of California Case No. 3:20-cv-06754-WHA, Feb. 6, 2023, 86 pages.
*Google LLC* v. *Sonos, Inc.*, Google's Reply in Support of Motion for Summary Judgment and Non-Confidential Exhibits. Nothern District of California Case No. 3:20-cv-06754-WHA, Feb. 28, 2023, 22 pages.
*Google LLC* v. *Sonos, Inc.* Google's Motion for Leave to File Supplemental Claim Construction Briefing. Nothern District of California Case No. C 20-06754-WHA, Oct. 6, 2022, 157 pages.
*Google LLC* v. *Sonos, Inc.*, Order Denying Leave to File Supplemental Claim Construction Briefing. Nothern District of California Case No. 3:20-cv-06754-WHA, Dec. 21, 2022, 4 pages.
*Google LLC* v. *Sonos, Inc.* Patent Owner's Sur-Reply of U.S. Pat. No. 9,967,615, Case IPR2021-01563, dated Oct. 25, 2022, 32 pages.
*Google LLC* v. *Sonos, Inc.* Record of Oral Hearing for Case IPR2021-01563 of U.S. Pat. No. 9,967,615, dated Jan. 31, 2023, 51 pages.
*Google LLC* v. *Sonos, Inc.*, Sonos Inc.'s Opposition to Google's Motions for Summary Judgment and Non-Confidential Exhibits. Nothern District of California Case No. 3:20-cv-06754-WHA, Feb. 21, 2023, 103 pages.
*Google LLC* v. *Sonos, Inc.*, Sonos Inc.'s Response to Request for Information. Nothern District of California Case No. 3:20-cv-06754-WHA, Mar. 29, 2023, 7 pages.
*Google LLC* v. *Sonos, Inc.* Sonos's Opposition to Google's Motion for Supplemental Claim Construction Briefing Nothern District of California Case No. C 20-06754-WHA, Oct. 25, 2022, 60 pages.
*Google LLC* vs. *Sonos, Inc.*, Judgment. Final Written Decision Determining All Challenged Claims Unpatentable Inter Partes Review of U.S. Pat. No. 9,967,615, Case No. IPR2021-01563, dated Apr. 10, 2023, 78 pgs.
*Google LLC* v. *Sonos, Inc.*, Petitioner's Reply of U.S. Pat. No. 9,967,615, Case No. IPR2021-01563, dated Sep. 29, 2022, 35 pages.
Google's Reply to Sonos's Response dated Dec. 2, 2021 before the European Patent Office filed on Feb. 8, 2022 in connection with European Application No. 19178151.7, 21 pages.
Google's Supplementary Statement before the European Patent Office filed on Apr. 15, 2021 in connection with the Opposition to European Application No. 19178151.7, 19 pages.
Google's Third Set of Arguments and Supplementary Statement before the European Patent Office filed on Aug. 2, 2021 in connection with opposition of European Application No. 19178151.7, 22 pages.
International Bureau, International Preliminary Report on Patentability, mailed on Jan. 8, 2015, issued in connection with International Application No. PCT/US2013/046383, mailed on Jun. 18, 2013, 9 pages.
International Searching Authority, International Search Report mailed on Sep. 30, 2013, issued in connection with International Patent Application No. PCT/US2013/046383, filed on Jun. 18, 2013, 3 pages.
International Searching Authority, Written Opinion mailed on Sep. 30, 2013, issued in connection with International Patent Application No. PCT/US2013/046383, filed on Jun. 18, 2013, 7 pages.
Japanese Patent Office, Office Action mailed on Oct. 18, 2016, issued in connection with Japanese Application No. 2015-520287, 6 pages.
Japanese Patent Office,Office Action mailed on Mar. 1, 2016, issued in connection with JP Application No. 2015-520287, 7 pages.

Kumparak, Greg, "Limili Identifies That Song That's Playing, Adds Its To Your Grooveshark Collection", TechCrunch, Nov. 12, 2010, 6 pages, XP055221098.
"Mirage Media Server: The Definitive Guide to the World's First Cloud-based Media Server", Autonomic, 2012, 16 pages, XP055221677.
Non-Final Office Action mailed on Feb. 9, 2017, issued in connection with U.S. Appl. No. 15/131,016, filed Apr. 17, 2016, 12 pages.
Non-Final Office Action mailed on May 12, 2022, issued in connection with U.S. Appl. No. 17/686,237, filed Mar. 3, 2022, 25 pages.
Non-Final Office Action mailed on Oct. 16, 2018, issued in connection with U.S. Appl. No. 15/131,018, filed Apr. 17, 2016, 16 pages.
Non-Final Office Action mailed on Aug. 19, 2021, issued in connection with U.S. Appl. No. 16/565,105, filed Sep. 9, 2019, 17 pages.
Non-Final Office Action mailed on Aug. 17, 2017, issued in connection with U.S. Appl. No. 15/131,018, filed Apr. 17, 2016, 9 pages.
Non-Final Office Action mailed on Feb. 23, 2017, issued in connection with U.S. Appl. No. 15/131,840, filed Apr. 18, 2016, 12 pages.
Non-Final Office Action mailed on May 24, 2023, issued in connection with U.S. Appl. No. 17/536,922, filed Nov. 29, 2021, 15 pages.
Non-Final Office Action mailed on Jun. 29, 2016, issued in connection with U.S. Appl. No. 13/533,785, filed Jun. 26, 2012, 19 pages.
Non-Final Office Action mailed on Aug. 3, 2022, issued in connection with U.S. Appl. No. 16/565,105, filed Sep. 9, 2019, 18 pages.
Non-Final Office Action mailed on Jun. 5, 2024, issued in connection with U.S. Appl. No. 17/861,890, filed Jul. 11, 2022, 22 pages.
Non-Final Office Action mailed on Jun. 9, 2020, issued in connection with U.S. Appl. No. 16/565,105, filed Sep. 9, 2019, 34 pages.
Non-Final Office Action mailed on Mar. 9, 2023, issued in connection with U.S. Appl. No. 17/661,357, filed Apr. 29, 2022, 22 pages.
Notice of Allowance mailed on Apr. 4, 2017, issued in connection with U.S. Appl. No. 13/533,785, filed Jun. 26, 2012, 8 pages.
Notice of Allowance mailed on Jul. 10, 2023, issued in connection with U.S. Appl. No. 17/686,237, filed Mar. 2, 2022, 8 pages.
Notice of Allowance mailed on Apr. 13, 2023, issued in connection with U.S. Appl. No. 18/079,650, filed Dec. 12, 2022, 28 pages.
Notice of Allowance mailed on Sep. 13, 2023, issued in connection with U.S. Appl. No. 17/536,922, filed Nov. 29, 2021, 7 pages.
Notice of Allowance mailed on Mar. 20, 2024, issued in connection with U.S. Appl. No. 18/339,880, filed Jun. 22, 2023, 8 pages.
Notice of Allowance mailed on Sep. 20, 2017, issued in connection with U.S. Appl. No. 15/131,016, filed Apr. 17, 2016, 9 pages.
Notice of Allowance mailed on Mar. 21, 2023, issued in connection with U.S. Appl. No. 17/536,426, filed Nov. 29, 2021, 23 pages.
Notice of Allowance mailed on Feb. 23, 2023, issued in connection with U.S. Appl. No. 17/686,237, filed Mar. 3, 2022, 9 pages.
Notice of Allowance mailed on Feb. 28, 2024, issued in connection with U.S. Appl. No. 17/710,425, filed Mar. 31, 2022, 7 pages.
Notice of Allowance mailed on Mar. 30, 2023, issued in connection with U.S. Appl. No. 17/315,599, filed May 10, 2021, 12 pages.
Notice of Allowance mailed on Mar. 4, 2024, issued in connection with U.S. Appl. No. 18/449,258, filed Aug. 14, 2023, 11 pages.
Notice of Allowance mailed on Jul. 7, 2023, issued in connection with U.S. Appl. No. 17/661,357, filed Apr. 29, 2022, 10 pages.
Notice of Allowance mailed on Aug. 9, 2017, issued in connection with U.S. Appl. No. 15/131,840, filed Apr. 18, 2016, 7 pages.
Sonos's Further Response to Summons of the Opponent before the European Patent Office filed on Sep. 1, 2022 in connection with European Application No. 19178151.7, 86 pages.
Sonos's Further Written Submissions and Evidence before the European Patent Office filed on Sep. 1, 2022 in connection with European Application No. 19178151.7, 86 pages.
*Sonos, Inc.* v. *Google LLC*. Order RE Motions for Summary Judgment. Northern District of California Case No. 3:20-cv-06754-WHA, Apr. 13, 2023, 33 pages.

(56)  References Cited

OTHER PUBLICATIONS

*Sonos, Inc.* v. *Google LLC*, Sonos's Response to Second Request for Information. Nothern District of California Case No. 3:20-cv-06754-WHA, Mar. 31, 2023, 5 pages.

Sonos's Response to Communication pursuant to Rule 114(2) EPC enclosing third-party observations concerning the patentability of invention in connection with European Application No. 20204548.0, Sep. 9, 2022, 16 pages.

Sonos's Response to Summons of the Opponent before the European Patent Office filed on Aug. 30, 2022 in connection with European Application No. 19178151.7, 16 pages.

Sonos's Written Submissions and Evidence before the European Patent Office filed on Aug. 30, 2022 in connection with European Application No. 19178151.7, 16 pages.

European Patent Office, Communication Pursuant to Rule 114(2) EPC mailed on Jul. 18, 2025, issued in connection with European Application No. 22179261.7, 4 pages.

European Patent Office, European EPC Article 94.3 mailed on Jun. 17, 2025, issued in connection with European Application No. 21209669.7, 5 pages.

European Patent Office, European EPC Article 94.3 mailed on Jun. 17, 2025, issued in connection with European Application No. 22179278.1, 6 pages.

European Patent Office, European EPC Article 94.3 mailed on Jun. 18, 2025, issued in connection with European Application No. 20206300.4, 6 pages.

Corrected Notice of Allowance mailed on Jun. 10, 2025, issued in connection with U.S. Appl. No. 18/770,428, filed Jul. 11, 2024, 2 pages.

European Patent Office, European EPC Article 94.3 mailed on Dec. 10, 2024, issued in connection with European Application No. 22181265.4, 7 pages.

European Patent Office, European EPC Article 94.3 mailed on Mar. 17, 2025, issued in connection with European Application No. 20206300.4, 4 pages.

European Patent Office, European EPC Article 94.3 mailed on Mar. 19, 2025, issued in connection with European Application No. 22179278.1, 5 pages.

European Patent Office, European EPC Article 94.3 mailed on Oct. 24, 2024, issued in connection with European Application No. 21209669.7, 21 pages.

European Patent Office, European EPC Article 94.3 mailed on Oct. 24, 2024, issued in connection with European Application No. 21209669.7, 4 pages.

Final Office Action mailed on Apr. 25, 2025, issued in connection with U.S. Appl. No. 18/453,016, filed Aug. 21, 2023, 30 pages.

Non-Final Office Action mailed on Oct. 8, 2024, issued in connection with U.S. Appl. No. 18/439,484, filed Feb. 12, 2024, 18 pages.

Non-Final Office Action mailed on Dec. 12, 2024, issued in connection with U.S. Appl. No. 18/453,016, filed Aug. 21, 2023, 31 pages.

Non-Final Office Action mailed on Jan. 24, 2025, issued in connection with U.S. Appl. No. 18/770,428, filed Jul. 11, 2024, 9 pages.

Notice of Allowance mailed on Jan. 16, 2025, issued in connection with U.S. Appl. No. 17/861,890, filed Jul. 11, 2022, 9 pages.

Notice of Allowance mailed on Feb. 25, 2025, issued in connection with U.S. Appl. No. 18/439,484, filed Feb. 12, 2024, 9 pages.

Notice of Allowance mailed on May 30, 2025, issued in connection with U.S. Appl. No. 18/770,428, filed Jul. 11, 2024, 10 pages.

Sonos Controller for iPad review, (available at https://www.youtube.com/watch?v=aCWcl_f_uS0), Jun. 22, 2010, 3 pages. [produced by Google in WDTX Case No. 6:20-cv-00881 on Mar. 5, 2021].

Sonos with iPad Control app (available at https://www.youtube.com/watch?v=NN7ud0hVO80), May 31, 2011, 3 pages. [produced by Google in WDTX Case No. 6:20-cv-00881 on Mar. 5, 2021].

Twonky Beam Browser Press Release, Oct. 12, 2011, 2 pages. [produced by Google in WDTX Case No. 6:20-cv-00881 on Mar. 5, 2021].

Twonky Beam for Android. https://www.youtube.com/watch?t=18&v=1X-RNTRvymw (Android version) Sep. 29, 2011, 3 pages. [produced by Goodle in WDTX Case No. 6:20-cv-00881 on Mar. 5, 2021].

Twonky Beam for Firefox. https://www.youtube.com/watch?v=8H8LyR6QZtQ. Jun. 24, 2011, 3 pages. [produced by Goodle in WDTX Case No. 6:20-cv-00881 on Mar. 5, 2021].

Twonky Beam for iOS. https://www.youtube.com/watch?v=IMambsaOAhw (iOS version) Sep. 29, 2011, 3 pages. [produced by Goodle in WDTX Case No. 6:20-cv-00881 on Mar. 5, 2021].

Twonky Mobile App. https://www.youtube.com/watch?v=PJwwd7LHUHE. Oct. 15, 2010, 3 pages. [produced by Goodle in WDTX Case No. 6:20-cv-00881 on Mar. 5, 2021].

U.S. Appl. No. 13/904,896, filed May 29, 2013, "Playback queue control via a playlist on a mobile device" Kumar et al.

* cited by examiner

100

200

208

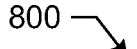
800
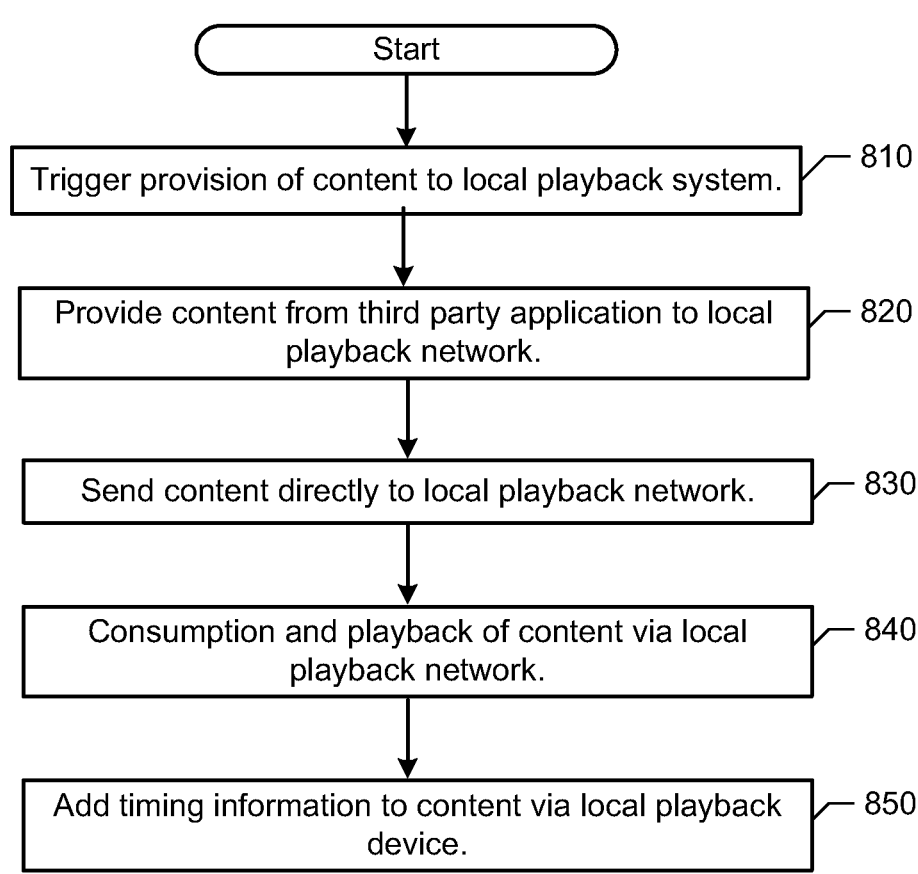
Start
Trigger provision of content to local playback system. ⎯ 810
Provide content from third party application to local playback network. ⎯ 820
Send content directly to local playback network. ⎯ 830
Consumption and playback of content via local playback network. ⎯ 840
Add timing information to content via local playback device. ⎯ 850
FIGURE 8

900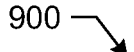

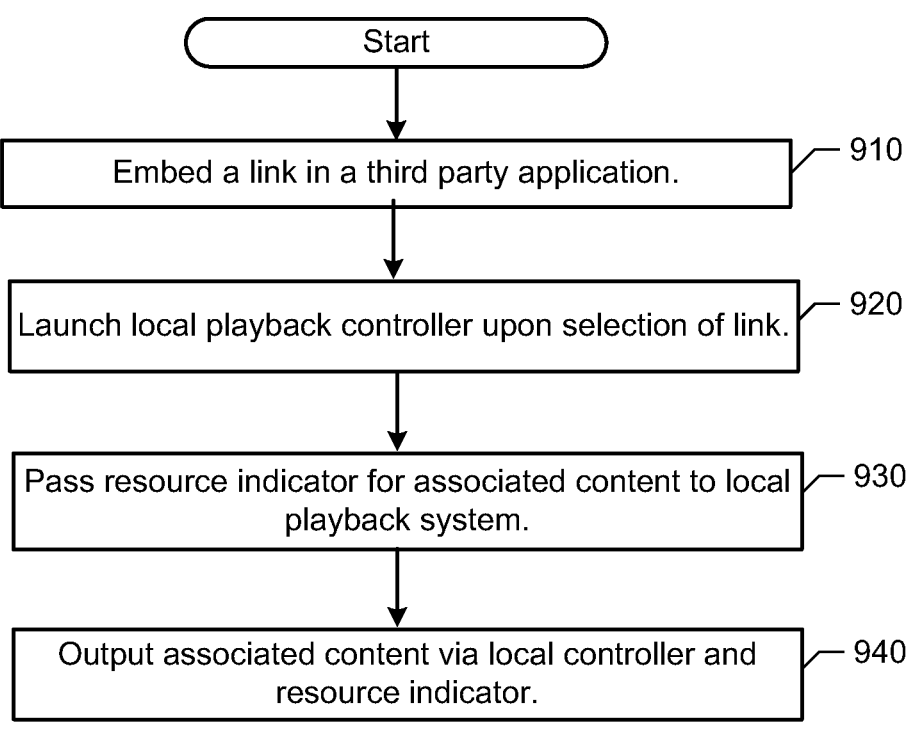

```
                    ┌──────────────────────┐
                    │        Start         │
                    └──────────────────────┘
                               │
                               ▼
         ┌─────────────────────────────────────────┐
         │  Embed a link in a third party application. │ ── 910
         └─────────────────────────────────────────┘
                               │
                               ▼
         ┌─────────────────────────────────────────┐
         │ Launch local playback controller upon selection of link. │ ── 920
         └─────────────────────────────────────────┘
                               │
                               ▼
         ┌─────────────────────────────────────────┐
         │ Pass resource indicator for associated content to local │ ── 930
         │             playback system.             │
         └─────────────────────────────────────────┘
                               │
                               ▼
         ┌─────────────────────────────────────────┐
         │ Output associated content via local controller and │ ── 940
         │           resource indicator.            │
         └─────────────────────────────────────────┘
```

Start

Embed a link in a third party application.    — 1010

Contact server and provide information regarding selected content for playback.    — 1020

Identify and provide content via server to a local playback system.    — 1030

1100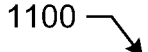
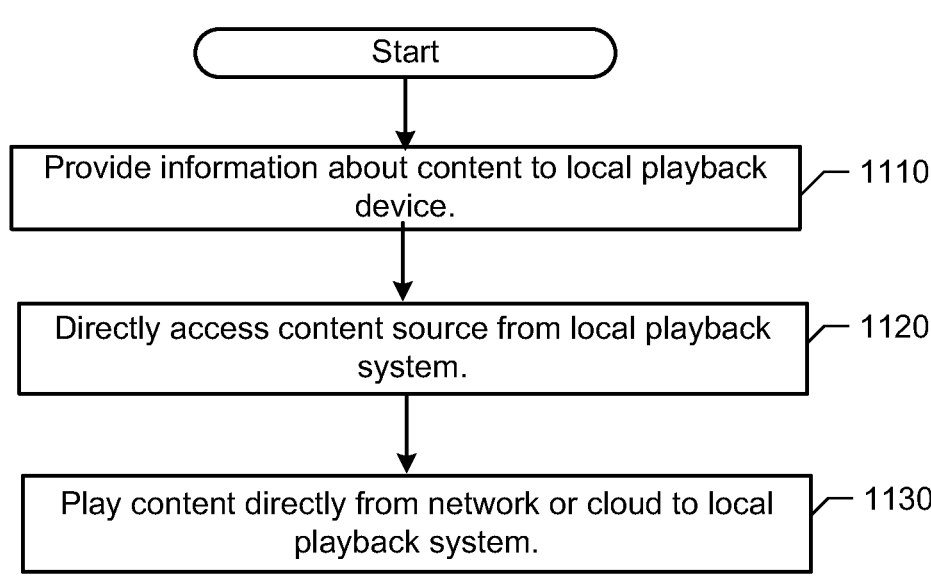
FIGURE 11

SYSTEMS AND METHODS FOR NETWORKED MUSIC PLAYBACK

CROSS REFERENCE TO RELATED APPLICATIONS

This application is a continuation of U.S. non-provisional patent application Ser. No. 17/019,174, filed on Sep. 11, 2020, which is a continuation of U.S. non-provisional patent application Ser. No. 16/389,906, filed on Apr. 19, 2019, which is a continuation of U.S. non-provisional patent application Ser. No. 15/872,500, filed on Jan. 16, 2018 and issued on Feb. 18, 2020 as U.S. Pat. No. 10,567,831, which is a continuation of U.S. non-provisional patent application Ser. No. 14/520,578, filed on Oct. 22, 2014 and issued on Jan. 30, 2018 as U.S. Pat. No. 9,883,234, which is a continuation of U.S. non-provisional patent application Ser. No. 13/341,237, filed on Dec. 30, 2011 and issued on May 15, 2017 as U.S. Pat. No. 9,654,821, all of which are incorporated herein by reference in their entirety.

FIELD OF THE DISCLOSURE

The disclosure is related to consumer electronics and, more particularly, to providing music for playback via one or more devices on a playback data network.

BACKGROUND

Technological advancements have increased the accessibility of music content, as well as other types of media, such as television content, movies, and interactive content. For example, a user can access audio, video, or both audio and video content over the Internet through an online store, an Internet radio station, an online music service, an online movie service, and the like, in addition to the more traditional avenues of accessing audio and video content. Demand for such audio and video content continues to surge. Given the high demand, technology used to access and play such content has likewise improved.

BRIEF DESCRIPTION OF THE DRAWINGS

Features, aspects, and advantages of the presently disclosed technology are better understood with regard to the following description, appended claims, and accompanying drawings where:

FIGS. 8-11 show flow diagrams for methods to provide audio content to a local playback system.

Figure 1:
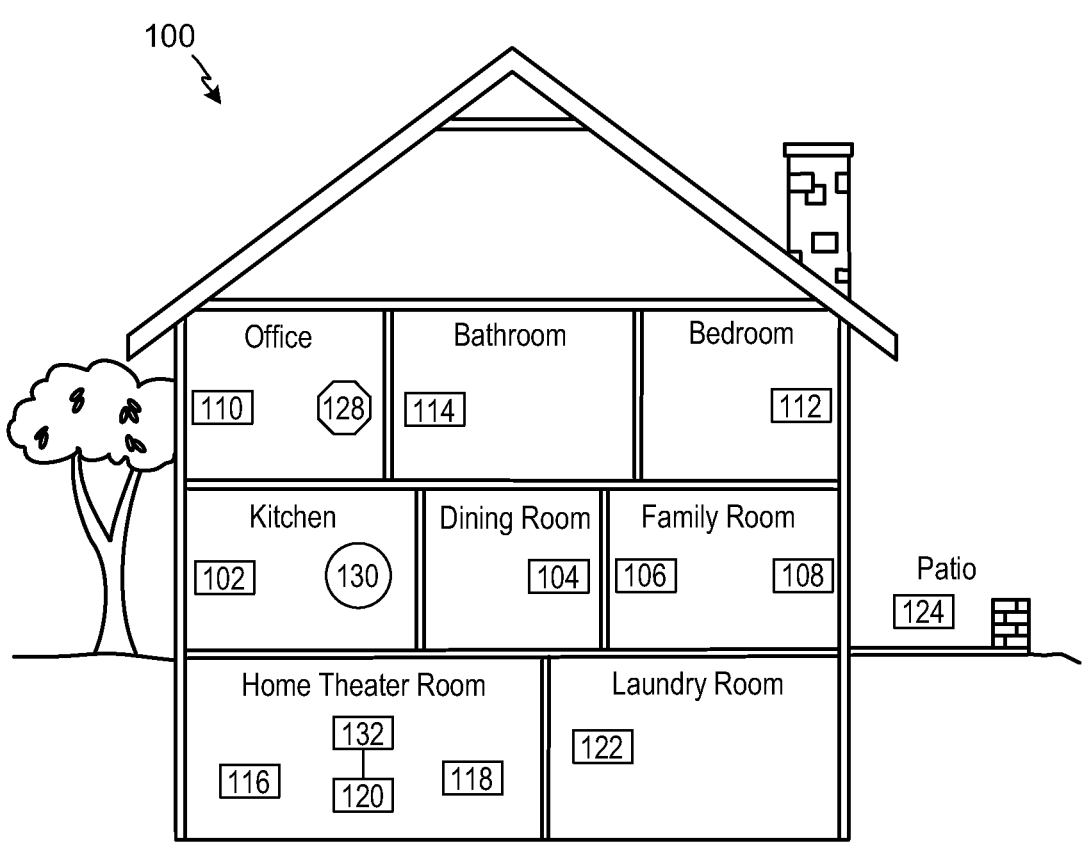
FIG. 1 shows an illustration of an example system in which embodiments of the methods and apparatus disclosed herein can be implemented.

In addition, the drawings are for the purpose of illustrating example embodiments, but it is understood that the present disclosure is not limited to the arrangements and instrumentality shown in the drawings.

DETAILED DESCRIPTION

I. Overview

Wired or wireless networks can be used to connect one or more multimedia playback devices for a home or other location playback network (e.g., a home music system). Certain examples provide automatic configuration of parameters of a playback device to be coupled to a network with reduced or minimum human intervention. For example, a wired and/or wireless ad-hoc network is established to facilitate communications among a group of devices. Music and/or other multimedia content can be shared among devices and/or groups of devices (also referred to herein as zones) associated with a playback network.

Certain embodiments facilitate streaming or otherwise providing music from a music-playing application (e.g., browser-based application, native music player, other multimedia application, and so on) to a multimedia content playback (e.g., Sonos™) system. Certain embodiments provide simple, easy-to-use and secure systems and methods for multimedia content playback across a plurality of systems and locations. Certain embodiments facilitate integration between content partners and a playback system as well as supporting maintenance of such content and system.

Although the following discloses example systems, methods, apparatus, and articles of manufacture including, among other components, firmware and/or software executed on hardware, it should be noted that such systems, methods, apparatus, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

Reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

Certain embodiments provide a method to provide content to a local playback network. The example method includes identifying multimedia content from a content provider. The example method includes passing information regarding the multimedia content to a local playback system including one or more multimedia playback devices in response to a trigger. The example method includes facilitating play of the multimedia content via a local playback network associated with the local playback system.

Certain embodiments provide a computer readable storage medium including instructions for execution by a processor, the instructions, when executed, cause the processor to implement a method to provide content to a local playback network. The example method includes identifying multimedia content from a content provider. The example method includes passing information regarding the multimedia content to a local playback system including one or more multimedia playback devices in response to a trigger. The example method includes facilitating play of the multimedia content via a local playback network associated with the local playback system.

Certain embodiments provide a multimedia playback device including a wireless communication interface to communicate with a local playback network and a multimedia content source and a processor. The process is to identify multimedia content from the multimedia content source; pass information regarding the multimedia content to device on the local playback network in response to a trigger; and facilitate play of the multimedia content via the devices on the local playback network.

II. Example Environment

Referring now to the drawings, in which like numerals can refer to like parts throughout the figures, FIG. 1 shows an example system configuration 100 in which one or more of the method and/or apparatus disclosed herein can be practiced or implemented. By way of illustration, the system configuration 100 represents a home with multiple zones. Each zone, for example, represents a different room or space, such as an office, bathroom, bedroom, kitchen, dining room, family room, home theater room, utility or laundry room, and patio. While not shown here, a single zone can cover more than one room or space. One or more of zone players 102-124 are shown in each respective zone. A zone player 102-124, also referred to as a playback device, multimedia unit, speaker, and so on, provides audio, video, and/or audiovisual output. A controller 130 (e.g., shown in the kitchen for purposes of illustration) provides control to the system configuration 100. The system configuration 100 illustrates an example whole house audio system, though it is understood that the technology described herein is not limited to its particular place of application or to an expansive system like a whole house audio system 100 of FIG. 1.

Figure 2A:
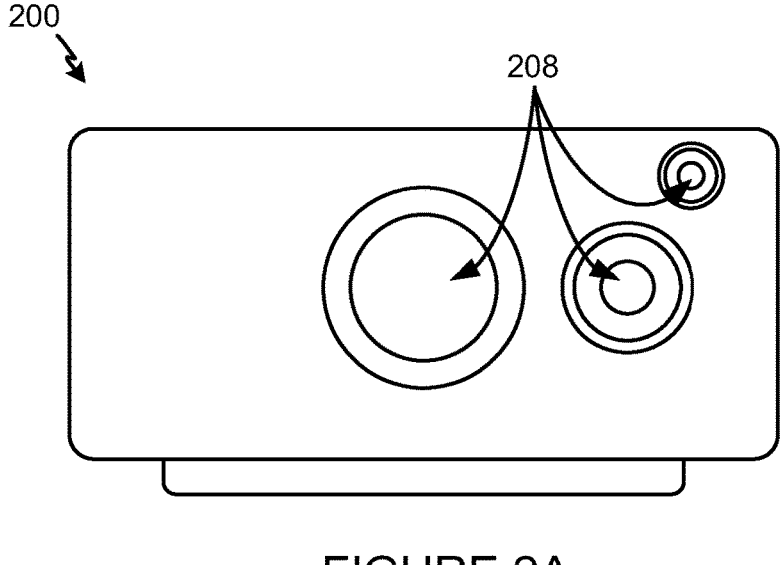
FIG. 2A shows an illustration of an example zone player having a built-in amplifier and speakers.
Figure 2B:
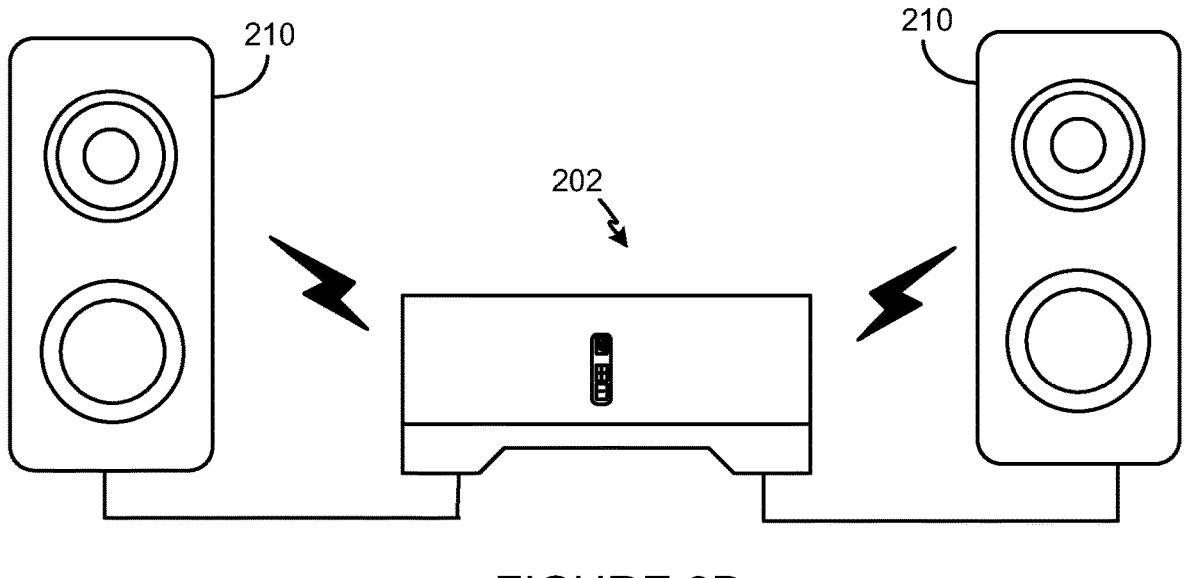
FIG. 2B shows an illustration of an example zone player having a built-in amplifier and connected to external speakers.
Figure 2C:
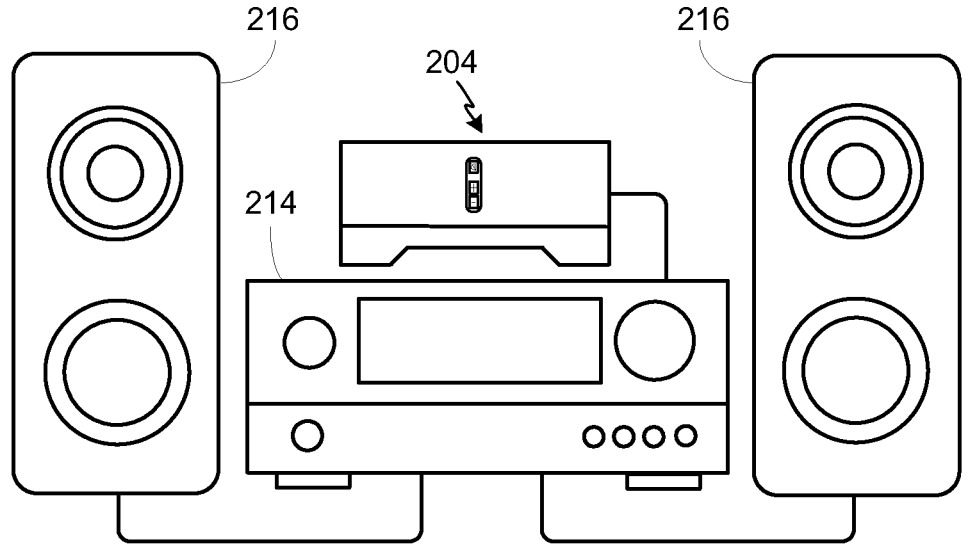
FIG. 2C shows an illustration of an example zone player connected to an A/V receiver and speakers.

FIGS. 2A, 2B, and 2C show example illustrations of zone players 200-204. The zone players 200-204 of FIGS. 2A, 2B, and 2C, respectively, can correspond to any of the zone players 102-124 of FIG. 1. While certain embodiments provide multiple zone players, an audio output can be generated using only a single zone player. FIG. 2A illustrates a zone player 200 including sound producing equipment 208 capable of generating sound or an audio output corresponding to a signal received (e.g., wirelessly and/or via a wired interface). The sound producing equipment 208 of the zone player 200 of FIG. 2A includes a built-in amplifier (not shown in this illustration) and speakers (e.g., a tweeter, a mid-range driver, and/or a subwoofer). In certain embodiments, the zone player 200 of FIG. 2A can be configured to play stereophonic audio or monaural audio. In some embodiments, the zone player 200 of FIG. 2A can be configured as a component in a combination of zone players to play stereophonic audio, monaural audio, and/or surround audio. As described in greater detail below, in some embodiments, the example zone player 200 of FIG. 2A can also transmit a second signal to, for example, other zone player(s) in the same or different zone(s), speaker(s), receiver(s), and so on. Transmission of the second signal can be part of, for example, a system in which multiple zone players, speakers, receivers, and so on, form a network to, for example, present media content in a synchronization or distributed manner.

The example zone player 202 of FIG. 2B includes a built-in amplifier (not shown in this illustration) to power a set of detached speakers 210. The speakers 210 of FIG. 2B can include, for example, any type of loudspeaker. The zone player 202 of FIG. 2B can communicate a signal corresponding to audio content to the detached speakers 210 via wired and/or wireless channels. Instead of receiving and generating audio content as in FIG. 2A, the zone player 202 of FIG. 2B receives the audio content and transmits the same (e.g., after processing the received signal) to the detached speakers 210. Similar to the example zone player 200 of FIG. 2A, in some embodiments the zone player 202 can transmit a second signal to, for example, other zone player(s) in the same or different zone(s), speaker(s), receiver(s), and so on.

The example zone player 204 of FIG. 2C does not include an amplifier, but allows a receiver 214, or another audio and/or video type device with built-in amplification, to connect to a data network 128 of FIG. 1 and to play audio received over the data network 128 viathe receiver 214 and a set of detached speakers 216. In addition to the wired couplings shown in FIG. 2C, the detached speakers 216 can receive audio content via a wireless communication channel between the detached speakers 216 and, for example, the zone player 204 and/or the receiver 214. In some embodiments the zone player 202 can transmit a second signal to, for example, other zone player(s) in the same or different zone(s), speaker(s), receiver(s), and so on.

Example zone players include a "Sonos® S5," "Sonos® Play:5," "Sonos Play:3," "ZonePlayer 120," and "Zone-Player 90," which are offered by Sonos, Inc. of Santa Barbara, Calif. Any other past, present, and/or future zone players can additionally or alternatively be used to implement the zone players of example embodiments disclosed herein. A zone player can also be referred to herein as a playback device, and a zone player is not limited to the particular examples illustrated in FIGS. 2A, 2B, and 2C. For example, a zone player can include a wired or wireless headphone. In other examples, a zone player might include a subwoofer. In yet other examples, a zone player can include a sound bar. In an example, a zone player can include or interact with a docking station for an Apple iPod™ or similar device. In some embodiments, a zone player can relay one or more signals received from, for example, a first zone player to another playback device. In some embodiments, a zone player can receive a first signal and generate an output corresponding to the first signal and, simultaneously or separately, can receive a second signal and transmit or relay the second signal to another zone player(s), speaker(s), receiver(s), and so on. Thus, an example zone player described herein can act as a playback device and, at the same time, operate as a hub in a network of zone players. In such instances, media content corresponding to the first signal can be different from the media content corresponding to the second signal.

Figure 3:
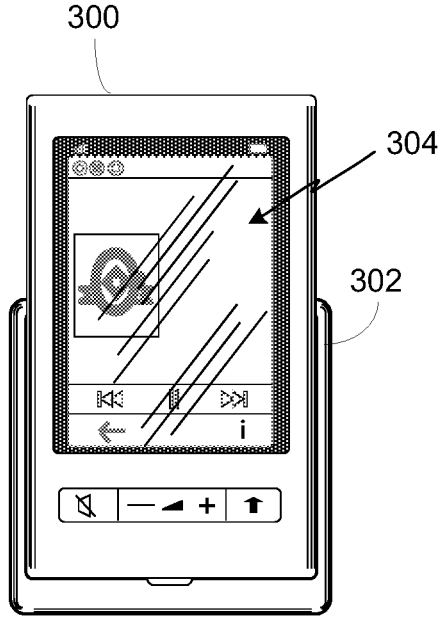
FIG. 3 shows an illustration of an example controller.

FIG. 3 shows an example illustration of a wireless controller 300 in a docking station 302. The controller 300 can correspond to the controlling device 130 of FIG. 1. The controller 300 is provided with a touch screen 304 that allows a user to interact with the controller 300, for example, to retrieve and navigate a playlist of audio items, control operations of one or more zone players, and provide overall control of the system configuration 100. In certain embodiments, any number of controllers can be used to control the system configuration 100. In certain embodiments, there can be a limit on the number of controllers that can control the system configuration 100. The controllers might be wireless like wireless controller 300 or wired to the data network 128. Furthermore, an application running on any network-enabled portable devices, such as an iPhone™, iPad™, Android™ powered phone, or any other smart phone or network-enabled device can be used as a controller by connecting to the data network 128. An application running on a laptop or desktop PC or Mac can also be used as a controller. Example controllers include a "Sonos® Controller 200," "Sonos® Controller for iPhone," "Sonos® Controller for iPad," "Sonos® Controller for Android, "Sonos® Controller for Mac or PC," which are offered by Sonos, Inc. of Santa Barbara, Calif. The flexibility of such an application and its ability to be ported to a new type of portable device is advantageous.

Referring back to the system configuration 100 of FIG. 1, a particular zone can contain one or more zone players. For example, the family room of FIG. 1 contains two zone players 106 and 108, while the kitchen is shown with one zone player 102. Zones can be dynamically configured by positioning a zone player in a room or space and assigning via the controller 130 the zone player to a new or existing zone. As such, zones can be created, combined with another zone, removed, and given a specific name (e.g., "Kitchen"), if so programmed. The zone players 102 to 124 are coupled directly or indirectly to a data network, such as the data network 128 shown in FIG. 1. The data network 128 is represented by an octagon in the figure to stand out from other components shown in the figure. While the data network 128 is shown in a single location, it is understood that such a network can be distributed in and around the system configuration 100.

Particularly, the data network 128 can be a wired network, a wireless network, or a combination of both. In some embodiments, one or more of the zone players 102-124 are wirelessly coupled to the data network 128 based on a proprietary mesh network. In some embodiments, one or more of the zone players 102-124 are wirelessly coupled to the data network 128 using a non-mesh topology. In some embodiments, one or more of the zone players 102-124 are coupled via a wire to the data network 128 using Ethernet or similar technology. In addition to the one or more zone players 102-124 connecting to the data network 128, the data network 128 can further allow access to a wide area network, such as the Internet.

In certain embodiments, the data network 128 can be created by connecting any of the zone players 102-124, or some other connecting device, to a broadband router. Other zone players 102-124 can then be added wired or wirelessly to the data network 128. For example, a zone player (e.g., any of zone players 102-124) can be added to the system configuration 100 by simply pressing a button on the zone player itself, which enables a connection to be made to the data network 128. The broadband router can be connected to an Internet Service Provider (ISP), for example. The broadband router can be used to form another data network within the system configuration 100, which can be used in other applications (e.g., web surfing). The data network 128 can also be used in other applications, if so programmed. Further, in certain embodiments, the data network 128 is the same network used for other applications in the household.

In certain embodiments, each zone can play from the same audio source as another zone or each zone can play from a different audio source. For example, someone can be grilling on the patio and listening to jazz music via zone player 124, while someone is preparing food in the kitchen and listening to classical music via zone player 102. Further, someone can be in the office listening to the same jazz music via zone player 110 that is playing on the patio via zone player 124. In some embodiments, the jazz music played via zone players 110 and 124 is played in synchrony. Synchronizing playback amongst zones allows for someone to pass through zones while seamlessly listening to the audio. Further, zones can be put into a "party mode" such that all associated zones will play audio in synchrony.

In certain embodiments, a zone contains two or more zone players. For example, the family room contains two zone players 106 and 108, and the home theater room contains at least zone players 116, 118, and 120. A zone can be configured to contain as many zone players as desired, and for example, the home theater room might contain additional zone players to play audio from a 5.1 channel or greater audio source (e.g., a movie encoded with 5.1 or greater audio channels). If a zone contains two or more zone players, such as the two zone players 106 and 108 in the family room, then the two zone players 106 and 108 can be configured to play the same audio source in synchrony, or the two zone players 106 and 108 can be paired to play two separate sounds in left and right channels, for example. In other words, the stereo effects of a sound can be reproduced or enhanced through the two zone players 106 and 108, one for the left sound and the other for the right sound. In certain embodiments, paired zone players can play audio in synchrony with other zone players.

In certain embodiments, three or more zone players can be configured to play various channels of audio that is encoded with three channels or more sound. For example, the home theater room shows zone players 116, 118, and 120. If the sound is encoded as 2.1 channel audio, then the zone player 116 can be configured to play left channel audio, the zone player 118 can be configured to play right channel audio, and the zone player 120 can be configured to play bass frequencies. Other configurations are possible and depend on the number of zone players and the type of audio. Further, a particular zone can be configured to play a 5.1 channel audio in one instance, such as when playing audio from a movie, and then dynamically switch to play stereo, such as when playing audio from a two channel source.

In certain embodiments, two or more zone players can be sonically consolidated to form a single, consolidated zone player. A consolidated zone player (though made up of multiple, separate devices) can be configured to process and reproduce sound differently than an unconsolidated zone player or zone players that are paired, because a consolidated zone player will have additional speaker drivers from which sound can be passed. The consolidated zone player can further be paired with a single zone player or yet another consolidated zone player. Each playback device of a consolidated playback device is preferably set in a consolidated mode.

According to some embodiments, one can continue to do any of: group, consolidate, and pair zone players, for example, until a desired configuration is complete. The actions of grouping, consolidation, and pairing are preferably performed through a control interface, such as using controller 130, and not by physically connecting and re-connecting speaker wire, for example, to individual, discrete speakers to create different configurations. As such, certain embodiments described herein provide a more flexible and dynamic platform through which sound reproduction can be offered to the end-user.

Sources of audio content to be played by zone players 102-124 are numerous. Music from a personal library stored on a computer or networked-attached storage (NAS) can be accessed via the data network 128 and played. Internet radio stations, shows, and podcasts can be accessed via the data network 128. Music services that let a user stream and download music and audio content can be accessed via the data network 128. Further, music can be obtained from traditional sources, such as a turntable or CD player, via a line-in connection to a zone player, for example. Audio content can also be accessed through AirPlay™ wireless technology by Apple, Inc., for example. Audio content received from one or more sources can be shared amongst the zone players 102 to 124 via the data network 128 and/or the controller 130. The above-disclosed sources of audio content are referred to herein as network-based audio information sources. However, network-based audio information sources are not limited thereto.

The example home theater zone players 116, 118, 120 are coupled to an audio information source such as a television 132. In some examples, the television 132 is used as a source of audio for the home theater zone players 116, 118, 120, while in other examples audio information from the television 132 can be shared with any of the zone players 102-124 in the audio system 100.

III. Example Playback Device

Figure 4:
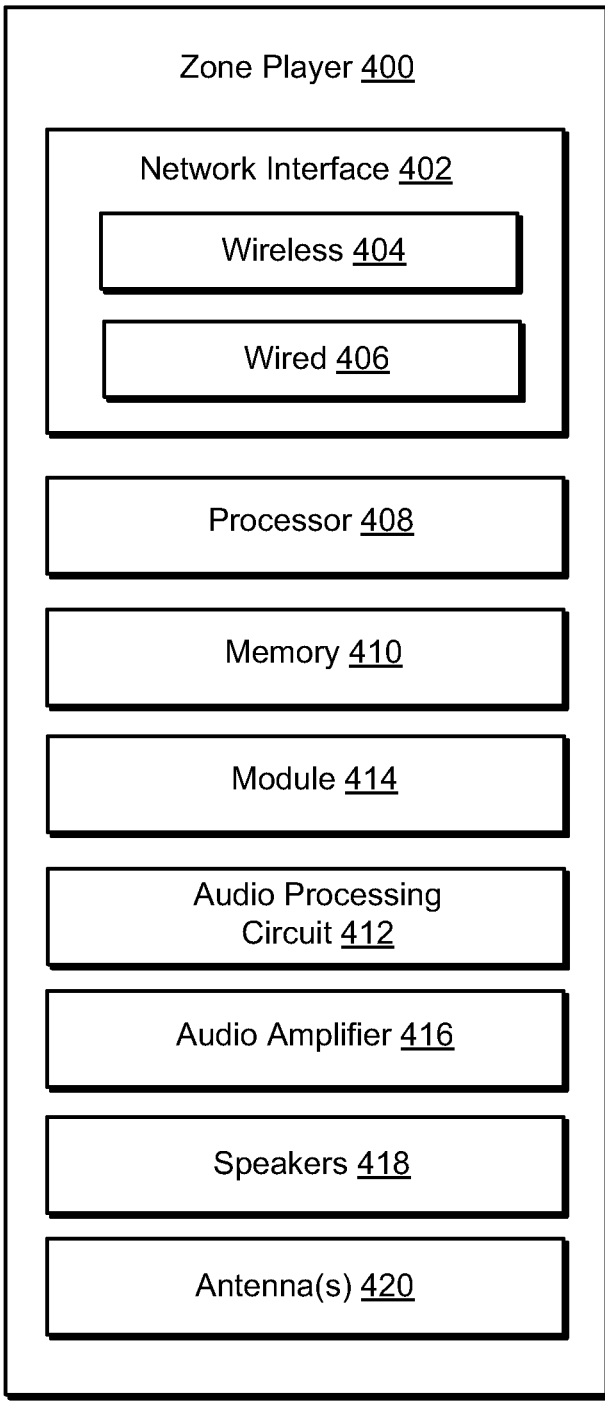
FIG. 4 shows an internal functional block diagram of an example zone player.

Referring now to FIG. 4, there is shown an example functional block diagram of a zone player 400 in accordance with an embodiment. The zone player 400 of FIG. 4 includes a network interface 402, a processor 408, a memory 410, an audio processing component 412, a module 414, an audio amplifier 416, and a speaker unit 418 coupled to the audio amplifier 416. FIG. 2A shows an example illustration of such a zone player. Other types of zone players can not include the speaker unit 418 (e.g., such as shown in FIG. 2B) or the audio amplifier 416 (e.g., such as shown in FIG. 2C). Further, it is contemplated that the zone player 400 can be integrated into another component. For example, the zone player 400 could be constructed as part of a lamp for indoor or outdoor use.

Referring back to FIG. 4, the network interface 402 facilitates a data flow between zone players and other devices on a data network (e.g., the data network 128 of FIG. 1) and the zone player 400. In some embodiments, the network interface 402 can manage the assembling of an audio source or file into smaller packets that are to be transmitted over the data network or reassembles received packets into the original source or file. In some embodiments, the network interface 402 can further handle the address part of each packet so that it gets to the right destination or intercepts packets destined for the zone player 400. Accordingly, in certain embodiments, each of the packets includes an Internet Protocol (IP)-based source address as well as an IP-based destination address.

In some embodiments, the network interface 402 can include one or both of a wireless interface 404 and a wired interface 406. The wireless interface 404, also referred to as an RF interface, provides network interface functions for the zone player 400 to wirelessly communicate with other devices (e.g., other zone player(s), speaker(s), receiver(s), component(s) associated with the data network 128, and so on) in accordance with a communication protocol (e.g., any of the wireless standards IEEE 802.11a, 802.11b, 802.11g, 802.11n, or 802.15). To receive wireless signals and to provide the wireless signals to the wireless interface 404 and to transmit wireless signals, the zone player 400 of FIG. 4 includes one or more antennas 420. The wired interface 406 provides network interface functions for the zone player 400 to communicate over a wire with other devices in accordance with a communication protocol (e.g., IEEE 802.3). In some embodiments, a zone player includes both of the interfaces 404 and 406. In some embodiments, a zone player 400 includes only the wireless interface 404 or the wired interface 406.

In some embodiments, the processor 408 is a clock-driven electronic device that is configured to process input data according to instructions stored in memory 410. The memory 410 is data storage that can be loaded with one or more software modules 414, which can be executed by the processor 408 to achieve certain tasks. In the illustrated embodiment, the memory 410 is a tangible machine readable medium storing instructions that can be executed by the processor 408. In some embodiments, a task might be for the zone player 400 to retrieve audio data from another zone player or a device on a network. In some embodiments, a task might be for the zone player 400 to send audio data to another zone player or device on a network. In some embodiments, a task might be for the zone player 400 to synchronize playback of audio with one or more additional zone players. In some embodiments, a task might be to pair the zone player 400 with one or more zone players to create a multi-channel audio environment. Additional or alternative tasks can be achieved via the one or more software modules 414 and the processor 408.

The audio processing component 412 can include one or more digital-to-analog converters (DAC), an audio prepro-cessing component, an audio enhancement component or a digital signal processor, and so on. In certain embodiments, the audio that is retrieved via the network interface 402 is processed and/or intentionally altered by the audio process-ing component 412. Further, the audio processing compo-nent 412 can produce analog audio signals. The processed analog audio signals are then provided to the audio amplifier 416 for play back through speakers 418. In addition, the audio processing component 412 can include necessary circuitry to process analog or digital signals as inputs to play from zone player 400, send to another zone player on a network, or both play and send to another zone player on the network. An example input includes a line-in connection (e.g., an auto-detecting 3.5 mm audio line-in connection).

The audio amplifier 416 is a device that amplifies audio signals to a level for driving one or more speakers 418. The one or more speakers 418 can include an individual trans-ducer (e.g., a "driver") or a complete speaker system that includes an enclosure including one or more drivers. A particular driver can be a subwoofer (for low frequencies), a mid-range driver (middle frequencies), and a tweeter (high frequencies), for example. An enclosure can be sealed or ported, for example.

A zone player 400 can also be referred to herein as a playback device. An example playback device includes a Sonos® Play:5, which is manufactured by Sonos, Inc. of Santa Barbara, Calif. The Play:5 is an example zone player with a built-in amplifier and speakers. In particular, the Play:5 is a five-driver speaker system that includes two tweeters, two mid-range drivers, and one subwoofer. When playing audio content via the Play:5, the left audio data of a track is sent out of the left tweeter and left mid-range driver, the right audio data of a track is sent out of the right tweeter and the right mid-range driver, and mono bass is sent out of the subwoofer. Further, both mid-range drivers and both tweeters have the same equalization (or substantially the same equalization). That is, they are both sent the same frequencies, just from different channels of audio. Audio from Internet radio stations, online music and video services, downloaded music, analog audio inputs, television, DVD, and so on, can be played from a Sonos® Play:5. While the Play:5 is an example of a zone player with speakers, it is understood that a zone player with speakers is not limited to one with a certain number of speakers (e.g., five speakers as in the Play:5), but rather can contain one or more speakers. Further, a zone player can be part of another device, which might even serve a purpose different than audio (e.g., a lamp).

IV. Example Controller

Figure 5:
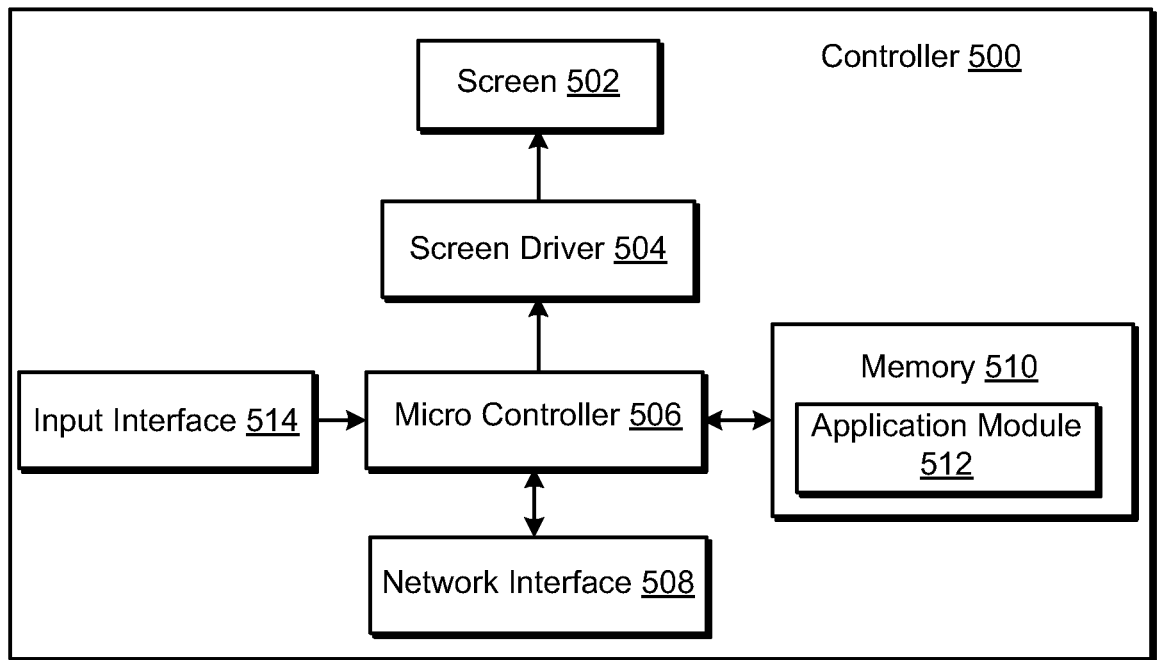
FIG. 5 shows an internal functional block diagram of an example controller.

Referring now to FIG. 5, there is shown an example controller 500, which can correspond to the controlling device 130 in FIG. 1. The controller 500 can be used to facilitate the control of multi-media applications, automation and others in a system. In particular, the controller 500 is configured to facilitate a selection of a plurality of audio sources available on the network and enable control of one or more zone players (e.g., the zone players 102-124 in FIG. 1) through a wireless network interface 508. According to one embodiment, the wireless communications is based on an industry standard (e.g., infrared, radio, wireless standards IEEE 802.11a, 802.11b 802.11g, 802.11n, or 802.15). Further, when a particular audio is being accessed via the controller 500 or being played via a zone player, a picture (e.g., album art) or any other data, associated with the audio source can be transmitted from a zone player or other electronic device to the controller 500 for display.

The controller 500 is provided with a screen 502 and an input interface 514 that allows a user to interact with the controller 500, for example, to navigate a playlist of many multimedia items and to control operations of one or more zone players. The screen 502 on the controller 500 can be an LCD screen, for example. The screen 500 communicates with and is commanded by a screen driver 504 that is controlled by a microcontroller (e.g., a processor) 506. The memory 510 can be loaded with one or more application modules 512 that can be executed by the microcontroller 506 with or without a user input via the user interface 514 to achieve certain tasks. In some embodiments, an application module 512 is configured to facilitate grouping a number of selected zone players into a zone group and synchronizing the zone players for audio play back. In some embodiments, an application module 512 is configured to control the audio sounds (e.g., volume) of the zone players in a zone group. In operation, when the microcontroller 506 executes one or more of the application modules 512, the screen driver 504 generates control signals to drive the screen 502 to display an application specific user interface accordingly.

The controller 500 includes a network interface 508 that facilitates wireless communication with a zone player. In some embodiments, the commands such as volume control and audio playback synchronization are sent via the network interface 508. In some embodiments, a saved zone group configuration is transmitted between a zone player and a controller via the network interface 508. The controller 500 can control one or more zone players, such as 102-124 of FIG. 1. There can be more than one controller for a particular system. Further, a controller can be integrated into a zone player.

It should be noted that other network-enabled devices such as an iPhone®, iPad® or any other smart phone or network-enabled device (e.g., a networked computer such as a PC or Mac®) can also be used as a controller to interact or control zone players in a particular environment. In some embodiments, a software application or upgrade can be downloaded onto a network enabled device to perform the functions described herein.

In certain embodiments, a user can create a zone group including at least two zone players from the controller 500. The zone players in the zone group can play audio in a synchronized fashion, such that all of the zone players in the zone group play back an identical audio source or a list of identical audio sources in a synchronized manner such that no (or substantially no) audible delays or hiccups could be heard. Similarly, in some embodiments, when a user increases the audio volume of the group from the controller 500, the signals or data of increasing the audio volume for the group are sent to one of the zone players and causes other zone players in the group to be increased together in volume.

A user via the controller 500 can group zone players into a zone group by activating a "Link Zones" or "Add Zone" soft button, or de-grouping a zone group by activating an "Unlink Zones" or "Drop Zone" button. For example, one mechanism for 'joining' zone players together for audio play back is to link a number of zone players together to form a group. To link a number of zone players together, a user can manually link each zone player or room one after the other. For example, assume that there is a multi-zone system that includes the following zones: Bathroom, Bedroom, Den, Dining Room, Family Room, and Foyer.

In certain embodiments, a user can link any number of the six zone players, for example, by starting with a single zone and then manually linking each zone to that zone.

In certain embodiments, a set of zones can be dynamically linked together using a command to create a zone scene or theme (subsequent to first creating the zone scene). For instance, a "Morning" zone scene command can link the Bedroom, Office, and Kitchen zones together in one action. Without this single command, the user would need to manually and individually link each zone. The single command might include a mouse click, a double mouse click, a button press, a gesture, or some other programmed action. Other kinds of zone scenes can be programmed.

In certain embodiments, a zone scene can be triggered based on time (e.g., an alarm clock function). For instance, a zone scene can be set to apply at 8:00 am. The system can link appropriate zones automatically, set specific music to play, and then stop the music after a defined duration. Although any particular zone can be triggered to an "On" or "Off" state based on time, for example, a zone scene enables any zone(s) linked to the scene to play a predefined audio (e.g., a favorable song, a predefined playlist) at a specific time and/or for a specific duration. If, for any reason, the scheduled music failed to be played (e.g., an empty playlist, no connection to a share, failed Universal Plug and Play (UPnP), no Internet connection for an Internet Radio station, and so on), a backup buzzer can be programmed to sound. The buzzer can include a sound file that is stored in a zone player, for example.

V. Example Ad-Hoc Network

Figure 6:
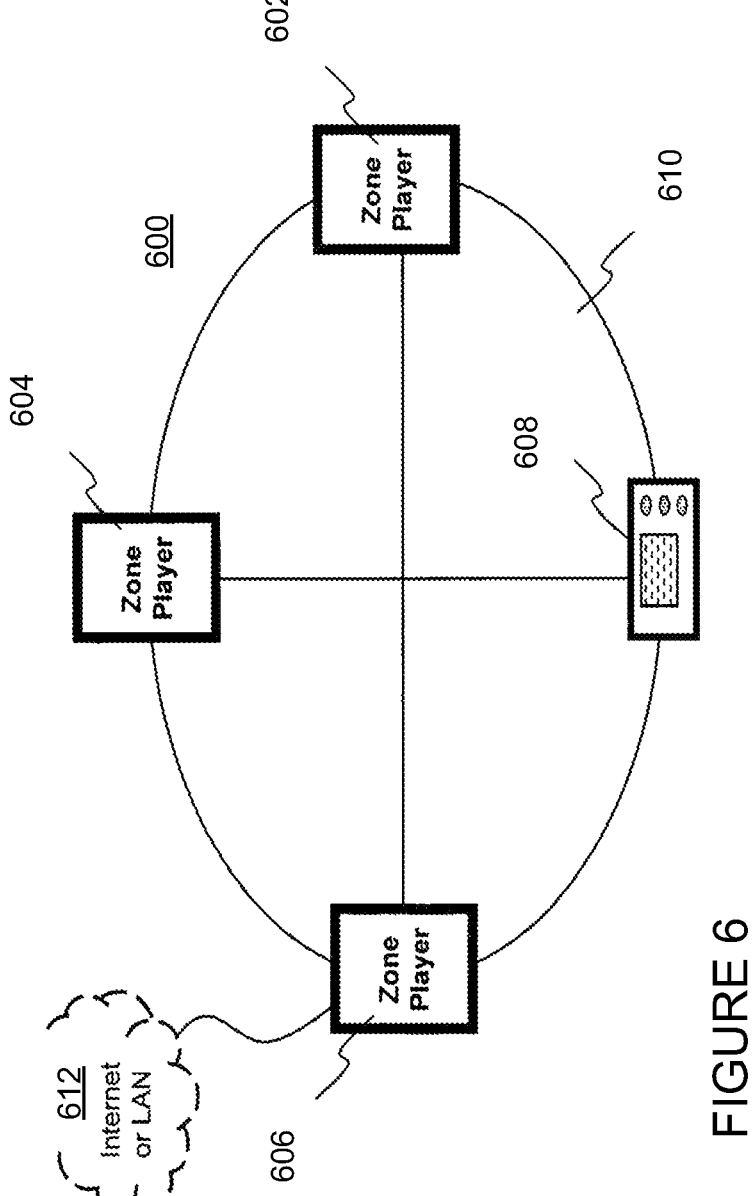
FIG. 6 shows an example ad-hoc playback network.

Certain particular examples will now be provided in connection with FIGS. 6-8B to describe, for purposes of illustration only, certain base systems and methods to provide and facilitate connection to a playback network. FIG. 6 shows that there are three zone players 602, 604 and 606 and a controller 608 that form a network branch that is also referred to as an Ad-Hoc network 610. The network 610 may be wireless, wired, or a combination of wired and wireless. In general, an Ad-Hoc (or "spontaneous") network is a local area network or other small network in which there is no one access point for all traffic. With an established Ad-Hoc network 610, the devices 602, 604, 606 and 608 can all communicate with each other in a "peer-to-peer" style of communication, for example. Furthermore, devices may come/and go from the network 610, and the network 610 will automatically reconfigure itself without needing the user to reconfigure the network 610.

Using the Ad-Hoc network 610, the devices 602, 604, 606, and 608 can share or exchange one or more audio sources and be grouped to play the same or different audio sources. For example, the devices 602 and 604 are grouped to playback one piece of music, and at the same time, the device 606 plays back another piece of music. In other words, the devices 602, 604, 606 and 608, as shown in FIG. 6, form a HOUSEHOLD that distributes audio and/or reproduces sound. As used herein, the term HOUSEHOLD (provided in uppercase letters to disambiguate from the user's domicile) is used to represent a collection of networked devices that are cooperating to provide an application or service. An instance of a HOUSEHOLD is identified with a household 10 (or household identifier).

In certain embodiments, a household identifier (HHID) is a short string or an identifier that is computer-generated to help ensure that it is unique. Accordingly, the network 610 can be characterized by a unique HHID and a unique set of configuration variables or parameters, such as channels (e.g., respective frequency bands), SSID (a sequence of alphanumeric characters as a name of a wireless network), and WEP keys (wired equivalent privacy or other security keys). In certain embodiments, SSID is set to be the same as HHID.

In certain embodiments, each HOUSEHOLD includes two types of network nodes: a control point (CP) and a zone player (ZP). The control point controls an overall network setup process and sequencing, including an automatic generation of required network parameters (e.g., WEP keys). In an embodiment, the CP also provides the user with a HOUSEHOLD configuration user interface. The CP function can be provided by a computer running a CP application module, or by a handheld controller (e.g., the controller 308) also running a CP application module, for example. The zone player is any other device on the network that is placed to participate in the automatic configuration process. The ZP, as a notation used herein, includes the controller 308 or a computing device, for example.

In certain embodiments, configuration of a HOUSEHOLD involves multiple CPs and ZPs that rendezvous and establish a known configuration such that they can use a standard networking protocol (e.g., IP over Wired or Wireless Ethernet) for communication. In an embodiment, two types of networks/protocols are employed: Ethernet 802.3 and Wireless 802.11g. Interconnections between a CP and a ZP can use either of the networks/protocols. A device in the system as a member of a HOUSEHOLD can connect to both networks simultaneously. In an environment that has both networks in use, it is assumed that at least one device in a system is connected to both as a bridging device, thus providing bridging services between wired/wireless networks for others. The zone player 606 in FIG. 6 is shown to be connected to both networks, for example. The connectivity to the network 612 is based on Ethernet while the connectivity to other devices 602, 604 and 608 is based on Wireless. It is understood, however, that in some embodiments each zone player 606, 604, 602 may access the Internet when retrieving media from the cloud (e.g., Internet) via the bridging device. For example, zone player 602 may contain a uniform resource locator (URL) that specifies an address to a particular audio track in the cloud. Using the URL, the zone player 602 may retrieve the audio track from the cloud, and ultimately play the audio out of one or more zone players.

VI. Example Music Sharing and Playback Configuration

Certain embodiments enable a user to stream music from a music-playing application (e.g., browser-based application, native music player, other multimedia application, and so on) to a local multimedia content playback (e.g., Sonos™) system. Certain embodiments provide secure systems and methods for multimedia content playback across a plurality of systems and locations. Certain embodiments facilitate integration between content partners and a playback system as well as supporting maintenance of such content and system.

Figure 7:
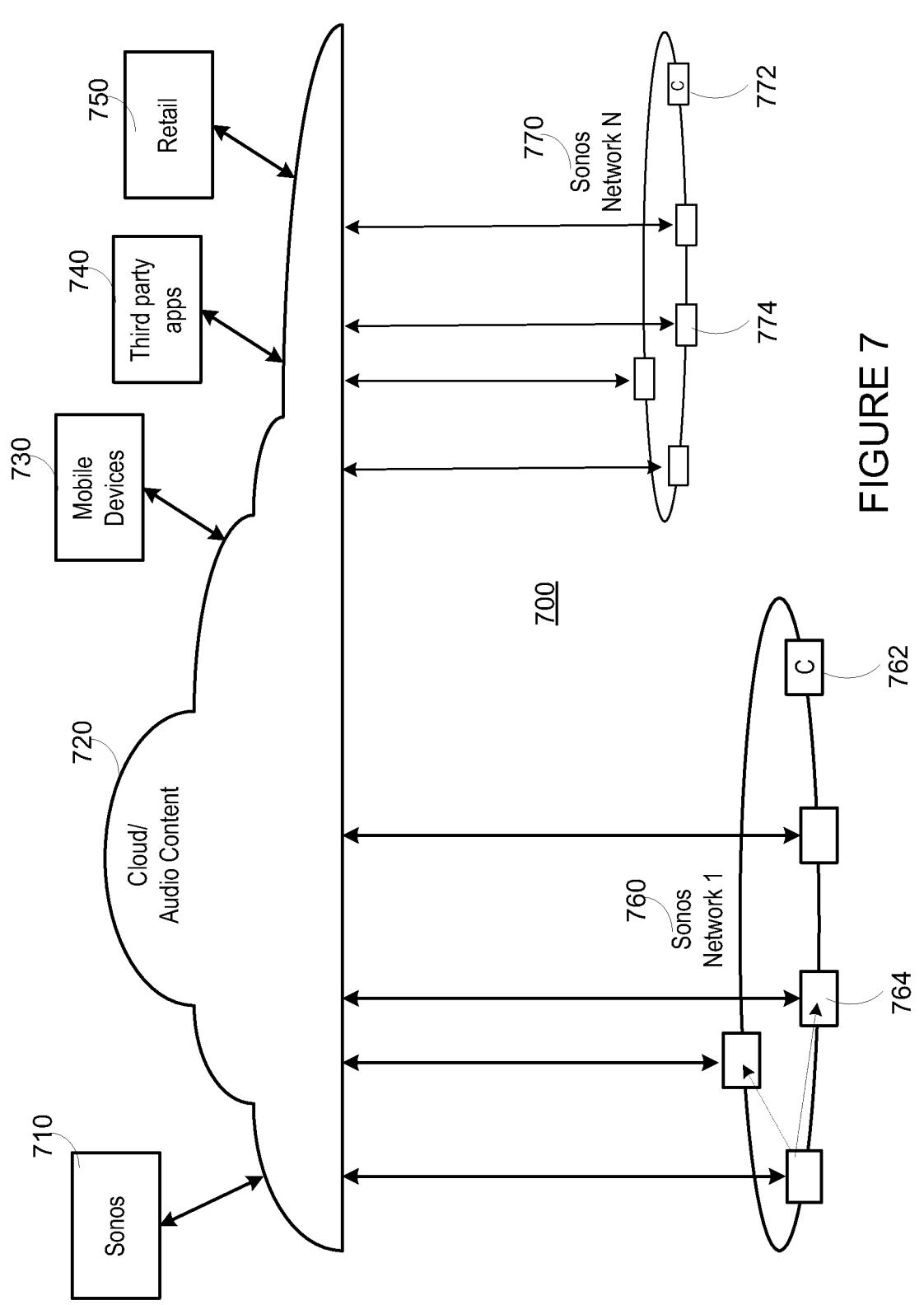
FIG. 7 shows a system including a plurality of networks including a cloud-based network and at least one local playback network.

FIG. 7 shows a system including a plurality of networks including a cloud-based network and at least one local playback network. The network includes a plurality of playback devices or players, though it is understood that the network may contain only one playback device. In certain embodiments, each player has an ability to retrieve its content for playback. Control and content retrieval can be distributed or centralized, for example. Input can include streaming content provider input, third party application input, mobile device input, user input, and/or other playback network input into the cloud for local distribution and playback.

As illustrated by the example system 700 of FIG. 7, a plurality of content providers 720-750 can be connected to one or more local playback networks 760-770 via a cloud and/or other network 710. Using the cloud 710, a multimedia playback system 720 (e.g., Sonos™) a mobile device 730, a third party application 740, a retail location 750, and so on can provide multimedia content (requested or otherwise) to local playback networks 760, 770. Within each local network 760, 770, a controller 762, 772 and/or playback device 764, 774 can provide a song identifier, song name, playlist identifier, playlist name, genre, preference, and so on, and/or simply receive content from a connected system via the cloud.

For example, a user listens to a third party music application (e.g., Pandora™ Rhapsody™, Spotify™, and so on) on her smart phone while commuting. She's enjoying the current channel and, as she walks in the door to her home, selects an option to continue playing that channel on her household music playback system (e.g., Sonos™). The playback system picks up from the same spot on the selected channel that was on her phone and outputs that content (e.g., that song) on speakers and/or other playback devices connected to the household playback system. A uniform resource indicator (URI) (e.g., a uniform resource locator (URL)) can be passed to a playback device to fetch content from a cloud and/or other networked source, for example. A playback device, such as a zone player, can fetch content on its own without use of a controller, for example. Once the zone player has a URL (or some other identification or address) for a song and/or playlist, the zone player can run on its own to fetch the content. Songs and/or other multimedia content can be retrieved from the Internet rather than a local device (e.g., a compact disc (CD)), for example. A third party application can open or utilize an application programming interface (API) to pass music to the household playback system without tight coupling to that household playback system.

In another example of an application determining a playlist and/or other content for playback, a user enjoys listening to music on an online music service (e.g., tumtable.fm or other virtual room that a user can enter to choose from a plurality of online disc jockeys (DJs) deciding what to play next) using his Mac Book Pro™ at home. He likes the unique user experience the service offers, and he frequently hops from room to room discovering new music. To maximize sound quality, he plays the music on his household playback system (e.g., Sonos™). A button or other indicator can be added to the tumtable.fm Web application to switch the content being played to the playback system for output (e.g., to the Sonos™ system rather than or in addition to the Mac Book™). While Web-based applications typically do not have access to items on a local network, certain embodiments enable a third-party Web-based application (e.g., Turntable.fm) to talk to a playback system (e.g., Sonos™) in a certain way (e.g., may have to log in with a username and password), and the identified user has the website send audio or audio and video down to a playback device (e.g., a zone player) on the playback system local network to play music there (or some other media).

In another example, a first user creates a playlist (e.g., a Spotify™ playlist). The first user visits a second user's house, pulls out her smart phone and shares her playlist by playing it on the second user's household playback (e.g., Sonos™) system using her third party (e.g., Spotify™) application. The first user may also go to the third party content provider's (e.g., Spotify's™) website and share her playlist on the second user's playback system.

Thus, certain embodiments provide cross-service linking such that a song identifier can be passed from one user and/or service to another to be fetched and played. A user having a playlist on his or her phone can visit a friend and, using her account on her friend's system, play a song to which she has an access right. A retrieved song can streamed locally to a user's phone, or an application can pass a song identifier to a local playback system which looks up the song identifier and finds an available audio stream to which the user has a right to play and then plays that song.

In another example, a user is staying in a hotel room or other facility including a local playback network. For example, a speaker and/or other playback device (e.g., a Sonos™ Play:3, Play: 5 and so on) in a hotel room can be utilized to play multimedia content to which the user has access from his or her playback network account, streaming audio source, third party application, and so on. Content can be output to one or more devices based on availability, access, configuration, priority, preference, and so on. In certain embodiments, a playback network includes a plurality of nodes, and each node has a capability to play sound in response to an input. Requested output is provided to a most logical connection, for example.

In certain embodiments, a phone device, a television device, and so on can be used to play music, audio, video and/or other multimedia content. In an example, a push button on a microphone or household intercom system to tell the kids dinner is ready is provided over the local playback network.

FIG. 8 shows a flow diagram for a method 800 to provide audio content to a local playback system. In the example method 800 of FIG. 8, a third party application acts as a "virtual line-in" to the local playback system. At block 810, streaming of music or other content from a third party application to a local content playback system is triggered. For example, a "Play to Sonos" button is pressed on a Rhapsody™ application. At block 820, content is streamed to one or more components in a household playback network. The music may be streamed to predetermined zones or players in a household, for example. The music may be further directed to be played in different zones or players throughout the household. Playback on the local network can be facilitated to one or more zones/players based on a configuration (e.g., a zone scene, theme, and so on). Thus, certain embodiments allow a large degree of flexibility in where the music is actually played. For example, the music can be played in the kitchen, the family room, the patio, and so on. Further, the music may be redirected to different zones.

At block 830, the incoming content (e.g., audio) stream is provided directly from a third party application or other external source to the local playback network for playback. For example, rather than passing track identifiers, an audio stream is provided to a Sonos household system for playback to one or more configured zones. At block 840, the local playback system consumes the stream and plays it as it would other content on the local playback (e.g., Sonos™) network (e.g., via zones and so on). At block 850, a playback device (e.g., a zone player, Play:3™, Play:5™, and so on) adds timing information to the streaming content signal (e.g., the device takes the streaming audio signal and repackages it for local synchronized playback). In some embodiments, timing information is not added to the signal unless two or more playback devices are configured to play the audio in synchrony.

FIG. 9 shows a flow diagram for a method 900 to provide audio content to a local playback system. In the example method 900 of FIG. 9, a uniform resource indicator (URI) handler approach is provided for content output. At block 910, a link or other reference is embedded in a third party application (e.g., Facebook™ or Twitter). At block 920, when the link is selected (e.g., clicked), a local playback (e.g., Sonos™) controller, if available, is launched. At block 930, the application (e.g., accessed on a phone, tablet, computer, and so on) passes a URI for associated content (e.g., an audio track and so on) to a local playback system (e.g., Sonos™) controller. At block 940, the local controller outputs the associated content (e.g., plays the music) via the URI. For example, music is streamed from the cloud to one or more playback devices on the local playback network.

In certain embodiments, an application associated with the operating system can register to handle all URIs (URLs) that start with a certain prefix and can define how data is encoded into those URLs so a local playback system application can generate a link (e.g., "sonos:") and put that link into a message (e.g., email, text message, instant message (IM), etc.). The local playback application registered to handle such URLs can parse the URLs to determine what song, playlist, streaming radio station, etc., to play. This launches the controller application. For example, if a first listener likes a song and tweets that song, Twitter™ can include a clickable link which launches a playback application and starts the music playing on a local playback system if the local system can find the song (e.g., if have the application, if have rights/access to the song, etc.). In certain embodiments, the system knows to trigger the receiving user's system rather than the sending user's system to play associated content based on the transmitted link/identifier.

For example, an application can register with the system to handle all URLs that start with a custom prefix (e.g., an HTTP "scheme"). For instance, Sonos controller apps can register to handle any URL that begins with "sonos:" or "x-sonos:". In certain embodiments, a playback system provider can define and publish the format of its URLs so that any third party application can create a link or reference to content. A large amount of data can be encoded into a URL using query parameters, for example.

In an example, when an application tries to "open" or "browse" to a URL, the system checks to see if the scheme of the URL matches the "sonos:" scheme that has been registered with the application. If a URL handler application is found, the system launches that application (e.g., the application can but does not need to be running in the background) and passes the URL to the application. The application then parses the URL and executes functionality based on the data in the URL. For example, the URL can contain the name of a music service and a playlist identifier from that service, plus the name of a Sonos™ Zone Player, causing the Sonos controller to start that playlist playing on that zone.

Figure 10:
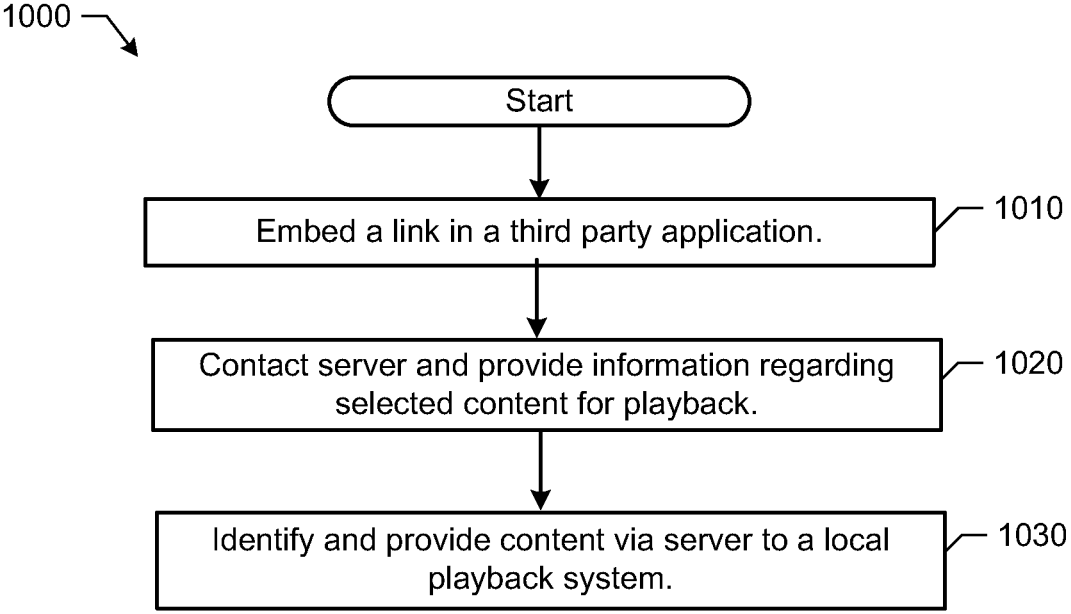

FIG. 10 shows a flow diagram for a method 1000 to provide audio content to a local playback system. In the example method 1000 of FIG. 10, at block 1010, a link or other reference is embedded in a third party application (e.g., Facebook™). At block 1020, when the link is selected, a playback system (e.g., Sonos™) server is contacted and provided with information regarding selected content for playback. For example, rather than launching a local controller application, a server is contacted regarding music for playback on a local network. At block 1030, using the provided information, the server identifies and provides the content locally on a user's local playback system. For example, the server can then start playing the music directly on the user's Sonos™ system (e.g., without going through a Sonos™ controller application).

In certain embodiments, a "single sign-on" technology is provided so that the user does not need to re-enter a username and password in order to authenticate to the playback server. Example single sign-on technologies include Facebook Connect™, Windows Live ID™, etc.

In certain embodiments, instead of using a specialized link, such as a "sonos:" link, a normal URL can be used to point to a playback system (e.g., Sonos™) webserver, which generates links with special data embedded in the link. A playback system is identified, and content identified by the URL can be playing at via the local playback network (e.g., mesh network configured for home, hotel room, etc.). Parameters such as authentication, security, location, and so on can be configured for local playback of remote content.

FIG. 11 shows a flow diagram for a method 1100 to provide audio content to a local playback system. The example method 1100 of FIG. 11 provides a "throw it over the wall" approach to content delivery to a local playback system. At block 1110, a third party application provides a multimedia playback device (e.g., a Sonos™ zone player (ZP)) with enough information about content (e.g., an audio track) so that, at block 1120, the local playback system (e.g., SonosNet™) can directly access a source of the content and, at block 1130, play the content directly off the network (e.g., the Internet) or cloud.

In certain embodiments, a local playback controller application is not involved. Information passed over to the local playback device may include an identifier for a single track, a playlist, a streaming radio station, a programmed radio station, and so on. This information can also include a current play position within a list to enable near-seamless "handoff" of music from a portable device to a local playback system. Once the music information is handed from the third-party application to the local playback system, there is no further synchronization between the two systems.

A connection between the third-party application and the local playback device (e.g., Sonos ZonePlayer™) can be direct over a local area network (LAN), remote through a proxy server in the cloud, and so on. A LAN delivery approach may be easier to integrate into "native" applications (e.g., applications written for iOS or Android), and a proxy server approach may be easier for third party applications that are browser-based, for example.

In certain embodiments, information is provided from a third party application to a local playback system without being routed through or by a controller application. Here, the third party application is communicating with the multimedia playback device (e.g., a Sonos ZonePlayer™). Information can be passed locally, rather than through the Internet, for example. The local playback device accesses the Internet to find content to stream, and the third party application takes the place of the controller application (e.g., throw it over the wall—the application passes information and the local playback system runs it).

Certain embodiments provide an approach similar to the "throw it over the wall" or one way communication approach of FIG. 11 except that the third party application not only tells the local playback system what to play, but also maintains two-way communication with the local playback (e.g., Sonos™) system. Two-way communication helps enable features such as keeping a local playback queue synchronized with a queue that the user is editing/managing in the third party application; allow the third party application to know what is currently playing on the local playback system; allow integrated transport control between the third party application and the local playback system; and so on.

In certain embodiments, a local playback system can pass information back to a third party application to indicate a current point of playback (e.g., now playing a third song in a playlist, fourth song in the playlist, and so on). The local playback system can pass parameter information, such as a change in volume, from a local multimedia playback device to the third party application so the application can reflect the change in volume to the user via its graphical user interface. The third party application can instruct the local playback system to skip a song, go to a certain location, and so on.

Certain embodiments provide a third party mode that allows users to select from any local playback network (e.g., Sonos™) controller to listen to audio from one or more third party applications on their smartphones or tablets (e.g., Android™ devices). For example, a user may be using a local playback network controller application and now wants a third party application to appear as an audio source within the controller application. The user can then select the controller application that he or she wishes to play audio from the third party application, for example.

Certain embodiments provide queue management to allow a third party application to control a local playback queue. That is, the local playback system has a queue, but the third party application allows users to add, delete and so on from the queue, for example. Rather than switch from content that the user is currently playing, the local playback system allows a user to create a playlist on the fly. For example, if last.fm users vote that they do not like a song and it should be skipped, then the local playback system will skip it.

Certain embodiments allow a third party application to override a local playback queue with its own application-specific queue. The local playback system periodically fetches a short list of tracks to play next. The list of tracks to play is determined by the third-party application, for example. In certain embodiments, a shared queue is provided between the local playback system and the third party application to keep the local system and application synchronized.

Certain embodiments allow control of playback system functions and/or settings via an external (e.g., third party) application. For example, a local playback system can allow volume control, play/pause, and so on and can interact with an application running on a given platform/operating system (OS). Certain embodiments provide a Web API that can be used to access functionality.

Certain embodiments facilitate control of a local playback system from outside a household or other location at which the local playback network is configured. For example, a user can queue up music while away from his or her house. The application can facilitate setup and/or configuration. For example, a third party application may ask the user to enter a Sonos customer email address and password. The application can then make a request to a Sonos server in the cloud to determine the zone groups on which music can be played.

Various inventions have been described in sufficient detail with a certain degree of particularity. It is understood to those skilled in the art that the present disclosure of embodiments has been made by way of examples only and that numerous changes in the arrangement and combination of parts can be resorted without departing from the spirit and scope of the present disclosure as claimed. While the embodiments discussed herein can appear to include some limitations as to the presentation of the information units, in terms of the format and arrangement, the embodiments have applicability well beyond such embodiment, which can be appreciated by those skilled in the art. Accordingly, the scope of the present disclosure is defined by the appended claims rather than the forgoing description of embodiments.

The invention claimed is:

1. A zone player comprising:
   a network interface that is configured to facilitate network communication, via one or more data networks, with (a) a client station installed with a media-playback application for a cloud-based media service and (b) a cloud-based computing system associated with the cloud-based media service;
   at least one processor;
   a tangible, non-transitory computer-readable medium; and
   program instructions stored on the tangible, non-transitory computer-readable medium that are executable by the at least one processor such that the zone player is configured to:
      while the client station is configured for playback of a remote playback queue provided by the cloud-based computing system, receive, via the network interface, an instruction to take over playback responsibility for the remote playback queue from the client station; and
      after receiving the instruction, (i) communicate with the cloud-based computing system in order to obtain data identifying a next one or more media items in the remote playback queue, (ii) use the obtained data to retrieve at least one media item in the remote playback queue from the cloud-based media service, and (iii) play back the retrieved at least one media item.

2. The zone player of claim 1, wherein the instruction further comprises data identifying a first media item in the remote playback queue that the client station was configured to play back, and wherein the zone player further comprises program instructions stored on the tangible, non-transitory computer-readable medium that are executable by the at least one processor such that the zone player is configured to, after receiving the instruction:
   use the data identifying the first media item in the remote playback queue to retrieve the first media item from the cloud-based media service, and
   play back the first media item before playing back any other retrieved media item in the remote playback queue.

3. The zone player of claim 1, wherein the data identifying the next one or more media items in the remote playback queue comprises a respective uniform resource identifier (URI) for each media item included in the next one or more media items.

4. The zone player of claim 1, further comprising program instructions stored on the tangible, non-transitory computer-readable medium that are executable by the at least one processor such that the zone player is configured to:
   after obtaining the data identifying the next one or more media items, add the data identifying the next one or more media items to a local playback queue maintained by the zone player.

5. The zone player of claim 1, wherein the data identifying the next one or more media items was previously stored in a local playback queue maintained by the client station.

6. The zone player of claim 1, wherein the instruction to take over the playback responsibility for the remote playback queue from the client station is received by the zone player as a result of a user inputting a request into the client station to transfer the playback responsibility for the remote playback queue from the client station to the zone player.

7. The zone player of claim 1, further comprising program instructions stored on the tangible, non-transitory computer-readable medium that are executable by the at least one processor such that the zone player is configured to:
   provide, via the network interface to the cloud-based computing system, an indication that the zone player has successfully taken over the playback responsibility for the remote playback queue.

8. The zone player of claim 1, wherein:
   the instruction to take over the playback responsibility for the remote playback queue from the client station further comprises an indication of a play position within a given media item that is currently being played back by the client station; and
   wherein the program instructions stored on the tangible, non-transitory computer-readable medium that are executable by the at least one processor such that the zone player is configured to play back the retrieved at least one media item comprises program instructions stored on the tangible, non-transitory computer-readable medium that are executable by the at least one processor such that the zone player is configured to play back the retrieved at least one media item beginning at the play position within the given media item.

9. The zone player of claim 1, further comprising program instructions stored on the tangible, non-transitory computer-readable medium that are executable by the at least one processor such that the zone player is configured to:

provide, via the network interface, an indication that the zone player is available to accept the playback responsibility for the remote playback queue.

10. The zone player of claim 1, wherein:

the instruction to take over the playback responsibility for the remote playback queue from the client station comprises an instruction for a group of two or more zone players that includes the zone player to take over the playback responsibility for the remote playback queue from the client station; and the program instructions stored on the tangible, non-transitory computer-readable medium that are executable by the at least one processor such that the zone player is configured to play back the retrieved at least one media item comprise program instructions stored on the tangible, non-transitory computer-readable medium that are executable by the at least one processor such that the zone player is configured to play back the retrieved at least one media item in synchrony with at least one other zone player included in the group of two or more zone players based on timing information for the retrieved at least one media item that is generated by the zone player.

11. The zone player of claim 1, wherein the client station is additionally installed with a dedicated controller application for the zone player, and wherein, after the instruction to take over the playback responsibility for the remote playback queue from the client station is received, the zone player is configured to receive instructions for controlling the zone player's playback of media items from the remote playback queue that are initiated by each of the media-playback application installed on the client station and the dedicated controller application installed on the client station.

12. The zone player of claim 1, further comprising program instructions stored on the tangible, non-transitory computer-readable medium that are executable by the at least one processor such that the zone player is configured to:

transmit, to the cloud-based computing system, an indication of a current point of the zone player's playback within the remote playback queue.

13. The zone player of claim 1, further comprising program instructions stored on the tangible, non-transitory computer-readable medium that are executable by the at least one processor such that the zone player is configured to:

receive, from the cloud-based computing system, an indication that a user has modified the remote playback queue in a manner that impacts the previously received data identifying the next one or more items in the remote playback queue.

14. The zone player of claim 1, wherein the instruction to take over the playback responsibility for the remote playback queue from the client station is received from one or both of the client station or the cloud-based computing system.

15. A system comprising:

a zone player configured to communicate over at least one data network; and a client station configured to communicate over at least one data network and installed with a media-playback application for a cloud-based media service;

the zone player comprising:

a first network interface that is configured to communicatively couple the zone player to a cloud-based computing system associated with the cloud-based media service, wherein the zone player, the client station, and the cloud-based computing system are mutually distinct;

at least one first processor;

a first tangible, non-transitory computer-readable medium; and program instructions stored on the first tangible, non-transitory computer-readable medium that are executable by the at least one first processor such that the zone player is configured to:

while the client station is configured for playback of a remote playback queue provided by the cloud-based computing system, receive, via the network interface, an instruction to take over playback responsibility for the remote playback queue from the client station; and after receiving the instruction, (i) communicate with the cloud-based computing system in order to obtain data identifying a next one or more media items in the remote playback queue, (ii) use the obtained data to retrieve at least one media item in the remote playback queue from the cloud-based media service, and (iii) play back the retrieved at least one media item;

the client station comprising:

a second network interface that is configured to communicatively couple the client station to the cloud-based computing system;

a user interface;

at least one second processor;

a second tangible, non-transitory computer-readable medium; and program instructions stored on the second tangible, non-transitory computer-readable medium that are executable by the at least one second processor such that the client station is configured to:

operate in a first mode in which the client station is configured for playback of the remote playback queue provided by the cloud-based media service;

while operating in the first mode, detect, via the user interface, a selection of an indicator that facilitates transfer of playback responsibility for the remote playback queue from the client station to the zone player; and transitioning from (i) the first mode in which the client station is configured for playback of the remote playback queue to (ii) a second mode in which the client station is configured to control the zone player's playback of the remote playback queue and the client station is no longer configured for playback of the remote playback queue.

16. The system of claim 15, further comprising program instructions stored on the second tangible, non-transitory computer-readable medium that are executable by the at least one second processor such that the client station is configured to:

in response to detecting the selection of the indicator, transmit, via the second network interface, the instruction for the zone player to accept playback responsibility for the remote playback queue.

17. The system of claim 15, wherein the data identifying the next one or more media items in the remote playback queue comprises a respective uniform resource identifier (URI) for each media item included in the next one or more media items.

18. The system of claim 15, further comprising program instructions stored on the first tangible, non-transitory computer-readable medium that are executable by the at least one first processor such that the zone player is configured to:

after obtaining the data identifying the next one or more media items, add the data identifying the next one or more media items to a local playback queue maintained by the zone player.

19. The system of claim 15, further comprising program instructions stored on the second tangible, non-transitory computer-readable medium that are executable by the at least one second processor such that the client station is configured to:

while operating in the first mode, store the data identifying the next one or more media items in a local playback queue maintained by the client station.

20. The system of claim 15, further comprising program instructions stored on the second tangible, non-transitory computer-readable medium that are executable by the at least one second processor such that the client station is configured to:

detect an indication that playback responsibility for the remote playback queue has been successfully transferred from the client station to the zone player.

21. The system of claim 15, further comprising program instructions stored on the first tangible, non-transitory computer-readable medium that are executable by the at least one first processor such that the zone player is configured to:

provide, via the first network interface, an indication that the zone player is available for media playback.

22. The system of claim 15, wherein the client station is additionally installed with a dedicated controller application for the zone player, and wherein, after transmitting the instruction for the zone player to accept playback responsibility for the remote playback queue, the client station is configured to provide instructions for controlling the zone player's playback of media items from the remote playback queue via each of the media-playback application installed on the client station and the dedicated controller application installed on the client station.

23. The system of claim 15, further comprising program instructions stored on the second tangible, non-transitory computer-readable medium that are executable by the at least one second processor such that the client station is configured to:

transmit, via the second network interface to the cloud-based computing system, an instruction to modify the remote playback queue in a manner that impacts the data identifying the next one or more items in the remote playback queue that was previously received by the zone player; and the system further comprising program instructions stored on the first tangible, non-transitory computer-readable medium that are executable by the at least one first processor such that the zone player is configured to:

as a result of the instruction to modify the remote playback queue, receive, from the cloud-based computing system, updated data identifying the next one or more items in the remote playback queue.

24. The zone player of claim 15, wherein the instruction to take over the playback responsibility for the remote playback queue from the client station is received from the client station.

25. A system comprising:

a zone player configured to communicate over at least one data network; and a cloud-based computing system configured to communicate over at least one data network with a client station installed with a media-playback application for a cloud-based media service associated with the cloud-based computing system, wherein the zone player, the client station, and the cloud-based computing system are mutually distinct;

the zone player comprising:

a first network interface that is configured to communicatively couple the zone player to the client station;

at least one first processor;

a first tangible, non-transitory computer-readable medium; and program instructions stored on the first tangible, non-transitory computer-readable medium that are executable by the at least one first processor such that the zone player is configured to:

while the client station is configured for playback of a remote playback queue provided by the cloud-based computing system, receive, via the network interface, an instruction to take over playback responsibility for the remote playback queue from the client station; and after receiving the instruction, (i) communicate with the cloud-based computing system in order to obtain data identifying a next one or more media items in the remote playback queue, (ii) use the obtained data to retrieve at least one media item in the remote playback queue from the cloud-based media service, and (iii) play back the retrieved at least one media item;

the cloud-based computing system comprising:

a second network interface that is configured to communicatively couple the cloud-based computing system to the client station;

at least one second processor;

a second tangible, non-transitory computer-readable medium; and program instructions stored on the second tangible, non-transitory computer-readable medium that are executable by the at least one second processor such that the cloud-based computing system is configured to:

communicate with the zone player in order to provide the data identifying the next one or more media items in the remote playback queue.

26. The system of claim 25, wherein the instruction further comprises data identifying a first media item in the remote playback queue that the client station was configured to play back when sending the instruction, and wherein the zone player further comprises program instructions stored on the first tangible, non-transitory computer-readable medium that are executable by the at least one first processor such that the zone player is configured to, after receiving the instruction:

use the data identifying the first media item in the remote playback queue to retrieve the first media item from the cloud-based media service, and play back the first media item before playing back any other retrieved media item in the remote playback queue.

27. The system of claim 25, further comprising program instructions stored on the first tangible, non-transitory computer-readable medium that are executable by the at least one first processor such that the zone player is configured to:

provide, via the first network interface to the cloud-based computing system, an indication that the zone player has successfully taken over the playback responsibility for the remote playback queue.

28. The system of claim 25, further comprising program instructions stored on the second tangible, non-transitory computer-readable medium that are executable by the at least one second processor such that the cloud-based computing system is configured to:

transmit, to the zone player, an indication that a user has modified the remote playback queue in a manner that impacts the previously provided data identifying the next one or more items in the remote playback queue.

29. The system of claim 25, wherein the instruction to take over the playback responsibility for the remote playback queue from the client station is received from the cloud-based computing system.

30. A system comprising:

at least one processor;

at least one non-transitory computer-readable medium; and program instructions stored on the at least one non-transitory computer-readable medium that are executable by the at least one processor such that the system is configured to:

cause a client station to operate in a first mode in which the client station is configured for playback of a remote playback queue provided by a cloud-based computing system associated with a cloud-based media service;

cause a zone player to take over playback responsibility for the remote playback queue from the client station, wherein causing the zone player to take over playback responsibility comprises transmitting an instruction for the zone player to take over playback responsibility, wherein the zone player, the client station, and the cloud-based computing system are mutually distinct;

cause the zone player to (i) communicate with the cloud-based computing system in order to obtain data identifying a next one or more media items that are in the remote playback queue, (ii) use the obtained data to retrieve at least one media item in the remote playback queue from the cloud-based media service, and (iii) play back the retrieved at least one media item; and cause the client station to transition from (i) the first mode in which the client station is configured for playback of the remote playback queue to (ii) a second mode in which the client station is configured to control the zone player's playback of the remote playback queue and the client station is no longer configured for playback of the remote playback queue.

* * * * *